US006711448B2

(12) United States Patent
Misawa et al.

(10) Patent No.: US 6,711,448 B2
(45) Date of Patent: Mar. 23, 2004

(54) SETTING DISPLAY APPARATUS FOR A PROGRAMMABLE CONTROLLER

(75) Inventors: Ryosuke Misawa, Tokyo (JP); Michiaki Isobe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 317 days.

(21) Appl. No.: 09/985,850

(22) Filed: Nov. 6, 2001

(65) Prior Publication Data
US 2002/0183870 A1 Dec. 5, 2002

(30) Foreign Application Priority Data
May 29, 2001 (JP) ........................................ 2001-160646

(51) Int. Cl.[7] .............................................. G05B 15/00
(52) U.S. Cl. .............................. 700/83; 700/17; 700/18; 700/86; 700/87; 700/88; 345/700; 345/759; 345/615; 345/595
(58) Field of Search ............................... 700/17, 18, 83, 700/86, 87, 88, 89; 345/594, 326, 595, 645, 655, 661, 700, 759

(56) References Cited

U.S. PATENT DOCUMENTS 4,471,348 A * 9/1984 London et al. ............... 345/2.2

| 4,636,858 A | * | 1/1987 | Hague et al. ................ 348/463 |
| 4,961,131 A | * | 10/1990 | Ashida ........................ 700/23 |
| 5,093,902 A | * | 3/1992 | Tokumitsu ................... 345/534 |
| 5,615,104 A | * | 3/1997 | Takai et al. ..................... 700/5 |

FOREIGN PATENT DOCUMENTS

| JP | 5-313714 | 11/1993 |
| JP | 6-035513 | 2/1994 |
| JP | 6-266419 | 9/1994 |
| JP | 8-272571 | 10/1996 |

* cited by examiner

Primary Examiner—Ramesh Patel
(74) Attorney, Agent, or Firm—Sughrue Mion, PLLC

(57) ABSTRACT

A setting display apparatus for managing a programmable controller is arranged to enable a display program to be designed easily and efficiently and to reduce the memory capacity for the program. A display program is divided into a frame flow program and a frame forming program, which can be programmed independently each other. The frame forming program has the function of forming a basic frame including information on the size, position, etc., of letters and figures such that importance is attached to the appearance. Addresses of data displayed on the basic frame corresponds to addresses in a reception buffer memory. The frame flow program has the functions of designating addresses in a device memory of the programmable controller as direct addresses of the displayed data and designating a frame change condition and a shift destination frame number. The frame flow program is characterized by its adherence to mechanical control.

15 Claims, 35 Drawing Sheets

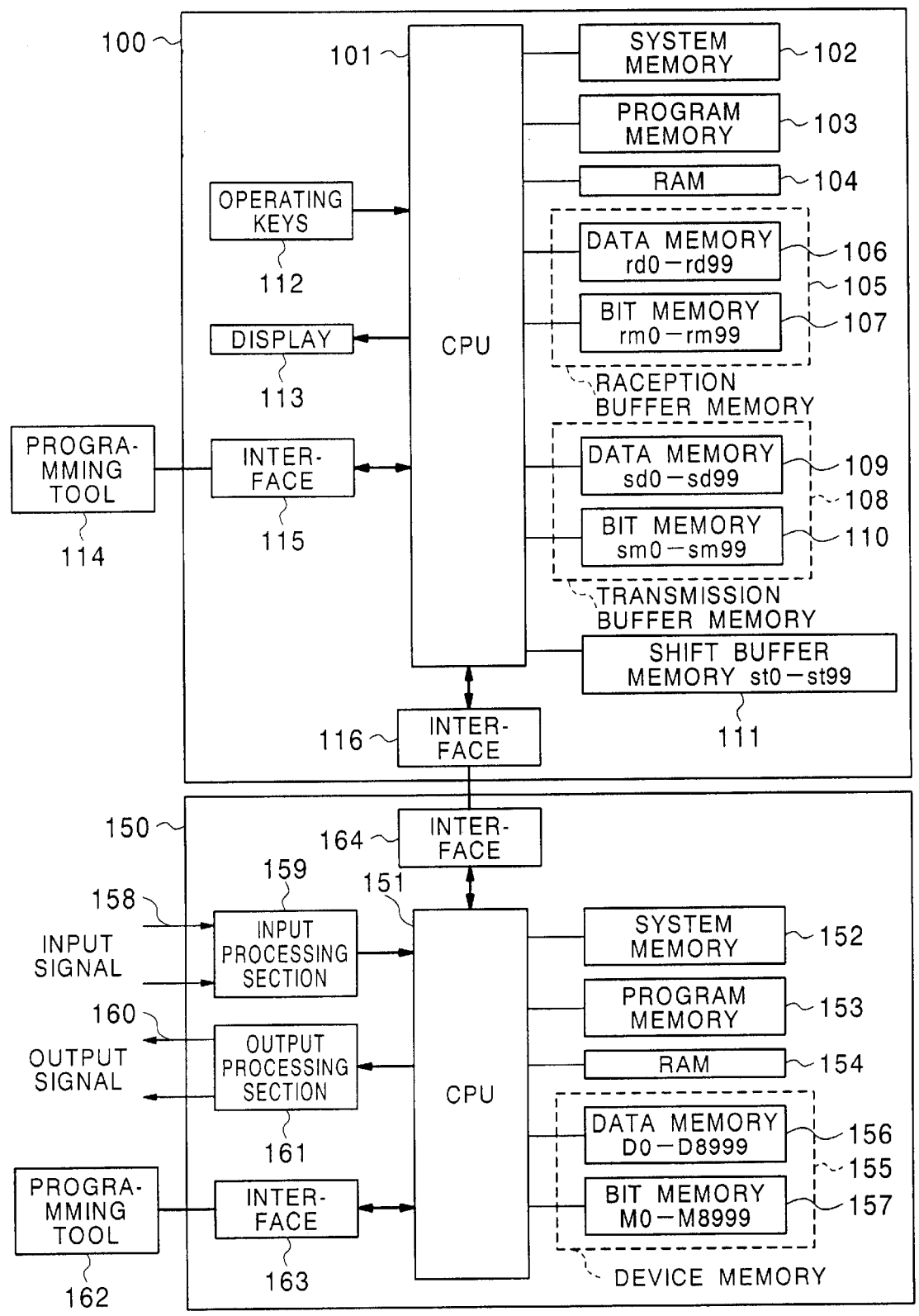

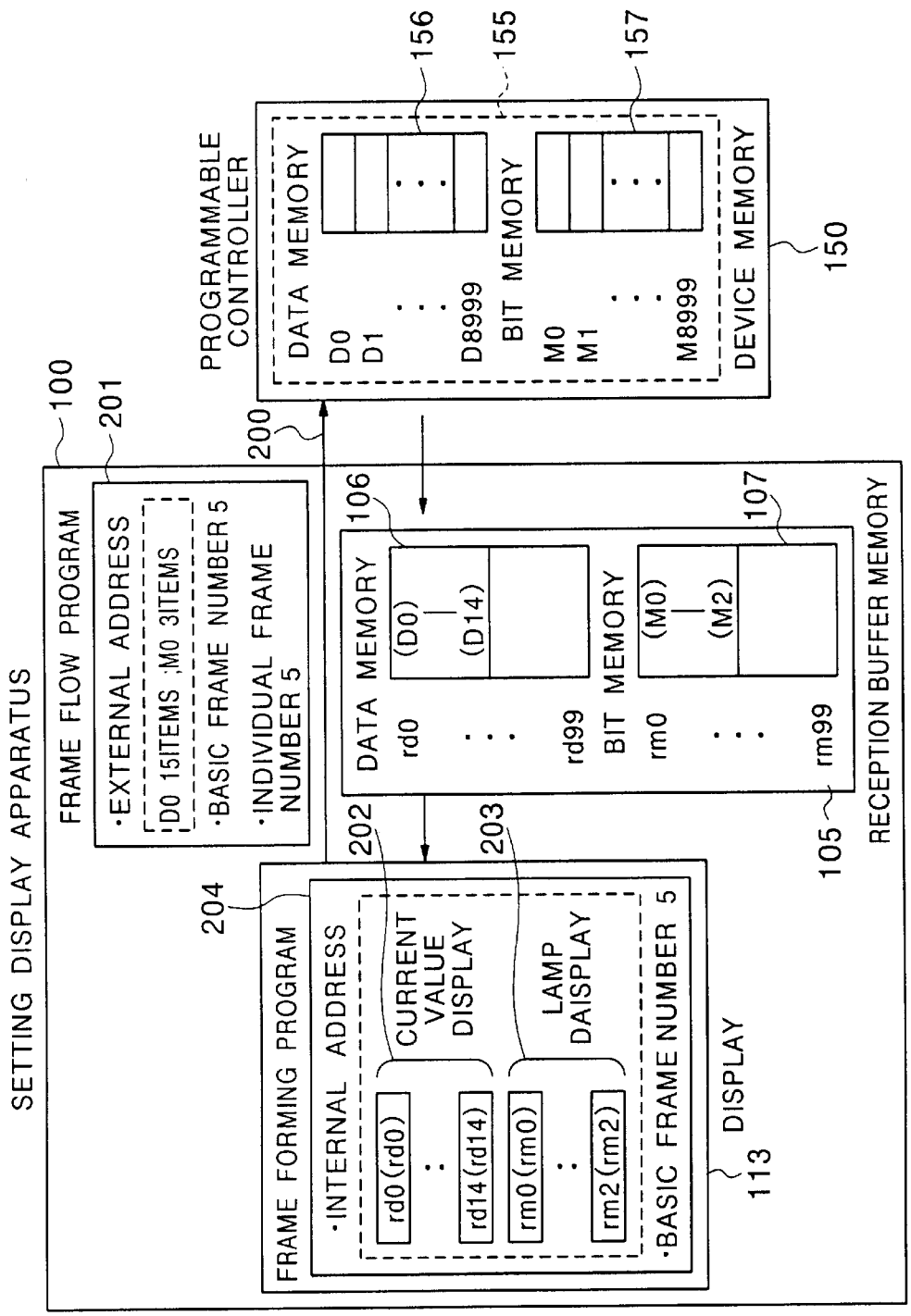

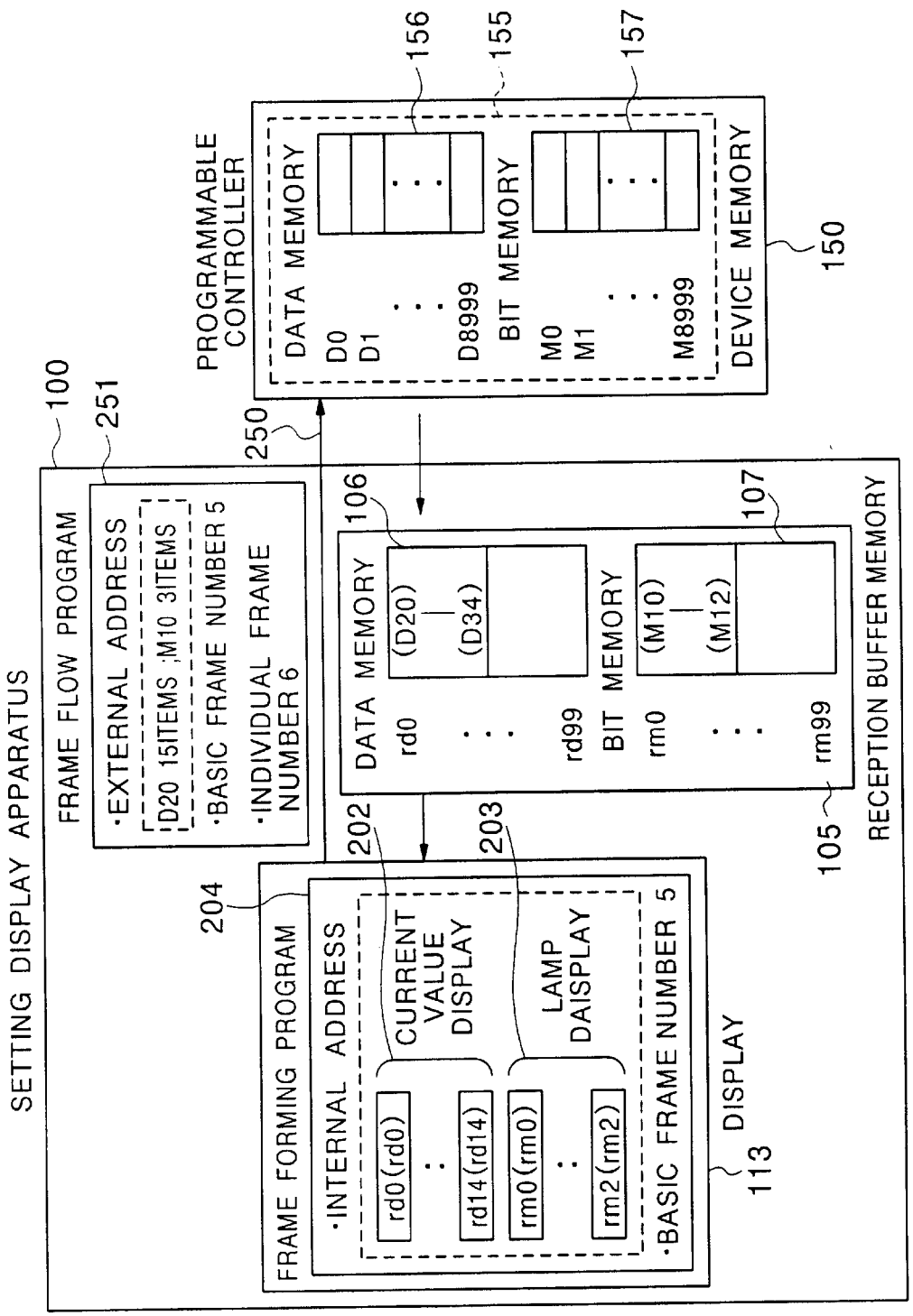

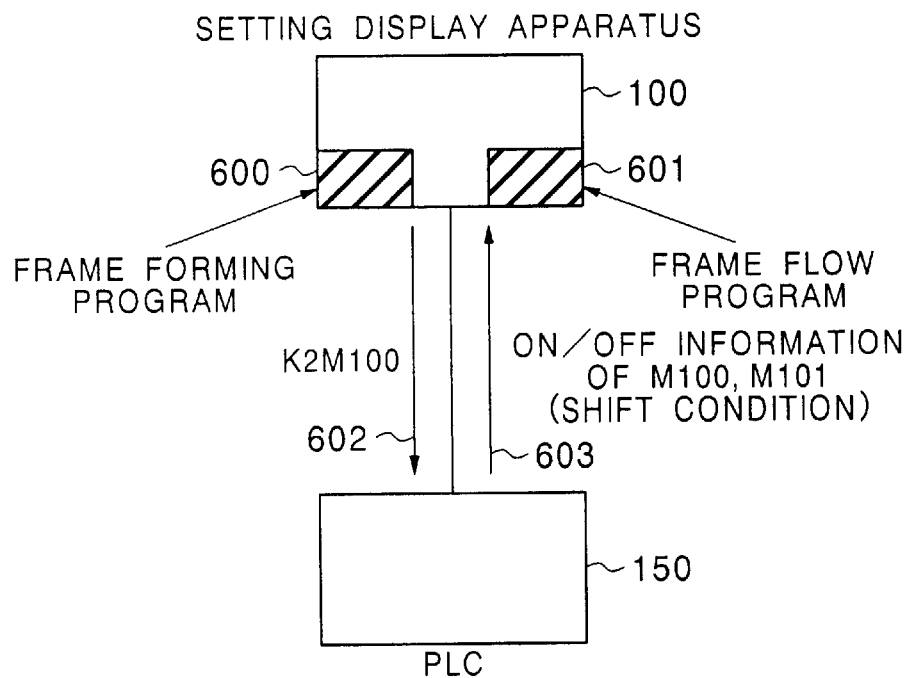
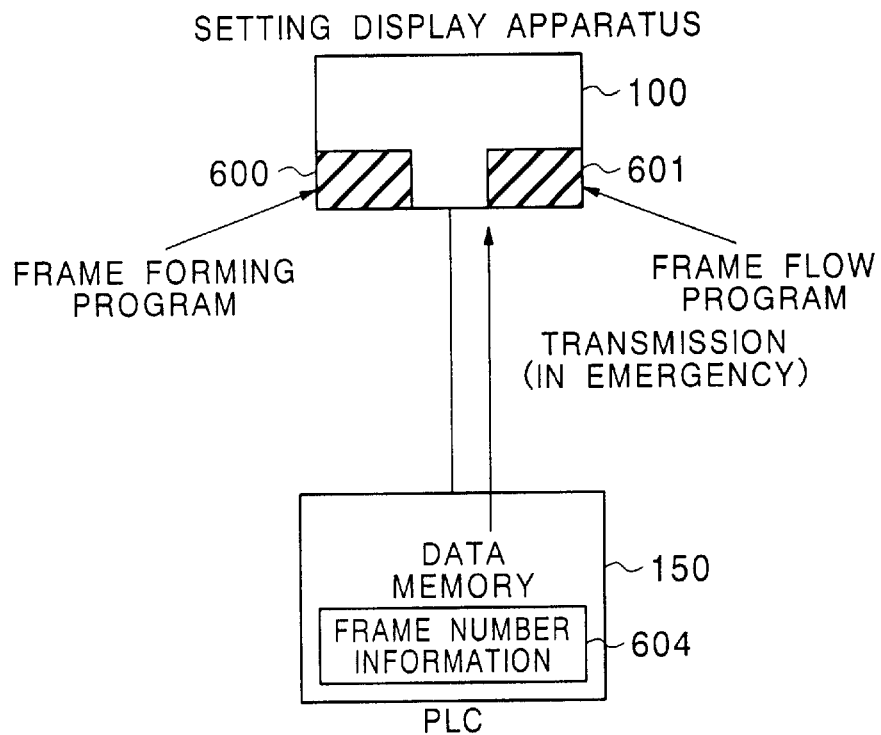

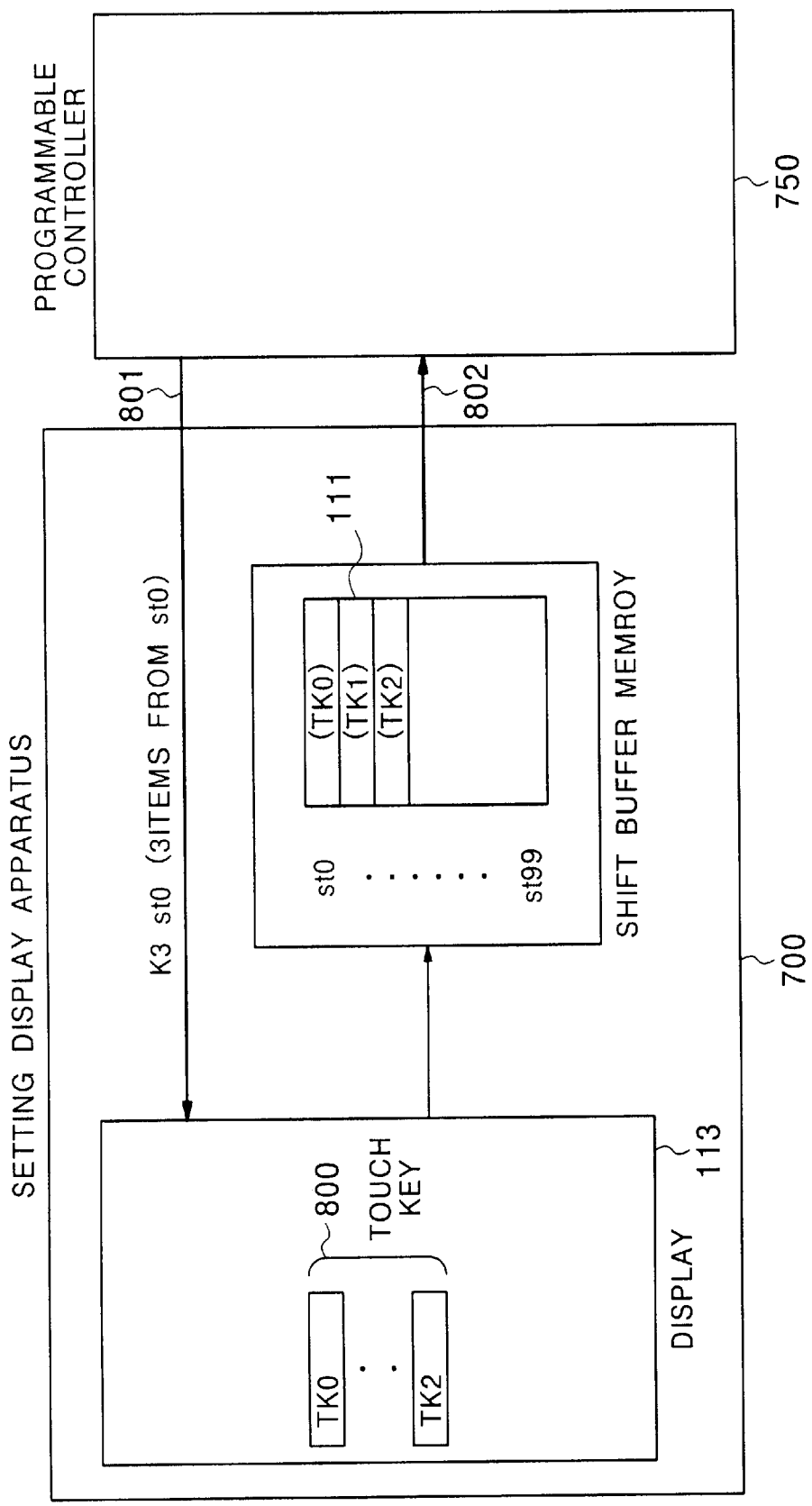

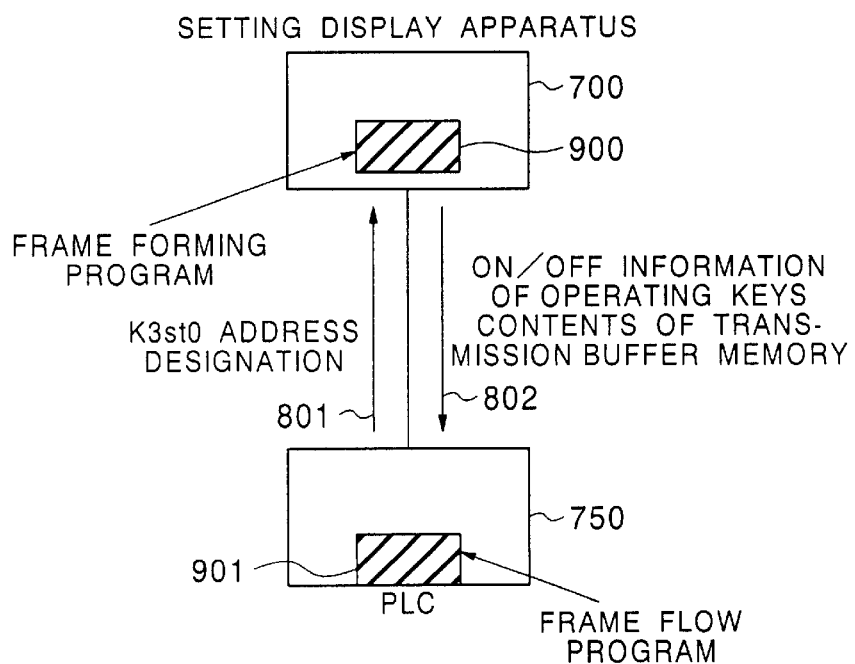
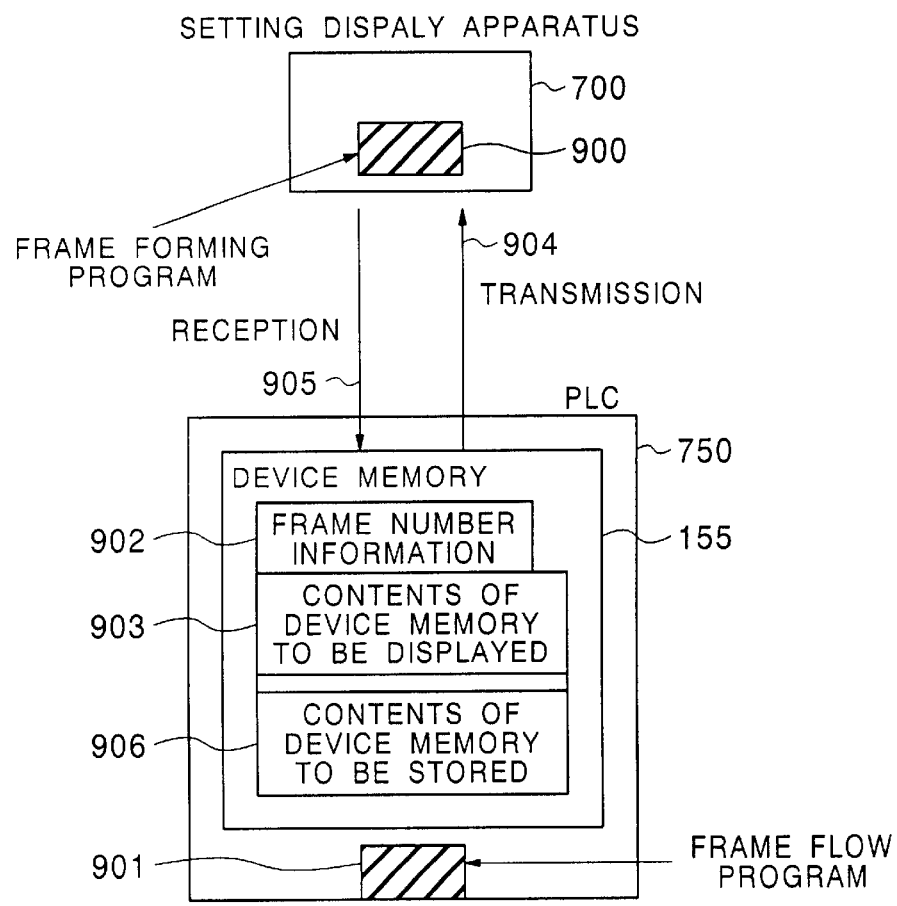

FIG. 11
(a)
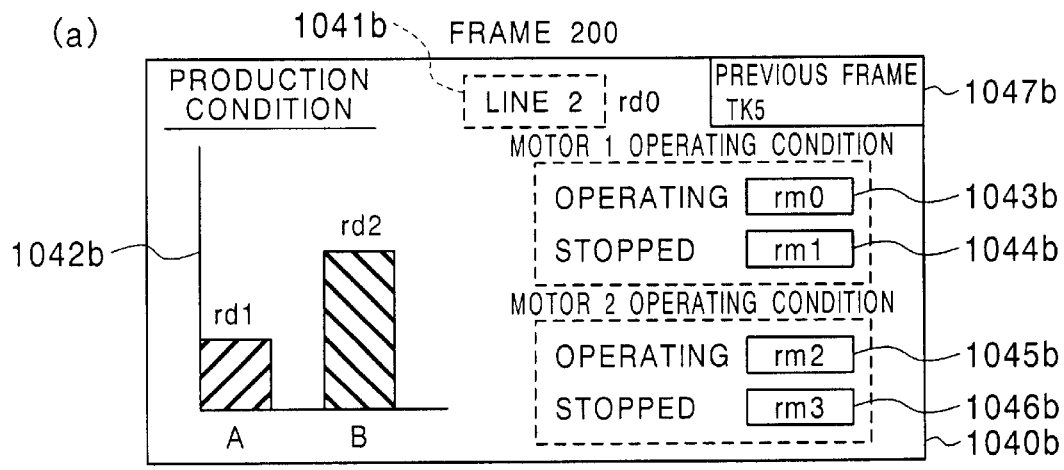
(b)
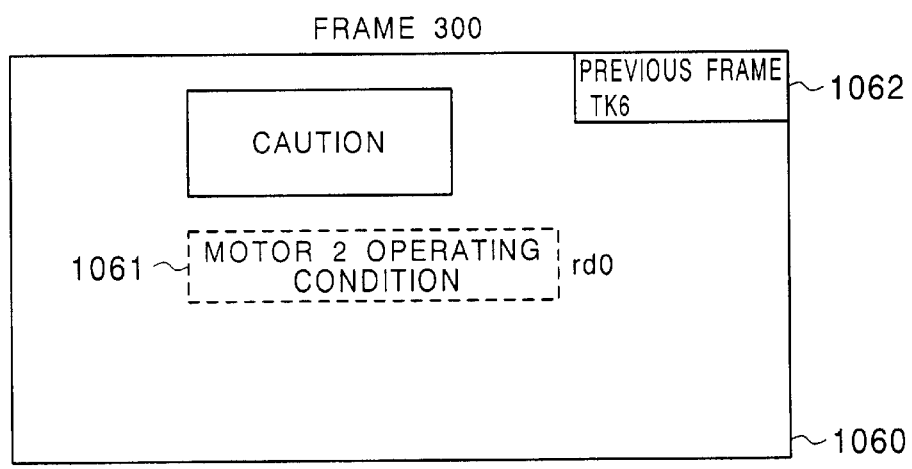
(c)
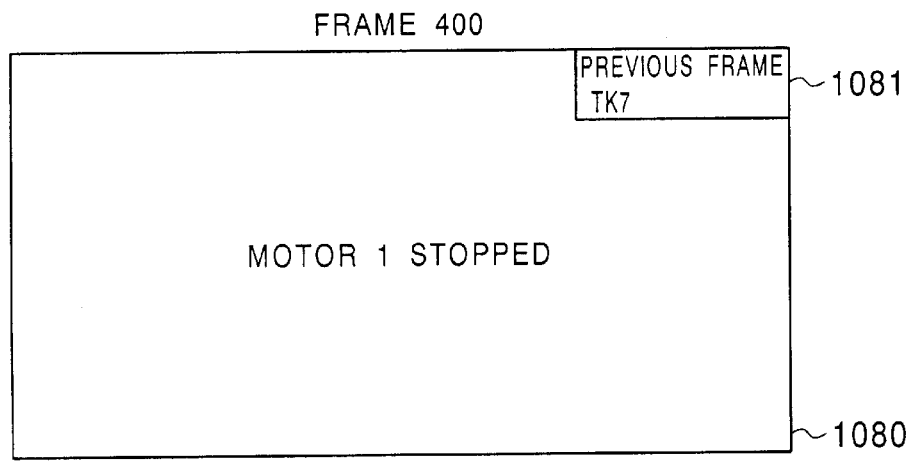

FIG. 16

```
<LIST PROGRAM>
BEGIN  ~1380
STL S13  ~1300a
DSP G9       ⎫
FROM K4M0    ⎬ ~1302a
TO K8D0      ⎭
LD TK0    ⎫ ~1360a
SET S14   ⎭
STL S14 ~1310a
DSP G10      ⎫
FROM K8D10   ⎬ ~1312a
TO K4 M10    ⎭
LD TK1    ⎫ ~1361a
SET S13   ⎭
LD TK2    ⎫ ~1362a
SET S100  ⎭
LD TK3    ⎫ ~1363a
SET S200  ⎭
LD M300   ⎫ ~1364a
SET S300  ⎭
LD M400   ⎫ ~1365a
SET S400  ⎭
STL S100  ~1320a
DSP G100     ⎫
FROM K3D20   ⎬ ~1322a
FROM K4M20   ⎭
LD TK4    ⎫ ~1366a
SET S14   ⎭
STL S200  ~1330a
DSP G100     ⎫
FROM K3D30   ⎬ ~1332a
FROM K4M30   ⎭
LD TK5    ⎫ ~1367a
SET S14   ⎭
STL S300  ~1340a
DSP G300a    ⎫
DSP G300b    ⎬ ~1342a
FROM K1D100  ⎭
LD TK6    ⎫ ~1368a
SET S14   ⎭
STL S400  ~1350a
DSP G400 ~1352a
LD TK7    ⎫ ~1369a
SET S14   ⎭
END  ~1381
```

FIG. 17
(a)
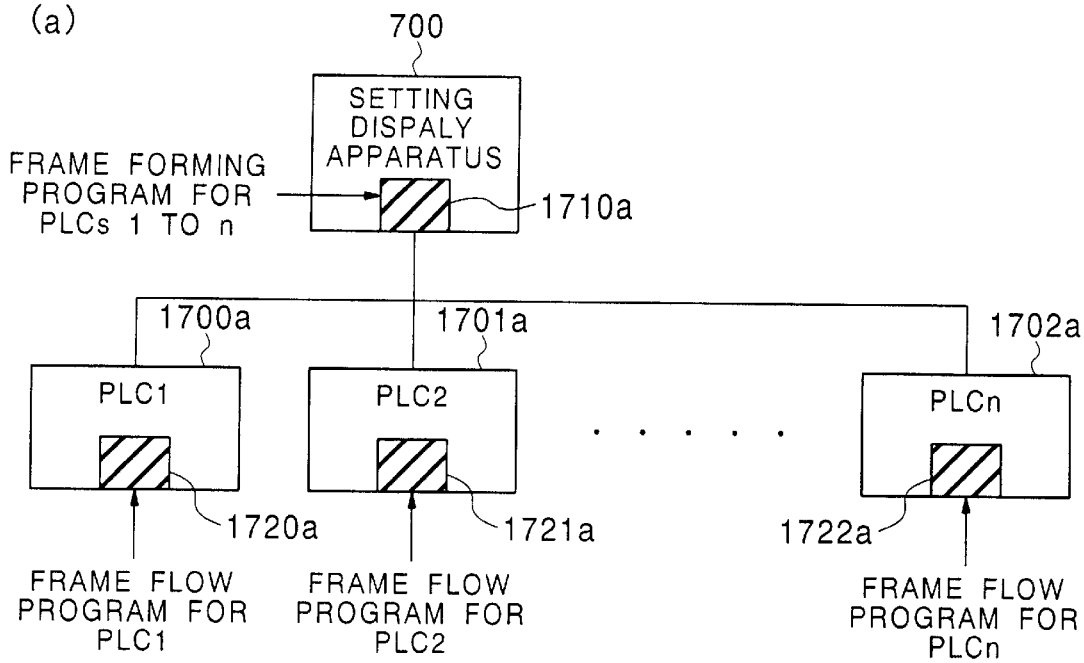
(b)
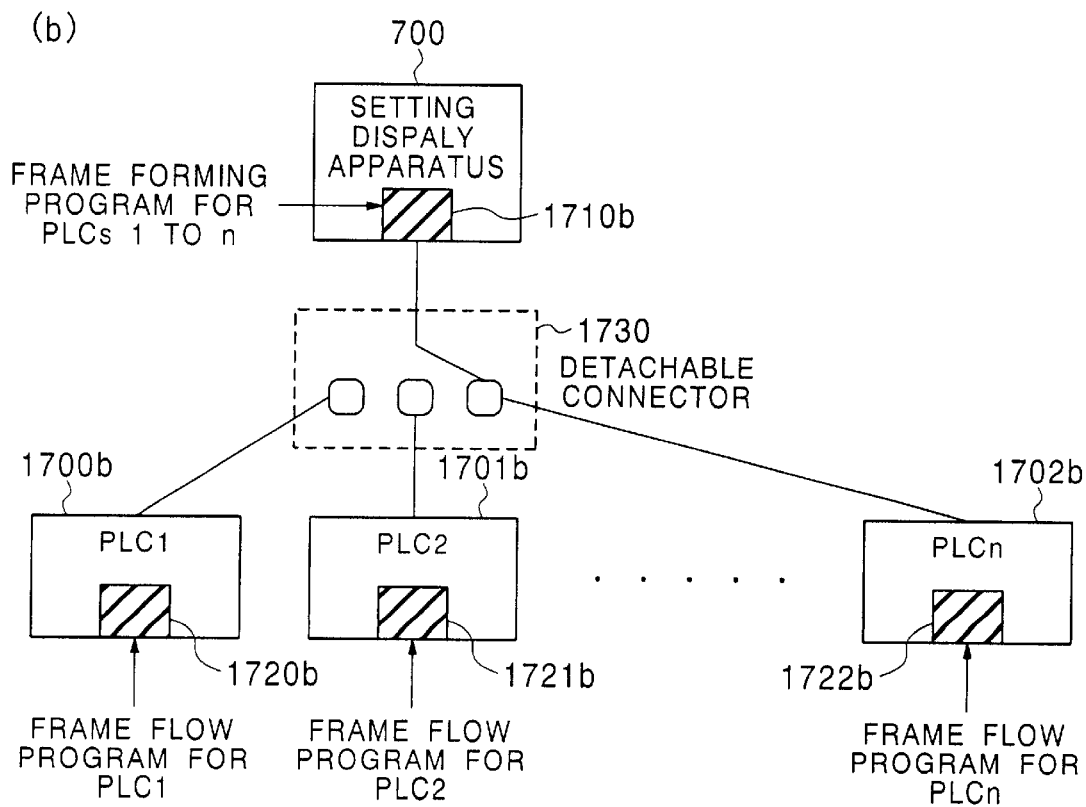

FIG. 18
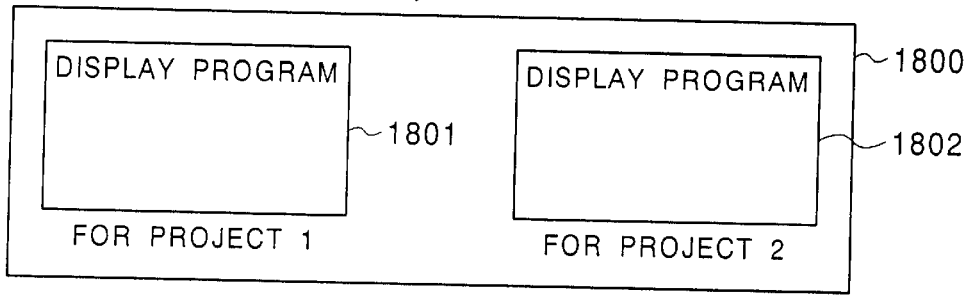
(a) <CONVENTIONAL METHOD>
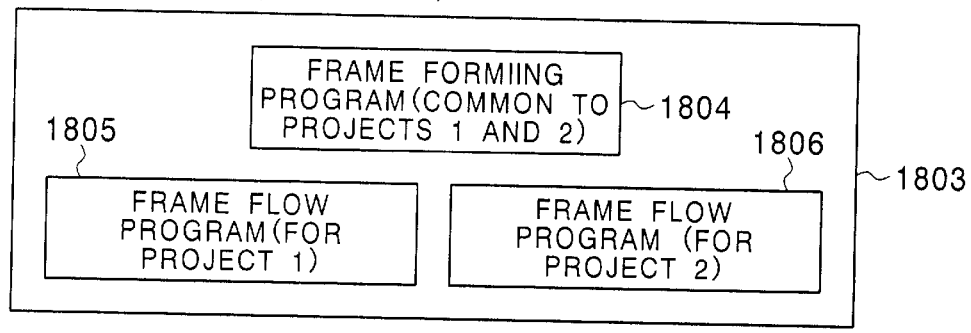
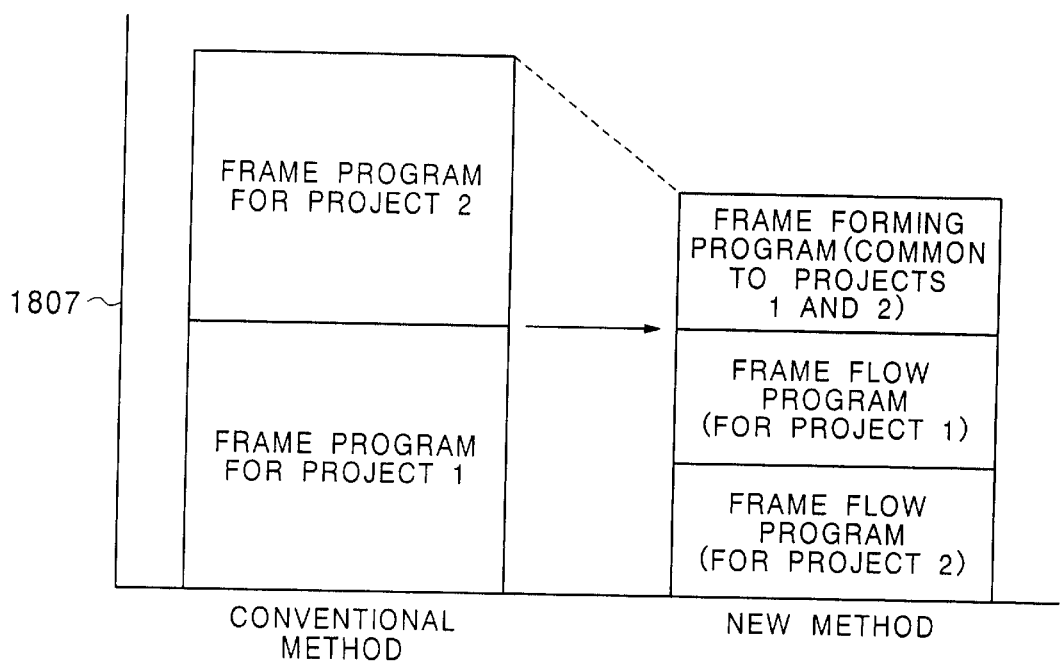

FIG. 19
(a)
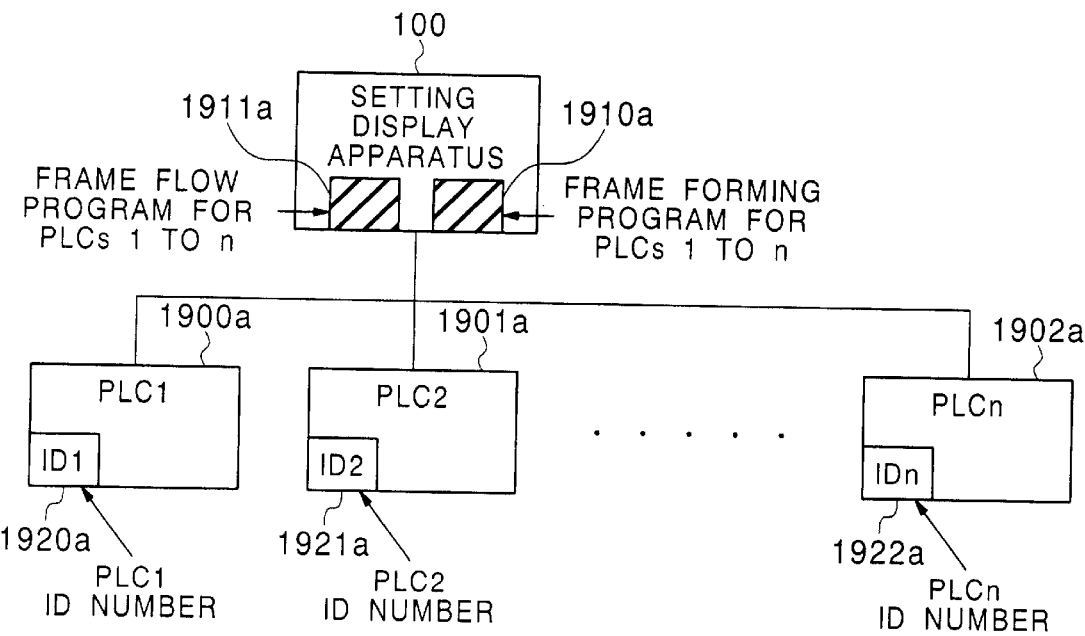
(b)
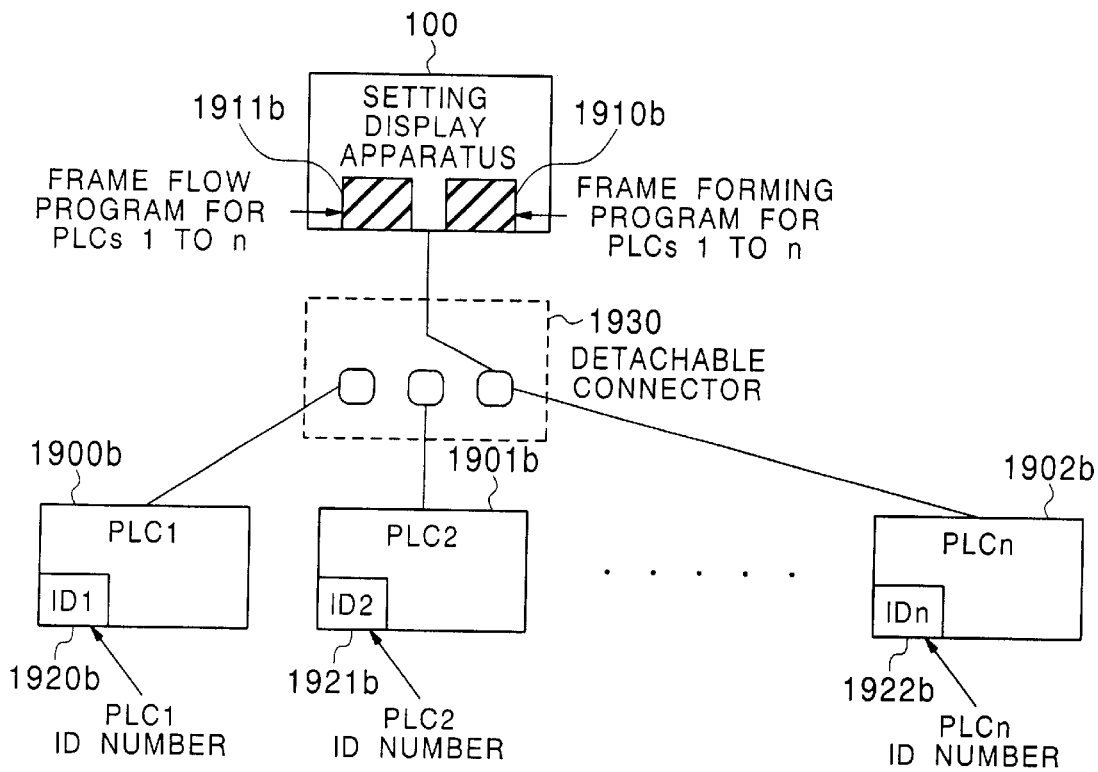

FIG. 21B

| STEP NUMBER | DISPLAY FRAME NUMBER | COMPONENT NAME (TOUCH KEY NAME) | FRAME CHANGE CONDITION | CHANGE DESTINATION STEP NUMBER | SUPERPOSED FRAME NUMBER | DISPLAYED DEVICE TOP ADDRESS (NUMBER OF NECESSARY ITEMS) | SET DEVICE TOP ADDRESS (NUMBER OF NECESSARY ITEMS) |
|---|---|---|---|---|---|---|---|
| 13 | 9 | TK0 (SETTING COMPLETION) | SETTING COMPLETION KEY = ON | 14 | | M0(4) | D0(8) |
| 14 | 10 | TK1 (PREVIOUS FRAME) | PREVIOUS FRAME KEY = ON | 13 | | D10(8) | M10(4) |
| 14 | 10 | TK2 (PRODUCTION CONDITION 1) | PRODUCTION CONDITION 1 KEY = ON | 100 | | D10(8) | M10(4) |
| 14 | 10 | TK3 (PRODUCTION CONDITION 2) | PRODUCTION CONDITION 2 KEY = ON | 200 | | D10(8) | M10(4) |
| 14 | 10 | M300 | M300 = 1 | 300 | | D10(8) | M10(4) |
| 14 | 10 | M400 | M400 = 1 | 400 | | D10(8) | M10(4) |
| 100 | 100 | TK4 (PREVIOUS FRAME) | PREVIOUS FRAME KEY = ON | 14 | | D20(3), M20(4) | |
| 200 | 100 | TK5 (PREVIOUS FRAME) | PREVIOUS FRAME KEY = ON | 14 | | D30(3), M30(4) | |
| 300 | 300a | TK6 (PREVIOUS FRAME) | PREVIOUS FRAME KEY = ON | 14 | 300b | D100(1) | |
| 400 | 400 | TK7 (PREVIOUS FRAME) | PREVIOUS FRAME KEY = ON | 14 | | | |

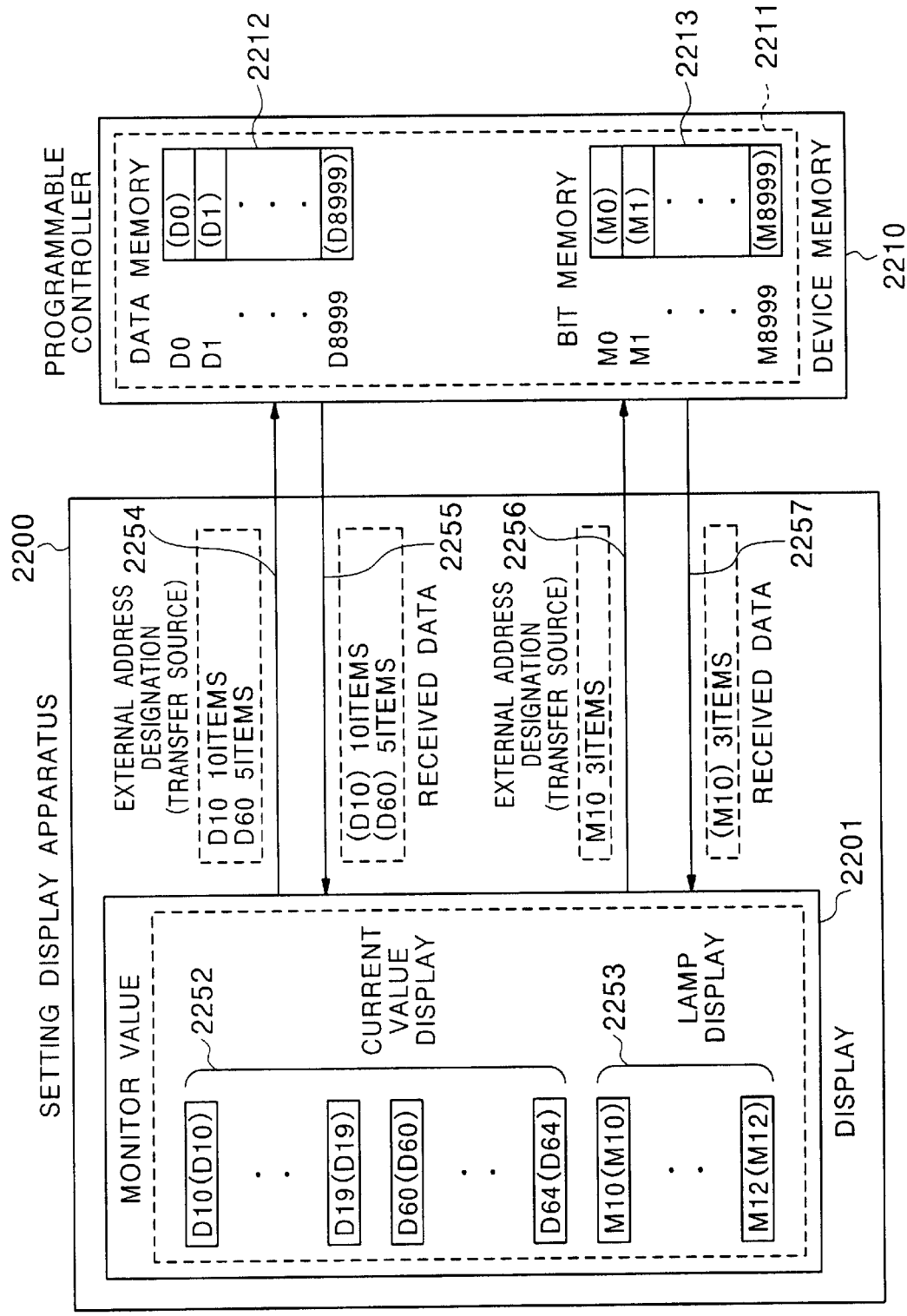

FIG. 23A
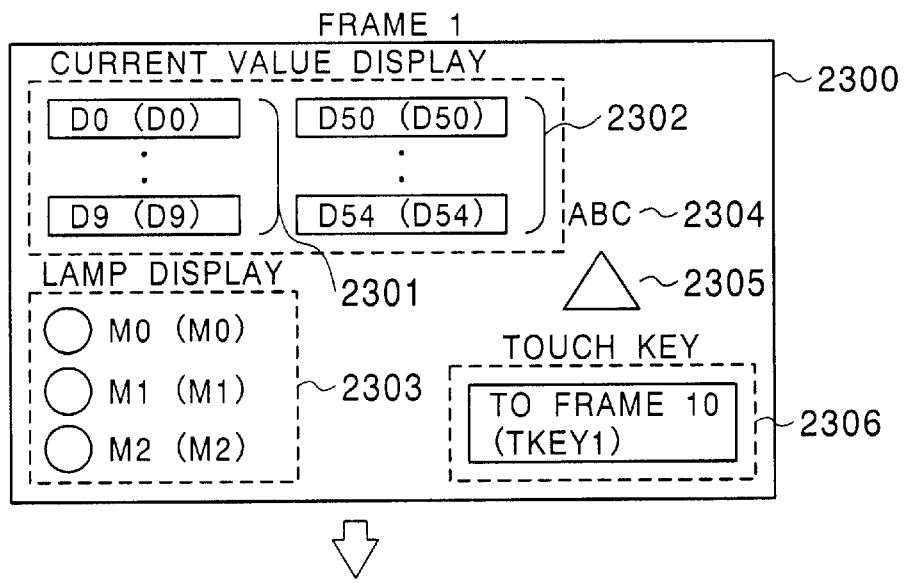

FIG. 23B

FRAME 2

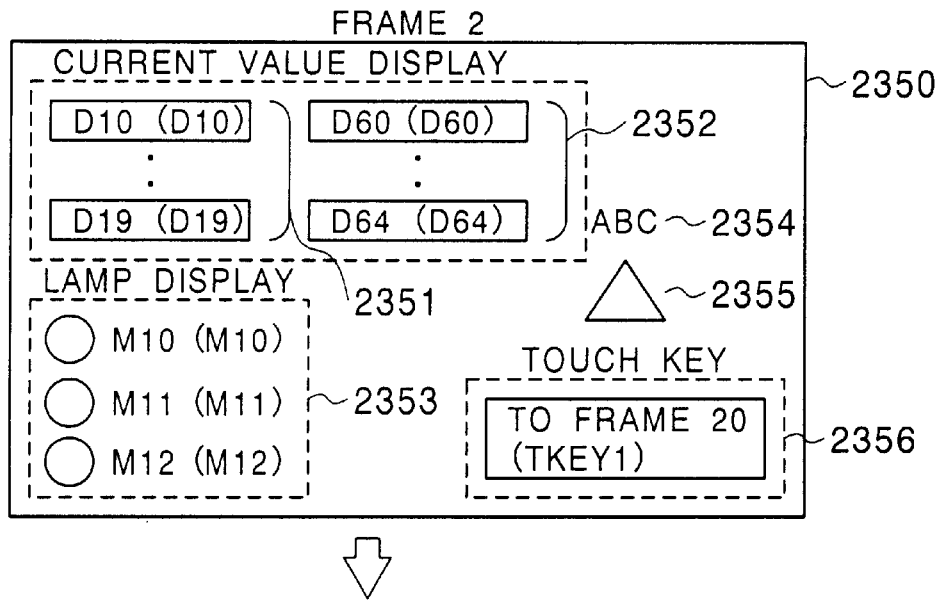

DISPLAY PROGRAM (FOR FRAME 2)

| LETTER | SIZE, COLOR |
| --- | --- |
|  | LAYOUT |

~2364

| FIGURE | SIZE, COLOR |
| --- | --- |
|  | LAYOUT |

~2365

| CURRENT VALUE DISPLAY | TOP DIRECT DESTINATION /SOURCE ADDRESS : D10 |
| --- | --- |
|  | NUMBER OF NECESSARY ITEMS (10) |
|  | POSITION, SIZE, COLOR |

~2361

| CURRENT VALUE DISPLAY | TOP DIRECT DESTINATION /SOURCE ADDRESS : D60 |
| --- | --- |
|  | NUMBER OF NECESSARY ITEMS (5) |
|  | POSITION, SIZE, COLOR |

~2362

| LAMP DISPLAY | TOP DIRECT DESTINATION /SOURCE ADDRESS : M10 |
| --- | --- |
|  | NUMBER OF NECESSARY ITEMS (3) |
|  | POSITION, SIZE, COLOR |

~2363

| FRAME SWITCHING SHIFT CONDITION | TOUCH KEY (TLK1) |
| --- | --- |
| SHIFT DESTINATION FRAME NUMBER | 20 |

~2366

~2360

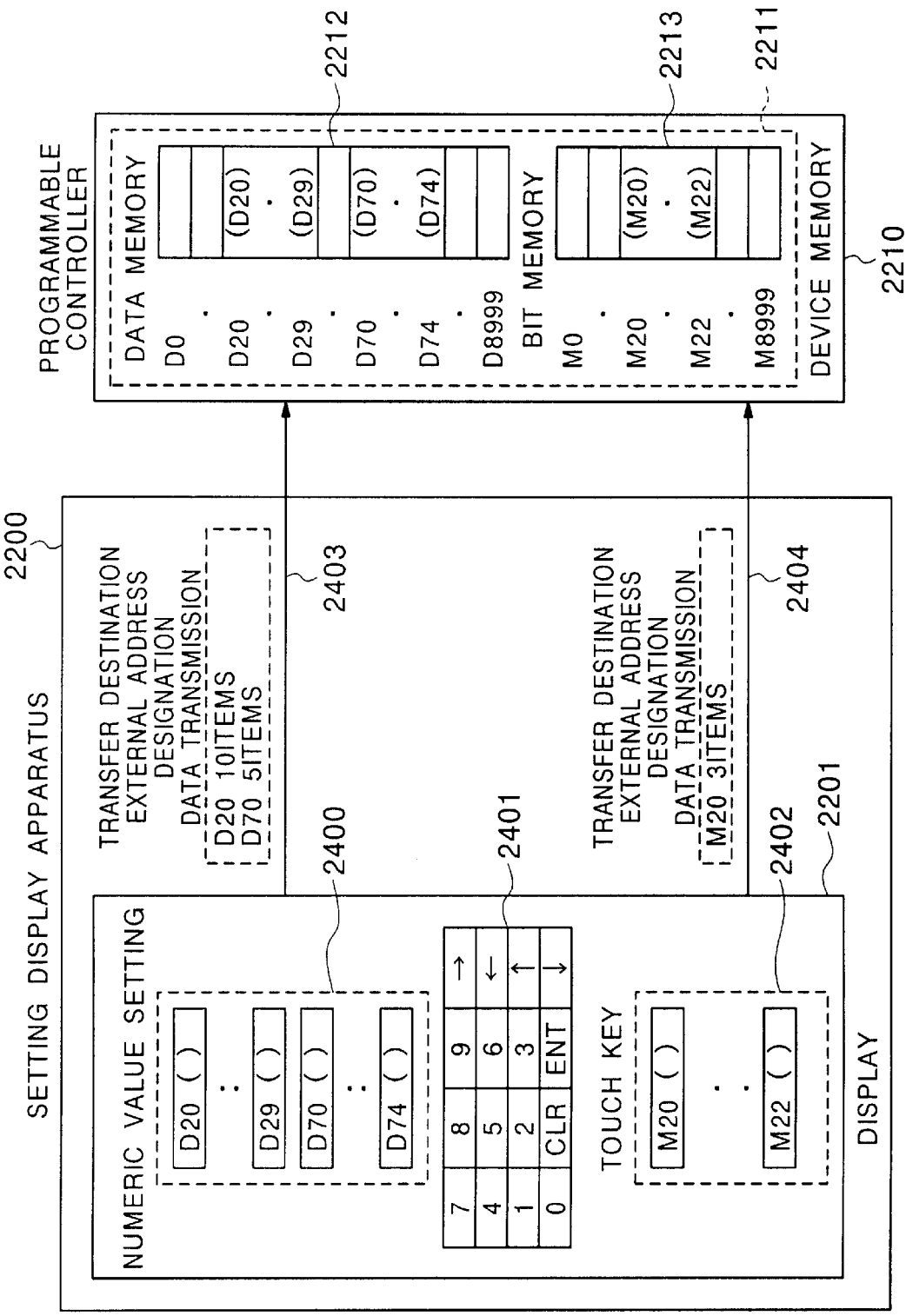

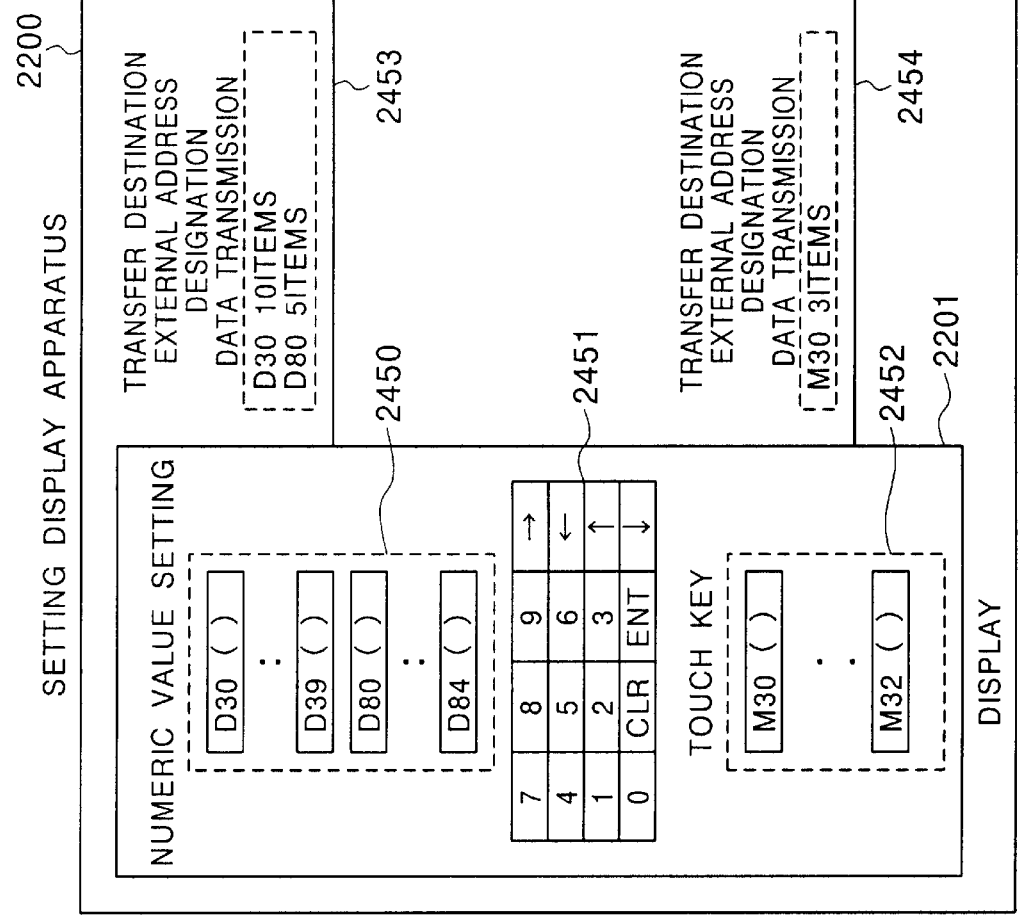

FRAME 3

DISPLAY PROGRAM (FOR FRAME 3)

FIG. 25B
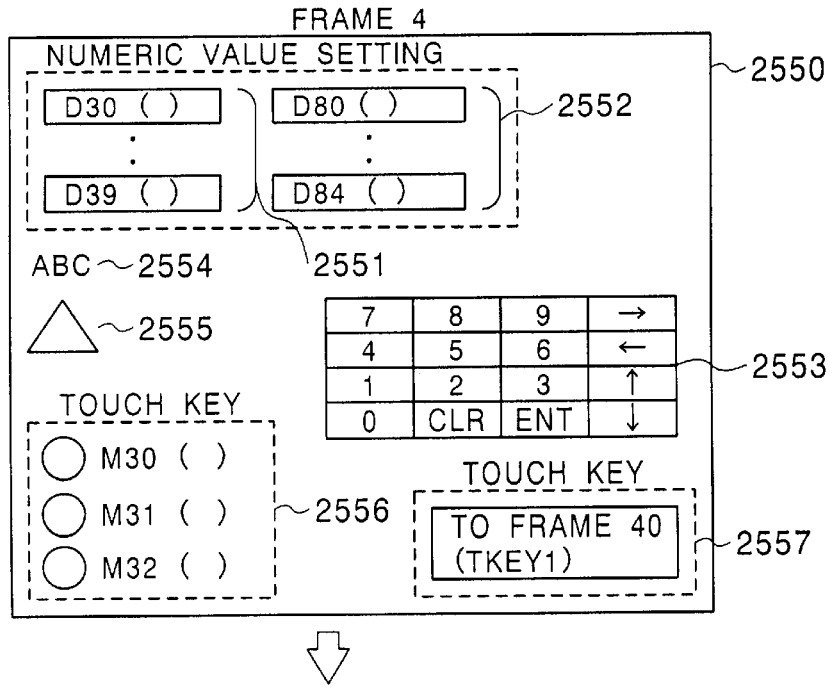

SETTING DISPLAY APPARATUS FOR A PROGRAMMABLE CONTROLLER

BACKGROUND OF THE INVENTION

1. Field of the Invention

The present invention relates to a setting display apparatus for a programmable controller which can be connected to an external unit such as a programmable controller and, more particularly, to a setting display apparatus for a programmable controller designed to improve means for preparing and editing an on-screen display program stored in the setting display apparatus.

2. Description of the Related Art (1) General Description of the Related Art Programmable controllers (hereinafter referred to as "PLC") are being used for sequential control of devices to be controlled.

Also, a setting display apparatus is used to display the state of data stored in a data storage of a PLC. The setting display apparatus is used to set data in the data storage of the PLC as well as to display the state of data stored in data storage. The setting display apparatus has a plurality of frames of image. An operator changes the frames by operating the device or a signal is supplied from the PLC to change one frame to another.

One PLC may be connected to one setting display apparatus for management of the PLC. Also, a plurality of PLCs may be connected to one setting display apparatus by a network to enable management of the plurality of PLCs through the one setting display apparatus.

Also, one setting display apparatus may be connected to one of a plurality of PLCs to be controlled by using a detachable connector when necessary.

For example, this method is often used for management of PLCs incorporated in robot controllers or the like.

A monitoring system for management of a multiplicity of mechanical components, e.g., one disclosed as "PC Monitoring System" in Japanese Patent Laid-open No. 5-313714 is known in which wireless communication is performed between one PLC and one portable monitoring apparatus. The states of input/output operations of a plurality of mechanical components controlled by the PLC can be monitored with the portable monitoring apparatus.

In this conventional art, the method of monitoring with the portable monitoring apparatus simply displays a list of ON/OFF states of the inputs and outputs and, therefore, a program for display on a screen of the portable monitoring apparatus may use only simple display contents common to the mechanical components.

A method for reducing image memory, e.g., the one disclosed as "Display Method for Operation Display of Programmable Controller" in Japanese Patent Laid-open No. 6-266419 is known in which a switchable display area where display contents can be changed is provided for the purpose of reducing the amount of image data in an operation display device. The switchable display area is overlaid on a fixed-frame area displayed on a display screen of the operation display device. The number of a fixed frame, the kind of display to be changed, etc., are designated from a PLC.

In short, this method is intended to reduce kinds of image to be stored in the operation display device by using an overlaying technique. With respect to this method, however, no mention has been made of kinds of image to be sequentially selected and designated.

Also, a method for reducing the amount of data to be transmitted, e.g., the one disclosed with respect to "Transmission Device between Man-machine Interface Device and Programmable Controller" in Japanese Patent Laid-open No. 6-35513 is known in which, to enable the amount of data transmitted between a man-machine interface device and a PLC to be reduced, frame contents to be displayed are separated into a variable display content group 1 representing the difference of operation monitoring targets and a variable display content group 2 indicating the states of the operation monitoring targets. The former display content group is transmitted by initial communication while the latter display content group is transmitted each time communication is performed.

According to this method, the PLC generates a frame number and display data on the basis of operation inputs to the man-machine interface. However, no concrete means for this process has been disclosed.

Also, a method for improving the degree of freedom of data setting, e.g., the one disclosed with respect to "Display Device and Programming Device" in Japanese Patent Laid-open No. 8-272571 is known in which a frame layout memory is provided in a display device to enable placement of a data setting area at an arbitrary position on a screen after placement of a data display area. Frame numbers and layout information are stored in the frame layout memory.

According to this method, a PLC transmits display data on the basis of an operation input to the display device. However, no concrete means for changing frames to be displayed has been disclosed.

(2) Description of Configuration of Related Art (FIG. 22)

FIGS. 22A and 22B are diagrams showing examples of monitoring communication operations in a conventional setting display apparatus 2200 and a PLC 2210. FIG. 22A is a diagram for explaining monitoring processes from the setting display apparatus 2200 of consecutive ten items, data registers D0 to D9 in a device memory 2211 of the PLC 2210, other consecutive five items, data registers D50 to D54 in the device memory 2211, and other consecutive three items, auxiliary relays M0 to M2 in the device memory 2211.

Referring to FIG. 22A, the setting display apparatus 2200 is connected to the PLC 2210, reads out monitoring information from the PLC 2210, and displays the monitoring information. A display 2201 displays letters, figures, values in a data memory 2212 described below, ON/OFF states of a bit memory 2213 described below, etc. Current value display components 2202 and lamp display components 2203 are provided on the display 2201.

Arrow 2204 represents transmitted data concerning the current value display components 2202, which is transmitted from the setting display apparatus 2200 to the PLC 2210. Arrow 2205 represents received data concerning the current value display components 2202, which is received from the PLC 2210 by the setting display apparatus 2200. Arrow 2206 represents transmitted data concerning the lamp display components 2203, which is transmitted from the setting display apparatus 2200 to the PLC 2210. Arrow 2207 represents received data concerning the lamp display components 2203, which is received from the PLC 2210 by the setting display apparatus 2200.

The PLC 2210 controls a machine which needs to be controlled. The device memory 2211 is, for example, a static random-access memory (SRAM) for storing data. The device memory 2211 includes the data memory 2212 and the bit memory 2213. The data memory 2212 stores the contents of the data registers in the device memory 2211. The bit memory 2213 stores information on the ON/OFF states of devices such as auxiliary relays in the device memory 2211.

FIG. 22B is a diagram for explaining monitoring processes from the setting display apparatus 2200 of consecutive ten items, data registers D10 to D19 in the device memory 2211 of the PLC 2210, other consecutive five items, data registers D60 to D64 in the device memory 2211, and other consecutive three items, auxiliary relays M10 to M12 in the device memory 2211.

In FIG. 22B, current value display components 2252 and lamp display components 2253 are provided on the display 2201. Arrow 2254 represents transmitted data concerning the current value display components 2252, which is transmitted from the setting display apparatus 2200 to the PLC 2210. Arrow 2255 represents received data concerning the current value display components 2252, which is received from the PLC 2210 by the setting display apparatus 2200. Arrow 2256 represents transmitted data concerning the lamp display components 2253, which is transmitted from the setting display apparatus 2200 to the PLC 2210. Arrow 2257 represents received data concerning the lamp display components 2253, which is received from the PLC 2210 by the setting display apparatus 2200.

The functions and operation of the related art shown in FIG. 22 will next be described.

In the following description, a symbol written as "D0", for example, denotes the data register with address 0, and a symbol written as "(D0)" denotes the contents of the data register D0 with address 0.

Similarly, a symbol written as "M0", for example, denotes the auxiliary relay with address 0, and a symbol written as "(M0)" denotes the ON/OFF state of the auxiliary relay M0 with address 0.

In the example of the related art shown in FIG. 22A, the current values of the ten items from D0, the current values of the five items from D50, and the current values of the three items from M0 in the PLC 2210 are indicated on the display 2201 of the setting display apparatus 2200.

First, the setting display apparatus 2200 transmits to the PLC 2210 data 2204 about the ten items from D0 and the five items from D50.

This transmitted data 2204 directly designates, in an external addressing system, the addresses in the data memory 2212 of the PLC 2210 to be accessed.

The setting display apparatus 2200 receives, as received data 2205, the contents of the data registers, i.e., the ten items from D0 and the five items from D50, in the data memory 2212 of the PLC 2210 on the basis of the designated addresses.

As a result, (D0) is displayed at the position D0 in the current value display components 2202 on the display 2201, (D1) at the position D1, . . . , (D9) at the position D9, (D50) at the position D50, . . . , and (D54) at the position D54.

Also, the setting display apparatus 2200 transmits to the PLC 2210 data 2206 about the three items from M0.

This transmitted data 2206 directly designates, in the external addressing system, the addresses in the bit memory 2213 of the PLC 2210 to be accessed.

The setting display apparatus 2200 receives, as received data 2207, the contents of the data registers, i.e., the three items from M0, in the bit memory 2213 of the PLC 2210.

As a result, (M0) is displayed at the position M0 in the lamp display components 2203 on the display 2201, (M1) at the position M1, and (M2) at the position M2.

In the example of the related art shown in FIG. 22B, the current values of the ten items from D10, the current values of the five items from D60, and the current values of the three items from M10 in the PLC 2210 are indicated on the display 2201 of the setting display apparatus 2200.

First, the setting display apparatus 2200 transmits to the PLC 2210 data 2254 about the ten items from D10 and the five items from D60.

This transmitted data 2254 comprises direct destination addresses directly designating the addresses in the data memory 2212 of the PLC 2210 to be accessed.

The setting display apparatus 2200 receives, as received data 2255, the contents of the data registers, i.e., the ten items from D10 and the five items from D60, in the data memory 2212 of the PLC 2210.

As a result, (D10) is displayed at the position D10 in the current value display components 2252 on the display 2201, (D11) at the position D11, . . . , (D19) at the position D19, (D60) at the position D60, . . . , and (D64) at the position D64.

Also, the setting display apparatus 2200 transmits to the PLC 2210 data 2256 about the three items from M10.

This transmitted data 2256 directly designates, in the external addressing system, the addresses in the bit memory 2213 of the PLC 2210 to be accessed.

The setting display apparatus 2200 receives, as received data 2257, the contents of the data registers, i.e., the three items from M10, in the bit memory 2213 of the PLC 2210.

As a result, (M10) is displayed at the position M10 in the lamp display components 2253 on the display 2201, (M11) at the position M11, and (M12) at the position M12.

The following can be understood from comparison between the examples shown in FIGS. 22A and 22B. Although the same numbers of items in the data memory and bit memory are monitored in the two examples, the target addresses in the data memories and bit memories in the two examples, sent as address information when the display apparatus 2200 requests the PLC 2210 to send data, differ from each other, so that the contents of the numeric value display and ON/OFF display obtained from the PLC 2210 on the basis of the address information differ from each other.

(3) Description of Configuration of Related Art (FIG. 23)

FIGS. 23A and 23B show monitoring programs in the related art.

FIG. 23A shows a frame 1 containing a combination of current value display components and lamp display components provided as monitor elements, and a program for displaying the frame 1.

Referring to FIG. 23A, the frame 1 indicated by 2300 is constituted by current value display components 2301 corresponding to consecutive ten items from D0, current value display components 2302 corresponding to consecutive five items from D50, lamp display components 2303 corresponding to consecutive three items from M0, a letter component 2304, a figure component 2305, and a frame change touch key 2306 which can be pressed to change the current frame to a frame designated by a frame number 10.

The frame 1 display program shown in the section indicated by 2310 is constituted by data 2314 on the size, color, layout of the letter components 2304 in the frame 1; data 2315 on the size, color, layout of the figure component 2305 in the frame 1; data 2311 on the current value display components 2301 in the frame 1; data 2312 on the current value display components 2302 in the frame 1; data 2313 on lamp display components 2303 in the frame 1; and data 2316 on the frame change touch key 2306 in the frame 1.

FIG. 23B shows a frame 2 containing a combination of current value display components and lamp display components provided as monitor elements, and a program for displaying the frame 2.

Referring to FIG. 23B, the frame 2 indicated by 2350 is constituted by current value display components 2351 corresponding to consecutive ten items from D10, current value display components 2352 corresponding to consecutive five items from D60, lamp display components 2353 corresponding to consecutive three items from M10, a letter component 2354, a figure component 2355, and a frame change touch key 2356 which can be pressed to change the current frame to a frame designated by a frame number 20.

The frame 2 display program shown in the section indicated by 2360 is constituted by data 2364 on the size, color, layout of the letter components 2354 in the frame 2; data 2365 on the size, color, layout of the figure component 2355 in the frame 2; data 2361 on the current value display components 2351 in the frame 2; data 2362 on the current value display components 2352 in the frame 2; data 2363 on lamp display components 2353 in the frame 2; and data 2366 on the frame change touch key 2356 in the frame 2.

The functions and operation of the related art with respect to the examples shown in FIGS. 23A and 23B will next be described.

In the example shown in FIG. 23A, the frame 1 (2300) has such settings that the ten items from D0 are displayed in the current value display components 2301, the five items from D50 are displayed in the current value display components 2302, the three items from M0 are displayed in the lamp display components 2303, letters A, B, and C are displayed in the letter component 2304, a triangle is displayed in the figure component 2305, and the frame change touch key 2306 initiates changing the current frame to frame 10 when pressed.

The corresponding display program will be described.

In the display program 2310, the size, color and position of the letters in the letter component 2304 are set as data 2314.

The size, color and position of the figure in the figure component 2305 are set as data 2315.

To display the current value display components 2301, the top external address D0, the number of the necessary items 10, and the position, size and color of each current value display are set as data 2311.

To display the current value display components 2302, the top external address D50, the number of the necessary items 5, and the position, size and color of each current value display are set as data 2312.

To display the lamp components 2303, the top external address M0, the number of the necessary items 3, and the position, size and color of each lamp display are set as data 2313.

With respect to the frame change touch key, the condition that the touch key (TKEY1) is ON for enabling the frame to be changed, and the shift destination frame number 10 are set as data 2316.

In the example shown in FIG. 23B, the frame 2 (2350) has such settings that the ten items from D10 are displayed in the current value display components 2351, the five items from D60 are displayed in the current value display components 2352, the three items from M10 are displayed in the lamp display components 2353, letters A, B, and C are displayed in the letter component 2354, a triangle is displayed in the figure component 2355, and the frame change touch key 2356 can initiate changing the current frame to frame 20 when pressed.

The corresponding display program will be described.

In the display program 2360, the size, color and position of the letters in the letter component 2354 are set as data 2364.

The size, color and position of the figure in the figure component 2355 are set as data 2365.

To display the current value display components 2351, the top external address D10, the number of the necessary items 10, and the position, size and color of each current value display are set as data 2361.

To display the current value display components 2352, the top external address D60, the number of the necessary items 5, and the position, size and color of each current value display are set as data 2362.

To display the lamp components 2353, the top external address M10, the number of the necessary items 3, and the position, size and color of each lamp display are set as data 2363.

With respect to the frame change touch key, the condition that the touch key (TKEY1) is ON for enabling the frame to be changed, and the shift destination frame number 20 are set as data 2366.

The following can be understood from comparison between the examples shown in FIGS. 23A and 23B. Even though the same numbers of items in the data memory and bit memory are monitored in the two examples, and even though the letters and figures in the two examples are identical in size, color and position, the frame 1 display program 2310 and the frame 2 display program 2360 are prepared separately from each other since the target addresses in the data memories and bit memories and the shift destination frame numbers in the two examples differ from each other.

(4) Description of Configuration of Related Art (FIG. 24)

FIGS. 24A and 24B show setting communication operations in the related art.

FIG. 24A is a diagram for explaining communication operations for enabling setting, from the setting display apparatus 2200, of devices: consecutive ten items from data register D20, other consecutive five items from data register D70, and other consecutive three items from auxiliary relay M20 in the device memory 2211 of the PLC 2210.

Referring to FIG. 24A, a group of numeric value setting components 2400, Which are displayed on the display 2201, a ten-key pad 2401 for inputting values to the numeric value setting component 2400, and a group of touch-key components 2402 are displayed on the display 2201. Arrow 2403 represents transmitted data concerning numeric value setting, which is transmitted from the setting display apparatus 2200 to the PLC 2210. Arrow 2404 represents transmitted data concerning touch key setting, which is also transmitted from the setting display apparatus 2200 to the PLC 2210.

FIG. 24B is a diagram for explaining communication operations for enabling setting, from the setting display apparatus 2200, of devices: consecutive ten items from data register D30, other consecutive five items from data register D80, and other consecutive three items from auxiliary relay M30 in the device memory 2211 of the PLC 2210.

Referring to FIG. 24B, a group of numeric value setting components 2450, which are displayed on the display 2201, a ten-key pad 2451 for inputting values to the numeric value setting component 2450, and a group of touch-key components 2452, which are displayed on the display 2201. Arrow 2453 represents transmitted data concerning numeric value setting, which is transmitted from the setting display apparatus 2200 to the PLC 2210. Arrow 2454 represents transmitted data concerning touch key setting, which is also transmitted from the setting display apparatus 2200 to the PLC 2210.

The operation will now be described.

In the example shown in FIG. 24A, values are set in the ten items from D20, in the five items from D70 and in the three items from M20 in the PLC 2210 by means of the display 2201 of the setting display apparatus 2200.

Setting values in the ten items from D20 and in the five items from D70 is performed by using the ten-key pad 2401. When numeric values are input through the ten-key pad 2401, the setting display apparatus 2200 transmits to the PLC 2210 data 2403 including the input numeric values and information consisting of the top external addresses of the devices, i.e., the ten items from D20 and the five items from D70, and the numbers of items.

As a result, information is written in the ten items from D20 and the five items from D70 in the data memory 2212 of the PLC 2210.

Setting values in the three items from M20 is performed by using the touch keys 2402. When ON/OFF information is input by means of the touch keys 2402, the setting display apparatus 2200 transmits to the PLC 2210 data 2404 including the input ON/OFF information and information consisting of the top external addresses of the devices, i.e., the three items from M20, and the number of items.

As a result, information is written in the three items from M20 in the bit memory 2213 of the PLC 2210.

In the example shown in FIG. 24B, values are set in the ten items from D30, in the five items from D80 and in the three items from M30 in the PLC 2210 by means of the display 2201 of the setting display apparatus 2200.

Setting values in the ten items from D30 and in the five items from D80 is performed by using the ten-key pad 2451. When numeric values are input by means of the ten-key pad 2451, the setting display apparatus 2200 transmits to the PLC 2210 data 2453 including the input numeric values and information consisting of the top external addresses of the devices, i.e., the ten items from D30 and the five items from D80, and the numbers of items.

As a result, information is written in the ten items from D30 and the five items from D80 in the data memory 2212 of the PLC 2210.

Setting values in the three items from M30 is performed by using the touch keys 2452. When ON/OFF information is input by means of the touch keys 2452, the setting display apparatus 2200 transmits to the PLC 2210 data 2454 including the input ON/OFF information and information consisting of the top external addresses of the devices, i.e., the three items from M30, and the number of items.

As a result, information is written in the three items from M30 in the bit memory 2213 of the PLC 2210.

The following can be understood from comparison between the examples shown in FIGS. 24A and 24B. Although the same numbers of items are set in the data memory and bit memory in the two examples, the target addresses in the data memories and bit memories in the two examples differ from each other, so that the contents of address information transmitted from the setting display apparatus 2200 to the PLC 2210 in the two examples differ from each other.

(5) Description of Configuration of Related Art (FIG. 25)

FIGS. 25A and 25B are diagrams showing setting programs for the conventional apparatus.

FIG. 25A shows a frame 3 containing a combination of numeric value setting components and touch key components provided as setting elements, and a program for displaying the frame 3.

Referring to FIG. 25A, the frame 3 indicated by 2500 is constituted by numeric value setting components 2501 corresponding to consecutive ten items from data register D20, numeric value setting components 2502 corresponding to consecutive five items from data register D70, a ten-key pad 2503 for setting values in the numeric value setting components 2501 and 2502, a letter component 2504, a figure component 2505, and touch key components 2506, and a frame change touch key 2507 which can be pressed to change the current frame to a frame designated by a frame number 30.

The frame 3 display program shown in the section indicated by 2510 is constituted by data 2513 on the ten-key pad 2503 in the frame 3; data 2514 on the letter component 2504 in the frame 3; data 2515 on the figure component 2505 in the frame 3; data 2511 on each of the numeric value setting components 2501 in the frame 3; data 2512 on each of the numeric value setting components 2502 in the frame 3; data 2516 on each of the touch key components 2506 in the frame 3; and data 2517 on the frame change touch key 2507 in the frame 3.

FIG. 25B shows a frame 4 containing a combination of numeric value setting components and touch key components provided as setting elements, and a program for displaying the frame 4.

Referring to FIG. 25B, the frame 4 indicated by 2550 is constituted by numeric value setting components 2551 corresponding to consecutive ten items from data register D30, numeric value setting components 2552 corresponding to consecutive five items from data register D80, a ten-key pad 2553 for setting values in the numeric value setting components 2511 and 2552, a letter component 2554, a figure component 2555, and touch key components 2556, and a frame change touch key 2557 which can be pressed to change the current frame to a frame designated by a frame number 40.

The frame 4 display program shown in the section indicated by 2560 is constituted by data 2563 on the ten-key pad 2553 in the frame 4; data 2564 on the letter component 2554 in the frame 4; data 2565 on the figure component 2555 in the frame 4; data 2561 on each of the numeric value setting components 2551 in the frame 4; data 2562 on each of the numeric value setting components 2552 in the frame 4; data 2566 on each of the touch key components 2556 in the frame 4; and data 2567 on the frame change touch key 2557 in the frame 4.

The operation will next be described.

In the example shown in FIG. 25A, the frame 3 (2500) has such settings that the ten items from D20 are set in the numeric value setting components 2501, the five items from D70 are set in the numeric value setting components 2502, the three items from M20 are set in the touch key components 2506, letters A, B, and C are displayed in the letter component 2504, a triangle is displayed in the figure component 2505, and the frame change touch key 2507 can initiate changing the current frame to frame 30 when pressed.

The corresponding display program 2510 will be described.

The size, color and position of the letters and figures in the ten-key pad 2503 are set as data 2513.

The size, color and position of the letters in the letter component 2504 are set as data 2514.

The size, color and position of the figure in the figure component 2505 are set as data 2515.

To display the numeric value setting components 2501, the top external address D20, the number of the necessary items 10, and the position, size and color of each component are set as data 2511.

To display the numeric value setting components 2502, the top external address D70, the number of the necessary items 5, and the position, size and color of each component are set as data 2512.

To display the touch key components 2506, the top external address M20, the number of the necessary items 3, and the position, size and color of each component are set as data 2516.

With respect to the frame change touch key, the condition that the touch key (TKEY1) is ON for enabling the frame to be changed, and the shift destination frame number 30 are set as data 2517.

In the example shown in FIG. 25B, the frame 4 (2550) has such settings that the ten items from D30 are set in the numeric value setting components 2551, the five items from D80 are set in the numeric value setting components 2552, the three items from M30 are set in the touch key components 2556, letters A, B, and C are displayed in the letter component 2554, a triangle is displayed in the figure component 2555, and the frame change touch key 2557 can initiate changing the current frame to frame 40 when pressed.

The corresponding display program 2560 will be described.

The size, color and position of the letters and figures in the ten-key pad 2553 are set as data 2563.

The size, color and position of the letters in the letter component 2554 are set as data 2564.

The size, color and position of the figure in the figure component 2555 are set as data 2565.

To display the numeric value setting components 2551, the top external address D30, the number of the necessary items 10, and the position, size and color of each component are set as data 2561.

To display the numeric value setting components 2552, the top external address D80, the number of the necessary items 5, and the position, size and color of each component are set as data 2562.

To display the touch key components 2556, the top external address M30, the number of the necessary items 3, and the position, size and color of each component are set as data 2566.

With respect to the frame change touch key, the condition that the touch key (TKEY1) is ON for enabling the frame to be changed, and the shift destination frame number 40 are set as data 2567.

The following can be understood from comparison between the examples shown in FIGS. 25A and 25B. Even though the same numbers of items are set in the data memories and bit memories in the two examples, and even though the letters and figures in the two examples are identical in size, color and position, the frame 3 display program 2510 and the frame 4 display program 2560 are prepared separately from each other since the target addresses in the data memories and bit memories and the shift destination frame numbers in the two examples differ from each other.

As is apparent from the foregoing, a program is prepared with respect to each frame number in the conventional display programming method.

For example, in the case of the monitoring frames shown in FIGS. 23A and 23B, the frames 1 and 2 have the same screen layout but the various devices have different addresses, so that different frame numbers are assigned to the frames.

Also, different destination frame numbers designating a destination when the touch key is pressed are set in the frames 1 and 2. Therefore, different frame numbers are necessarily set.

Similarly, in the case of setting frames shown in FIGS. 25A and 25B, the frames 3 and 4 have the same screen layout but the various devices have different addresses, so that different frame numbers are assigned to the frames.

Also, different destination frame numbers designating a destination when the touch key is pressed are set in the frames 3 and 4. Therefore, different frame numbers are necessarily set.

Thus, even a minute difference necessitates preparation of a display program related to each of particular frame numbers, resulting in a reduction in program preparation time efficiency and a considerable increase in capacity of the frame program memory necessary for the setting display apparatus.

In particular, in a case where one setting display apparatus is used for management of a plurality of PLCs, display contents vary with respect to PLCs incorporated in machines to be controlled.

In such a case, a plurality of groups of display programs (projects) exist in the program memory of the setting display apparatus and, therefore, the number of manageable projects (the kinds of machines to be controlled) depending upon the memory capacity of the setting display apparatus is considerably limited, which leads to a problem.

Further, for design of a display program, knowledge about two categories are required: the design factor relating to an appearance, e.g., the size, layout and color arrangement of letters and figures; and the contact factor relating to machine information, e.g., the selection of a frame change procedure and selection of devices which need exchange of information with a PLC. Conventionally, display programs are prepared in such a manner that such factors are inseparably combined. Therefore, there is a management problem that a designer regarding an appearance as important and a control engineer regarding a sequence as important cannot efficiently prepare an improved display program in cooperation with each other by taking over proper portions of the work for preparing the program.

SUMMARY OF THE INVENTION

In view of the above-described problems, an object of the present invention is to provide a setting display apparatus for a programmable controller capable of improving the understandability of a display program, the design efficiency and the facility of allotment of design work.

Another object of the present invention is to provide a setting display apparatus for a programmable controller capable of effectively reducing the total program memory capacity, even if which is connected to a plurality of programmable controllers.

In view of the above objects, a setting display apparatus for programmable controller according to this invention comprises: a first CPU capable of operating in accordance with a user program stored in a first memory; a reception buffer memory for temporally storing received data; operating keys for performing various kinds of input; and a switchable display capable of switching a plurality of frames, the apparatus being capable of being connected to one programmable controller having a second CPU capable of operating in accordance with a user program stored in a second memory, and a device memory in which control information is stored, wherein communication of various signals including contents of the device memory is performed between the first and second CPUs; a display program for display on the switchable display is divided into a frame flow program and a frame forming program for forming a basic frame; the frame forming program includes basic frame number information, address information about the device memory from which a content display is to be made, information on the size of a letter and a figure on a frame, and information on a layout of data displayed on the frame; and the frame flow program includes individual frame number information, target basic frame number information, address information about the device memory from which a content display is to be made, a frame switching shift condition, and shift destination individual frame number information.

The information on the address in the device memory in the frame forming program may comprise an address number in the reception buffer memory; the address information about the device memory in the frame flow program is constituted by a number or consecutive numbers designated by a top address number in the device memory and the number of necessary items in the device memory; and address numbers in the reception buffer memory and address numbers in the device memory correspond to each other in numerical order.

Further, a transmission buffer memory in which information on operations of the operating keys is stored may be disposed, wherein the frame forming program includes address information about the transmission buffer memory transmitted to the second CPU; the frame flow program includes address information based on a top address number and the number of necessary items in the device memory defining an address at which a content of the transmission buffer memory is stored; and address numbers in the transmission buffer memory and address numbers in the device memory correspond to each other in numerical order.

Further, in the apparatus according to the present invention, the frame flow program and the frame forming program may be stored in the first memory, and the switching shift condition information in the frame flow program may be constituted by an operating key number of the operating keys and on/off information about the operating keys or on/off information from a designated number in a bit memory transmitted from the second CPU on the basis of a request from the first CPU.

In the apparatus according to the present invention, individual frame number information designated by the second CPU may be stored in a data memory at a particular address in the device memory, and the first CPU may receive the individual frame number information and may display a frame of the designated number with priority.

Also, in the apparatus according to the present invention, the frame forming program may be stored in the first memory; the frame flow program may be stored in a portion of the second memory; the switching shift condition information in the frame flow program may be constituted by the bit memory number and on/off information in the same or on/off information about the operating keys of a designated number transmitted from the first CPU on the basis of a request from the second CPU; individual frame number information to be displayed may be stored in a data memory at a particular address in the device memory; and the first CPU may receive the individual frame number information and may display a frame of the designated number.

In the apparatus according to the present invention, the content of the data memory to be displayed within the frame may be transmitted from the second CPU to the first CPU together with the individual frame number information stored in the data memory at the particular address.

In the apparatus according to the present invention, the frame flow program may be expressed in a diagram in the form of a sequential flowchart in which are connected step blocks having numbers corresponding to individual frame numbers, and output blocks in each of which the number of a basic frame to be displayed with respect to the corresponding step block and information on the number of the device memory to be managed through the frame corresponding to the basic frame number are described, and contact blocks in which shift description branching and shifting lines, and shift conditions are described.

In the apparatus according to the present invention, information on the number of the device memory in which information about the operation of the operating keys of the setting display apparatus to be stored may be added to the corresponding output block.

Also, in the apparatus according to the present invention, if a plurality of output blocks may be annexed to one of the step blocks, basic frames of a plurality of numbers designated may be displayed in a superposed state.

In the apparatus according to the present invention, a plurality of the programmable controllers to be connected may be disposed. The apparatus further may comprise selective connection means for selectively connecting the setting display apparatus and one of a plurality of the programmable controllers and for changing the connection between the setting display apparatus and the programmable controllers; communication of various signals including contents of the device memory is performed between the first CPU and the second CPU incorporated in one of the programmable controllers selectively connected; a display program for display on the switchable display is divided into a frame flow program prepared with respect to each programmable controller and a frame forming program prepared with respect to each of basic frames and used in common for the programmable controllers; the frame forming program includes basic frame number information, address information about the device memory from which a content display is to be made, information on the size of a letter and a figure on a frame, and information on a layout of data displayed on the frame; and the frame flow program includes individual frame number information, target basic frame number information, address information about the device memory from which a content display is to be made, a frame switching shift condition, and shift destination individual frame number information.

In the apparatus according to the present invention, the frame flow program may be divided according to a project number corresponding to one of the programmable controllers as a target of processing; the frame forming program and all the frame flow programs may be stored in the first memory; and the setting display apparatus may receive an identification number of one of the programmable controllers selectively connected and may execute the frame flow program having the project number corresponding to the identification number.

In the apparatus according to the present invention, the frame flow program may be stored in the second memory of each programmable controller selected as a target, and frame display may be performed by the frame forming program stored in the first memory and the frame flow program in the programmable controller selectively connected.

Also, in the apparatus according to the present invention, the setting display apparatus may be constructed as a portable structure selectively connected to one of the programmable controllers by a detachable connector and a cable.

In the apparatus according to the present invention, the setting display apparatus and the plurality of programmable controllers may be connected by a 1:N network communication circuit, and communication may be selectively performed between the setting display apparatus and one of the programmable controllers selected by an operating key or the like of the setting display apparatus.

BRIEF DESCRIPTION OF THE DRAWINGS

FIG. 1 is a diagram showing the configuration of a setting display apparatus for a programmable controller in Embodiment 1 of the present invention;

FIGS. 2A and 2B are diagrams showing the monitoring communication operation of the apparatus shown in FIG. 1;

FIGS. 6A and 6B are diagrams showing the external control shift operation of the setting display apparatus in Embodiment 1 shown in FIG. 1;

FIG. 8 is a diagram showing the frame change operation of the apparatus shown in FIG. 7;

FIGS. 9A and 9B are diagrams showing the shift operation of the apparatus shown in FIG. 7;

FIGS. 11(a), (b), (c) are sectional diagrams showing examples of other frames displayed by the setting display apparatus in Embodiment 3 of the present invention;

FIG. 16 is a diagram showing a list program in Embodiment 3 of the present invention;

FIGS. 17(a), (b) are diagrams showing the configuration of a setting display apparatus for a programmable controller in Embodiment 4 of the present invention;

FIGS. 18(a), (b) are diagrams showing projection division in the apparatus shown in FIGS. 17A and 17B;

FIGS. 19(a), (b) are diagrams showing the configuration of a setting display apparatus for a programmable controller in Embodiment 5 of the present invention;

FIGS. 21A and 21B are diagrams showing a program table in Embodiment 6 of the present invention;

FIGS. 22A and 22B are diagrams showing the monitoring communication operation of a conventional apparatus;

FIGS. 23A and 23B are diagrams showing monitoring programs in the conventional apparatus;

FIGS. 24A and 24B are diagrams showing the setting communication operation of the conventional apparatus; and FIGS. 25A and 25B are diagrams showing the setting programs in the conventional apparatus.

DESCRIPTION OF THE PREFERRED EMBODIMENTS

Embodiment 1 (FIG. 1)

Figure 3A:
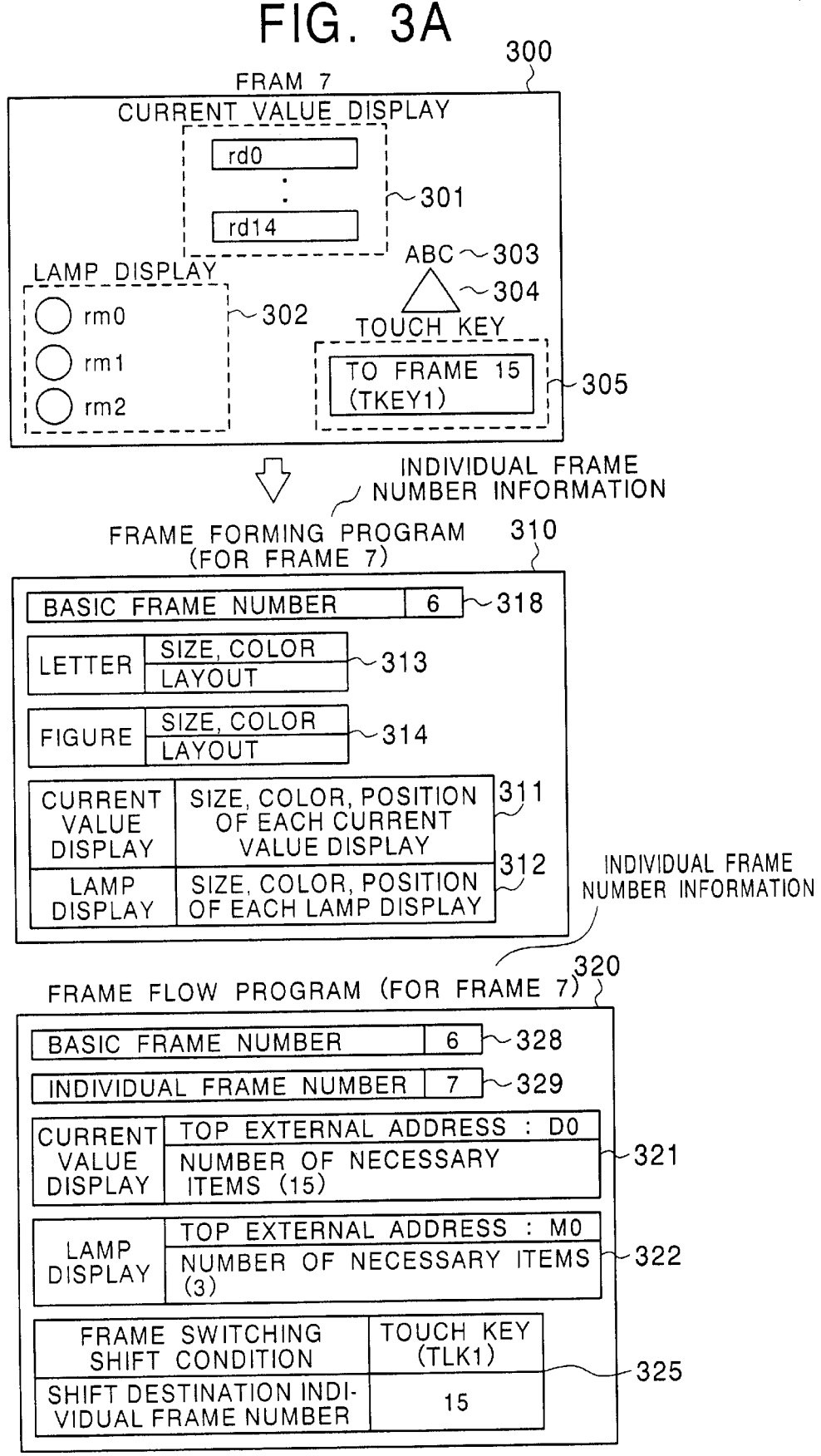
FIGS. 3A and 3B are diagrams showing monitoring programs in the apparatus shown in FIG. 1.

A setting display apparatus for a programmable controller which represents a first embodiment of the present invention will be described with reference to FIG. 1 which is a diagram showing the configuration of a system in which the setting display apparatus is used.

Referring to FIG. 1, a programmable controller setting display apparatus 100 is connected to a programmable controller (hereinafter referred to as "PLC") 150 described below. The setting display apparatus 100 is arranged to write setting information to the PLC and to read out monitoring information from the PLC. The setting display apparatus 100 has a means for controlling its internal operations, e.g., a first 32-bit central processing unit (CPU) 101. A system memory 102 such as a flash memory or an electrically erasable programmable read-only memory (EEPROM) is connected to the first CPU 101 by a bus. A program memory (first memory) 103 such as a flash memory or an EEPROM is connected to the first CPU 101 by the bus and is used to store information prepared by a user. A random-access memory (RAM) 104 such as a static RAM (SRAM) is connected to the first CPU 101 by the bus and is used to temporarily store data.

A reception buffer memory 105 such as a SRAM is connected to the first CPU 101 by the bus and is used to temporarily store data received from the PLC 150. The receiving buffer memory 105 includes a data memory 106 for storing the contents of data registers received from the PLC 150, and a bit memory 107 for storing information on the ON/OFF states of the devices received from the PLC 150. A transmission buffer memory 108 such as a SRAM is connected to the first CPU 101 by the bus and is used to temporarily store data to be transmitted to the PLC 150. The transmission buffer memory 108 includes a data memory 109 for storing the contents of data registers to be transmitted to the PLC 150, and a bit memory 110 for storing ON/OFF information about the devices to be transmitted to the PLC 150. A shift buffer memory 111 such as a SRAM is connected to the first CPU 101 by the bus and is used to temporarily store information on the state of an operating key having a frame changing function.

Operating keys 112 are connected to the first CPU 101 and are operated to set data in the PLC 150 or to provide various instructions to the PLC 150. A display (switchable display device) 113 is connected to the first CPU 101 by the bus and displays letters, figures, values in the data memories, and the ON/OFF states of the bit memories. A programming tool 114 such as a personal computer is for preparing a program for displaying such contents on the display 113. An interface circuit 115 is provided to enable data exchange between the programming tool 114 and the setting display apparatus 100 when the programming tool 114 and the setting display apparatus 100 are connected to each other. An interface circuit 116 is provided to enable data exchange between the setting display apparatus 100 and the PLC 150 when the setting display apparatus 100 and the PLC 150 are connected to each other.

The programmable controller (PLC) 150 controls a machine which needs to be controlled. The PLC 150 has a means for controlling its internal operations, e.g., a second 32-bit CPU 151. A system memory 152 such as a flash memory or an EEPROM is connected to the second CPU 151 by the bus. A program memory (second memory) 153 such as a flash memory or an EEPROM is connected to the second CPU 151 by the bus and is used to store information prepared by a user. A RAM 154 such as a SRAM is connected to the second CPU 151 by the bus and is used to temporarily store data. A device memory 155 such as a SRAM is connected to the second CPU 151 by the bus and is used to store various sorts of control information. The device memory 155 includes a data memory 156 for storing the contents of data registers, and a bit memory 157 for storing information on the ON/OFF states of the devices.

An input signal 158 is input from an external device to the PLC 150. An input processing section 159 processes the input signal so that the signal is formed in a format suitable for input to the second CPU 151. An output signal 160 is output to control the external device. An output signal processing section 161 processes an output from the second CPU 151 to produce the output signal supplied to the external device.

A programming tool 162 such as a personal computer for preparing a program for controlling the above-described PLC 150 is provided. An interface circuit 163 is provided to enable data exchange between the programming tool 162 and the PLC 150 when the programming tool 162 and the PLC 150 are connected to each other. An interface circuit 164 is provided to enable data exchange between the above-described setting display apparatus 100 and the PLC 150 when the setting display apparatus 100 and the PLC 150 are connected to each other.

The operation of the embodiment will now be described.

In the programmable controller setting display apparatus 100 of this embodiment arranged as shown in FIG. 1, a display program prepared by the programming tool 114 is stored in the program memory 103 provided in the setting display apparatus 100 through the first CPU 101.

In the program memory 153 provided in the PLC 150, a sequence program prepared by the programming tool 162 is stored through the second CPU 151.

The setting display apparatus 100 and the PLC 150 are connected by serial connection through the interface circuits 116 and 164, and the contents of some of a multiplicity of areas in the device memory 155 are transmitted as monitoring information to the reception buffer memory 105.

The contents of the transmission buffer memory 108 are transmitted as setting/control information to some of the multiplicity of areas in the device memory 155.

The state of the operating key having the frame change function is stored in the shift buffer memory 111, and the setting display apparatus 100 refers to the contents of the shift buffer memory 111 when a frame should be changed.

Examples of sorts of information communicated between the setting display apparatus 100 and the PLC 150, according to the display program stored in the program memory 103, will be successively described on the basis of FIGS. 2 to 5.

The following are addresses for sorts of information communicated.

Data memory 106 in reception buffer memory 105: rd0 to rd99,
Bit memory 107 in reception buffer memory 105: rm0 to rm99,
Data memory 109 in transmission buffer memory 108: sd0 to sd99,
Bit memory 110 in transmission buffer memory 108: sm0 to sm99,
Data memory 156 in device memory 155:
D0 to D8999 (data registers), and
Bit memory 157 in device memory 155:
M0 to M8999 (auxiliary relays)

In the following description, a symbol written as "D10" or "M10", for example, denotes the tenth of data registers D or the tenth of auxiliary relays M, and a symbol written as "(D10)" or "(M10)" denotes the contents of data register D10 or auxiliary relay M10.

FIGS. 2A and 2B are diagrams for explaining the monitoring communication operation of the apparatus in Embodiment 1 shown in FIG. 1.

FIG. 2A is a diagram for explaining monitoring processes from the setting display apparatus 100 of consecutive fifteen items from data register D0 and consecutive three items from auxiliary relay M0 in the device memory 155 of the PLC 150.

Referring to FIG. 2A, the setting display apparatus 100 transmits to the PLC 150 data 200 which is information on the numbers of the devices to be monitored. A frame flow program 201 includes as its contents this transmitted data, basic frame number information and individual frame number information. Current value display components 202 and lamp display components 203 are displayed on the display 113. A frame forming program 204 includes as its contents the current value display components 202, the lamp display components 203, and a basic frame number.

FIG. 2B is a diagram for explaining monitoring processes from the setting display apparatus 100 of consecutive fifteen items from data register D20 and consecutive three items from auxiliary relay M10 in the device memory 155 of the PLC 150.

Referring to FIG. 2B, the setting display apparatus 100 transmits to the PLC 150 data 250 which is information on the numbers of the devices to be monitored. A frame flow program 251 includes as its contents this transmitted data, basic frame number information and individual frame number information. Current value display components 202 and lamp display components 203 are displayed on the display 113. A frame forming program 204 includes as its contents the current value display components 202, the lamp display components 203, and a basic frame number.

The functions and operation will next be described with reference to FIGS. 2A and 2B.

In the example shown in FIG. 2A, the current values of the fifteen items from data register D0 and the current values of the three items from auxiliary relay M0 are indicated on the display 113 of the setting display apparatus 100.

The setting display apparatus 100 first transmits information on the addresses of the fifteen items from D0 and the three items from M0 as transmitted data 200 to the PLC 150.

The PLC 150 receiving transmitted data 200 transmits data on the fifteen items from D0 in the data memory 156 to the setting display apparatus 100, and the setting display apparatus 100 stores this data in the data memory 106.

At this time, the values (D0) to (D14) are stored in order from the top address in the data memory 106, that is, (D0) is stored at rd0, (D1) at rd1, . . . , and (D14) at rd14.

Similarly, the PLC 150 transmits data on the three items from M0 in the bit memory 157 to the setting display apparatus 100, and the setting display apparatus 100 stores this data in the bit memory 107.

At this time, the values (M0) to (M2) are stored in order from the top address in the bit memory 107, that is, (M0) is stored at rm0, (M1) at rm1, and (M2) at rm2.

The setting display apparatus 100 reads out the data to be displayed from the reception buffer memory 105.

As a result, the values (D0) to (D14) are displayed in order in the current value display components 202 at positions rd0 to rd14 on the display 113, (D0) being at the position rd0, (D1) at the position rd1, ..., and (D14) at the position rd14. Similarly, the ON/OFF states (M0) to (M2) are displayed in order in the lamp display components 203 at positions from rm0 to rm2 on the display 113, (M0) being at the position rm0, (M1) at the position rm1, and (M2) at the position rm2.

The frame flow program 201 includes as its contents transmitted data 200 and designates the top address and the number of items with respect to the devices to be monitored. This top address is a direct external address of the device memory 155 in the PLC 150.

On the other hand, the frame forming program 204 includes as its contents the addresses in the data memory 106 and the bit memory 107 in the reception buffer memory 105, i.e., indirect internal addresses of the devices to be displayed, which are independent of the PLC 150 side.

In the example shown in FIG. 2B, the current values of the fifteen items from data register D20 and the current values of the three items from auxiliary relay M10 are indicated on the display 113 of the setting display apparatus 100.

The setting display apparatus 100 first transmits information on the addresses of the fifteen items from D20 and the three items from M10 as transmitted data 250 to the PLC 150.

The PLC 150 receiving transmitted data 250 transmits data on the fifteen items from D20 in the data memory 156 to the setting display apparatus 100, and the setting display apparatus 100 stores this data in the data memory 106.

At this time, the values (D20) to (D34) are stored in order from the top address in the data memory 106, that is, (D20) is stored at rd0, (D21) at rd1, ..., and (D34) at rd14.

Similarly, the PLC 150 transmits data on the three items from M10 in the bit memory 157 to the setting display apparatus 100, and the setting display apparatus 100 stores this data in the bit memory 107.

At this time, the values (M10) to (M12) are stored in order from the top address in the bit memory 107, that is, (M10) is stored at rm0, (M11) at rm1, and (M12) at rm2.

The setting display apparatus 100 reads out the data to be displayed from the reception buffer memory 105.

As a result, the values (D20) to (D34) are displayed in order in the current value display components 202 at positions rd0 to rd14 on the display 113, (D20) being at the position rd0, (D21) at the position rd1, ..., and (D34) at the position rd14.

Similarly, the ON/OFF states (M10) to (M12) are displayed in order in the lamp display components 203 at positions from rm0 to rm2 on the display 113, (M10) being at the position rm0, (M11) at the position rm1, and (M12) at the position rm2.

The frame flow program 251 includes as its contents transmitted data 250 and designates the top address and the number of items with respect to the devices to be monitored. This top address is a direct external address of the device memory 155 in the PLC 150.

On the other hand, the frame forming program 204 includes as its contents the addresses in the data memory 106 and the bit memory 107 in the reception buffer memory 105, i.e., indirect internal addresses of the devices to be displayed, which are independent of the PLC 150 side.

As shown in FIGS. 2A and 2B, each display program is formed by a frame forming program having a basic frame number and a frame flow program having an individual frame number, and target basic frame number information is attached to the frame flow program.

Common frame forming program 204 is used in the examples of monitoring shown FIGS. 2A and 2B (and, accordingly, a common basic frame number 5 is set), and the differences between the contents of the on-screen displays are based on the differences between the frame flow programs 201 and 251.

The frame forming program and the frame flow programs will be further described with respect to concrete examples thereof.

Figure 3B:
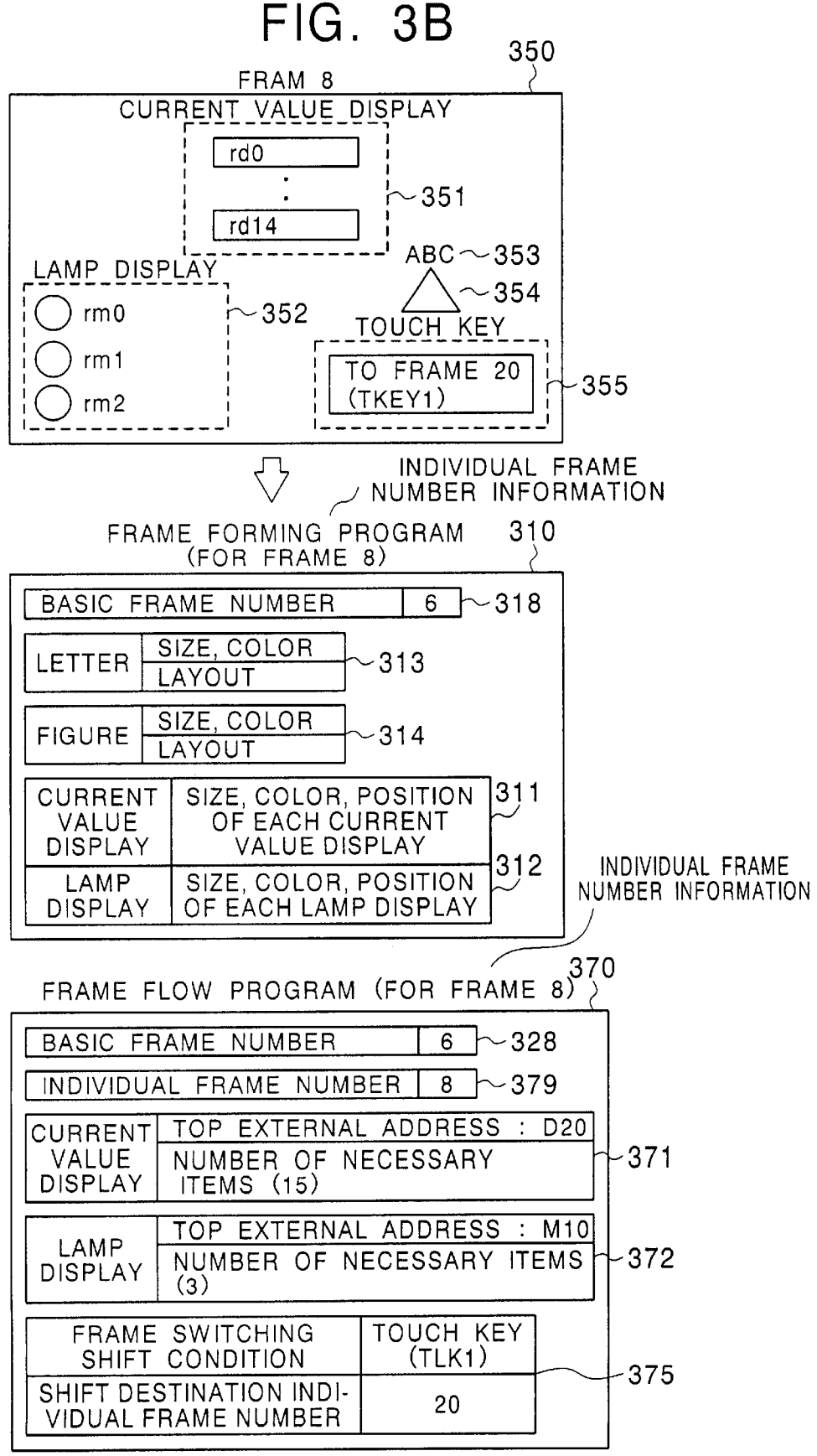

FIGS. 3A and 3B are diagrams showing monitoring programs for the setting display apparatus in the embodiment shown in FIG. 1.

FIG. 3A shows a frame 7 containing a combination of current value display components and lamp display components provided as monitor elements, and a frame forming program and a frame flow program for displaying the frame 7.

Referring to FIG. 3A, the frame 7 indicated by 300 is constituted by current value display components 301, lamp display components 302, a letter component 303, a figure component 304, and a frame change touch key 305 which can be pressed to change the current frame to a frame designated by a frame number 15.

The frame forming program for forming the frames 7 and 8, shown in the section indicated by 310, is constituted by data 318 consisting of basic frame number information about the frame 7 or 8, data 313 on the letter component 303 or 353 in the frame 7 or 8, data 314 on the figure component 304 or 354 in the frame 7 or 8, data 311 on each of the current value display components 301 or 351 in the frame 7 or 8, and data 312 on each of the lamp display components 302 or 352 in the frame 7 or 8.

The frame flow program for the frame 7, shown in the section indicated by 320, is constituted by data 328 consisting of basic frame number information about the frame 7, data 329 consisting of individual frame number information about the frame 7, data 321 on the external addresses of the current value display components 301 in the frame 7, data 322 on the external addresses of the lamp display components 302 in the frame 7, and data 325 on the frame change touch key 305 in the frame 7.

FIG. 3B shows the frame 8 containing a combination of current value display components and lamp display components provided as monitor elements, and a frame forming program and a frame flow program for displaying the frame 8.

Referring to FIG. 3B, the frame 8 indicated by 350 is constituted by current value display components 351, lamp display components 352, a letter component 353, a figure component 354, and a frame change touch key 355 which can be pressed to change the current frame to a frame designated by a frame number 20.

The frame flow program for the frame 8, shown in the section indicated by 370, is constituted by data 328 consisting of basic frame number information about the frame 8, data 379 consisting of individual frame number information about the frame 8, data 371 on the external addresses of the current value display components 351 in the frame 8, data 372 on the external addresses of the lamp display components 352 in the frame 8, and data 375 on the frame change touch key 355 in the frame 8.

The functions and operation will next be described with reference to FIGS. 3A and 3B.

The frame 7 (300) shown in FIG. 3A has such settings that the fifteen items from D0 are displayed in the current value display components 301, the three items from M0 are displayed in the lamp display components 302, letters A, B, and C are displayed in the letter component 303, a triangle is displayed in the figure component 304, and the frame change touch key 305 initiates changing the current frame to frame 15 when pressed.

First, in the frame forming program 310 for the frames 7 and 8, a basic frame number 6 is set as data 318.

The size, color and position of the letters in the letter component 303 or 353 are set as data 313.

The size, color and position of the figure in the figure component 304 or 354 are set as data 314.

To display the current value display components 301 or 351, the position, size and color of each component are set as data 311.

To display the lamp components 302 or 352, the position, size and color of each component are set as data 312.

Next, in the frame flow program 320 for the frame 7, the basic frame number 6 is set as data 328.

An individual frame number 7 is set as data 329.

To display the current value display components 301, the top external address D0 and the number of the necessary items 15 are set as data 321.

To display the lamp display components 302, the top external address M0 and the number of the necessary items 3 are set as data 322.

With respect to the frame change touch key, the condition that the touch key (TKEY1) is ON for enabling the frame to be changed, and the shift destination frame number 15 are set as data 325.

The frame 8 (350) shown in FIG. 3B has such settings that the fifteen items from D20 are displayed in the current value display components 351, the three items from M10 are displayed in the lamp display components 352, letters A, B, and C are displayed in the letter component 353, a triangle is displayed in the figure component 354, and the frame change touch key 355 initiates changing the current frame to frame 20.

In the frame flow program 370 for the frame 8, the basic frame number 6 is set as data 328.

An individual frame number 8 is set as data 379.

To display the current value display components 351, the top external address D20 and the number of the necessary items 15 are set as data 371.

To display the lamp display components 352, the top external address M10 and the number of the necessary items 3 are set as data 372.

With respect to the frame change touch key, the condition that the touch key (TKEY1) is ON for enabling the frame to be changed, and the shift destination frame number 20 are set as data 375.

In the examples of the programs shown in FIGS. 3A and 3B, each display program is formed by the frame forming program 310 having the common basic frame number 6 and the frame flow program 320 or 370 having the individual frame number 7 or 8, and the target basic frame number information 6 is attached to the frame flow program 320 or 370.

Thus, in the frame flow program, the data displayed on the screen can be changed by only changing the top external address of the components representing the contents of the current value display and the top external address of the components representing the contents of the lamp display without making any change in the frame forming program.

Figure 4A:
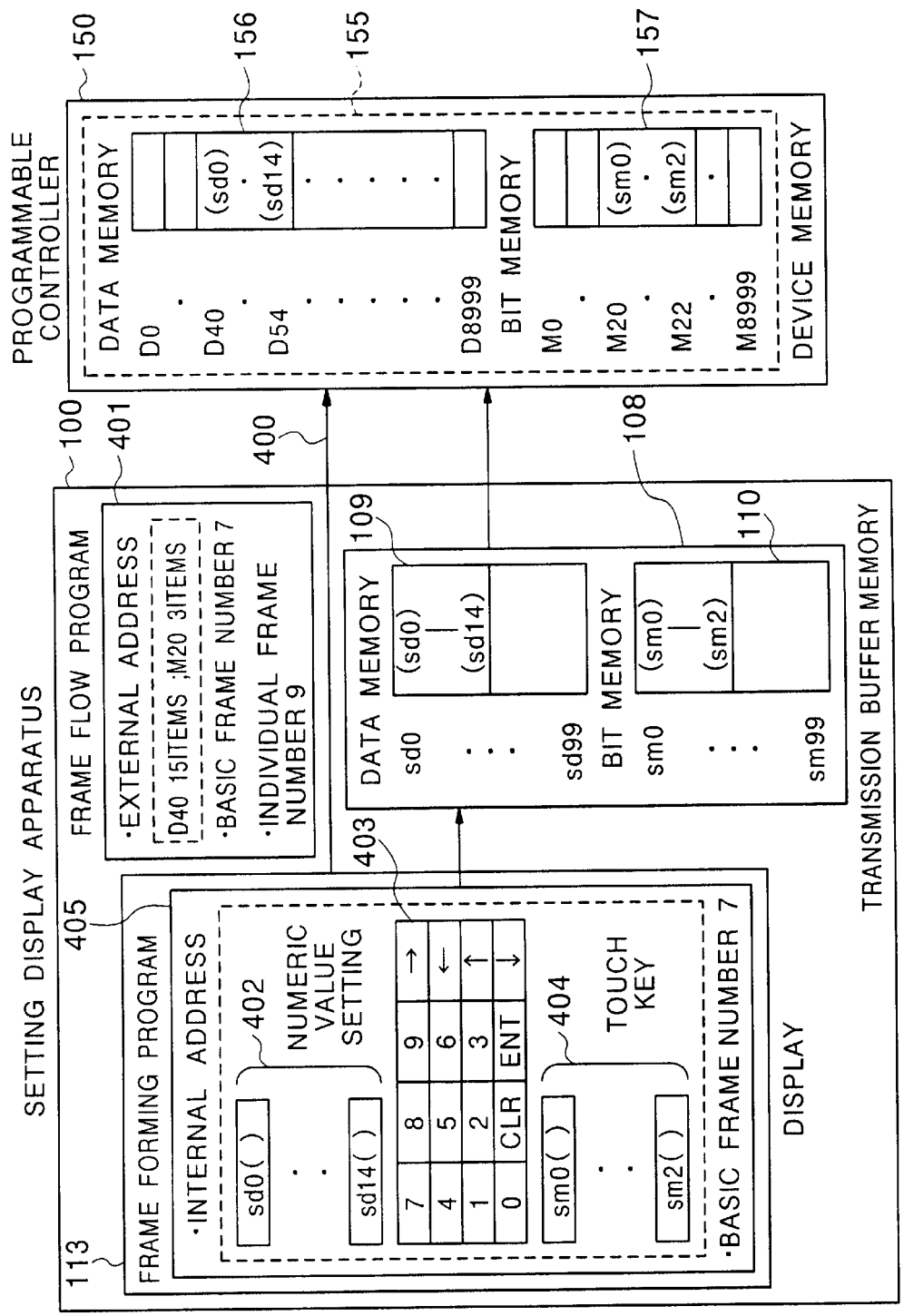
FIGS. 4A and 4B are diagrams showing the setting communication operation of the apparatus shown in FIG. 1.
Figure 4B:
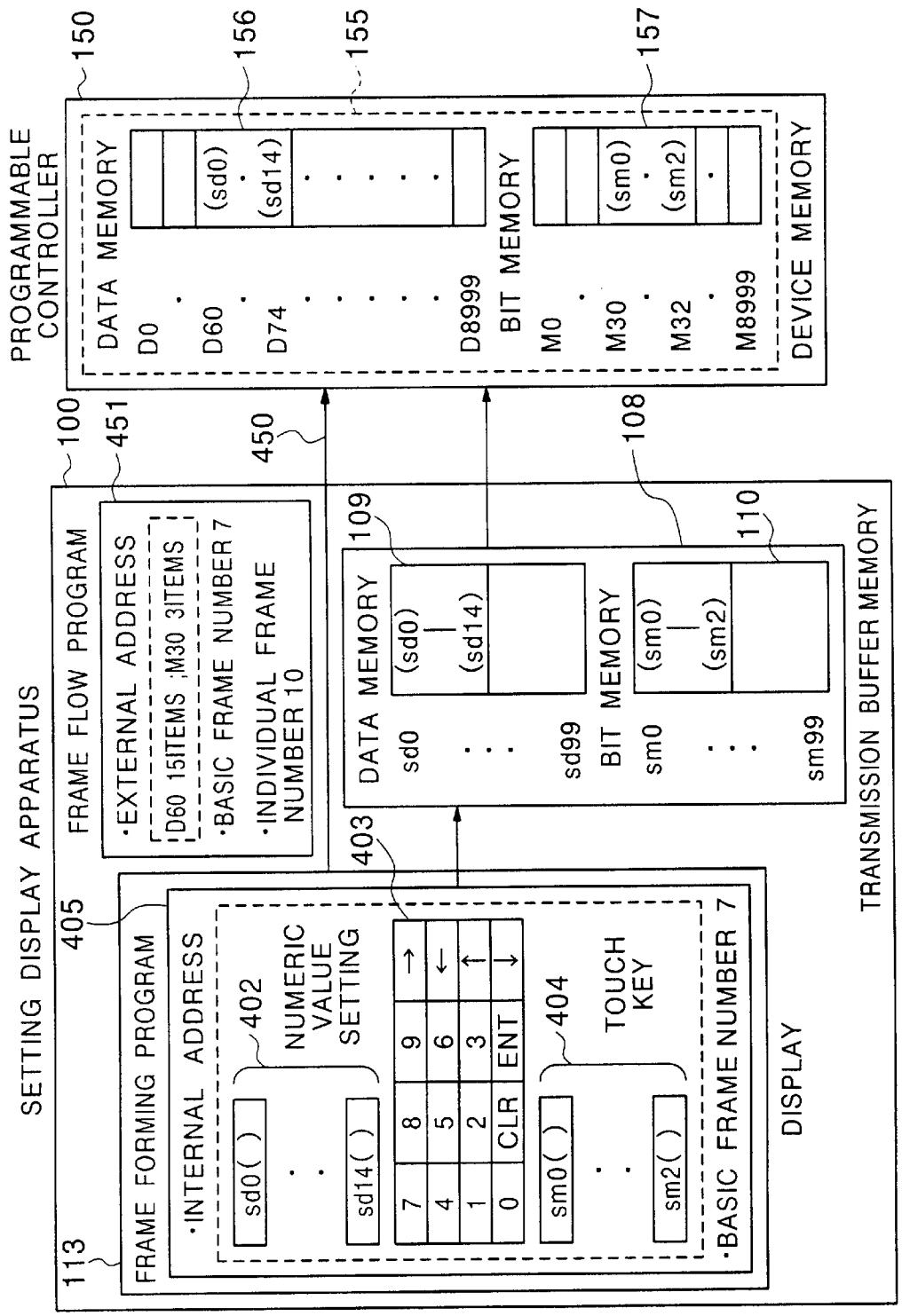

FIGS. 4A and 4B are diagrams for explaining the setting communication operation of the setting display apparatus in Embodiment 1 shown in FIG. 1.

FIG. 4A is a diagram for explaining setting with respect to the devices from the setting display apparatus 100 of consecutive fifteen items from data register D40 and consecutive three items from auxiliary relay M20 in the device memory 155 of the PLC 150.

Referring to FIG. 4A, the setting display apparatus 100 transmits to the PLC 150 data 400 which is information on the numbers of the devices selected as an object of setting. A frame flow program 401 includes as its contents this transmitted data, basic frame number information and individual frame number information. Numeric value setting components 402, a ten-key pad 403 used for value setting through the numeric value setting components 402, and touch key components 404 are display on the display 113. A frame forming program 405 includes as its contents the numeric value setting components 402, the ten-key pad 403, the touch key components 404, and basic frame number information.

FIG. 4B is a diagram for explaining setting with respect to the devices from the setting display apparatus 100 of consecutive fifteen items from data register D60 and consecutive three items from auxiliary relay M30 in the device memory 155 of the PLC 150.

Referring to FIG. 4B, the setting display apparatus 100 transmits to the PLC 150 data 450 which is information on the numbers of the devices selected as an object of setting. A frame flow program 451 includes as its contents this transmitted data, basic frame number information and individual frame number information. A frame forming program 405 is equivalent in contents as that shown in FIG. 4A.

The functions and operation will next be described with reference to FIGS. 4A and 4B.

In the example shown in FIG. 4A, values are set in the fifteen items from data register D40 and in the three items from auxiliary relay M20 on the display 113 of the setting display apparatus 100.

First, numeric values set by the ten-key pad 403 are stored in the data memory 109 of the transmission buffer memory 108.

Also, key information (ON/OFF) set by the touch keys 404 is stored in the bit memory 110 of the transmission buffer memory 108.

At this time, set values (sd0) to (sd14) are stored in order from the top address in the data memory 109, that is, (sd0) is stored at sd0, (sd1) at sd1, . . . , and (sd14) at sd14.

Also, set values (sm0) to (sm2) are stored in order from the top address in the bit memory 110, that is, (sm0) is stored at sm0, (sm1) at sm1, and (sm2) at sm2.

The setting display apparatus 100 transmits information on the addresses of the fifteen items from D40 and the three items from M20 as transmitted data 400 to the PLC 150.

The setting display apparatus 100 thereafter transmits the values in the data memory 109 and the values in the bit memory 110 in the transmission buffer memory 108 to the PLC 150.

The PLC 150, having already received from the setting display apparatus 100 the information designating the devices selected as an object of setting, i.e., the fifteen items from data register D40 and the three items from auxiliary relay M20, stores the contents of the data memory 109 successively from the top address in the data memory 156, (sd0) at D40, (sd1) at D41, . . . , and (sd14) at D54. The PLC 150 also stores the contents of the bit memory 110 successively from the top address in the bit memory 157, (sm0) at M20, (sm1) at M21, and (sm2) at M22.

The frame flow program 401 includes as its contents transmitted data 400 and designates the top address and the number of items with respect to the devices selected as an object of setting.

This device top address is a direct external address of the device memory 155 in the PLC 150.

On the other hand, the frame forming program 405 includes as its contents the addresses in the data memory 109 and the bit memory 110 in the transmission buffer memory 108, i.e., indirect internal addresses of the devices selected as an object of setting.

In the example shown in FIG. 4B, values are set in the fifteen items from data register D60 and in the three items from auxiliary relay M30 on the display 113 of the setting display apparatus 100.

First, numeric values set by the ten-key pad 403 are stored in the data memory 109 of the transmission buffer memory 108.

Also, key information (ON/OFF) set by the touch keys 404 is stored in the bit memory 110 of the transmission buffer memory 108.

At this time, set values (sd0) to (sd14) are stored in order from the top address in the data memory 109, that is, (sd0) is stored at sd0, (sd1) at sd1, . . . , and (sd14) at sd14.

Also, set values (sm0) to (sm2) are stored in order from the top address in the bit memory 110, that is, (sm0) is stored at sm0, (sm1) at sm1, and (sm2) at sm2.

The setting display apparatus 100 transmits information on the addresses of the fifteen items from D60 and the three items from M30 as transmitted data 450 to the PLC 150.

The setting display apparatus 100 thereafter transmits the values in the data memory 109 and the values in the bit memory 110 of the transmission buffer memory 108 to the PLC 150.

The PLC 150, having already received the information from the setting display apparatus 100 designating the devices selected as an object of setting, i.e., the fifteen items from data register D60 and the three items from auxiliary relay M30, stores the contents of the data memory 109 successively from the top address in the data memory 156, (sd0) at D60, (sd1) at D61, . . . , and (sd14) at D74. The PLC 150 also stores the contents of the bit memory 110 successively from the top address in the bit memory 157, (sm0) at M30, (sm1) at M31, and (sm2) at M32.

The frame flow program 451 includes as its contents transmitted data 450 and designates the top address and the number of items with respect to the devices selected as an object of setting.

This device top address is a direct external address of the device memory 155 in the PLC 150.

On the other hand, the frame forming program 405 includes as its contents the addresses in the data memory 109 and the bit memory 110 of the transmission buffer memory 108, i.e., indirect internal addresses of the devices selected as an object of setting.

As shown in FIGS. 4A and 4B, each display program is formed by a frame forming program having a basic frame number and a frame flow program having an individual frame number, and target basic frame number information is attached to the frame flow program.

Common frame forming program 405 is used in the examples of setting shown FIGS. 4A and 4B (and, accordingly, a common basic frame number 7 is set), and the differences between the contents of the on-screen displays are based on the differences between the frame flow programs 401 and 451.

The frame forming program and the frame flow programs will be further described with respect to concrete examples thereof.

Figure 5A:
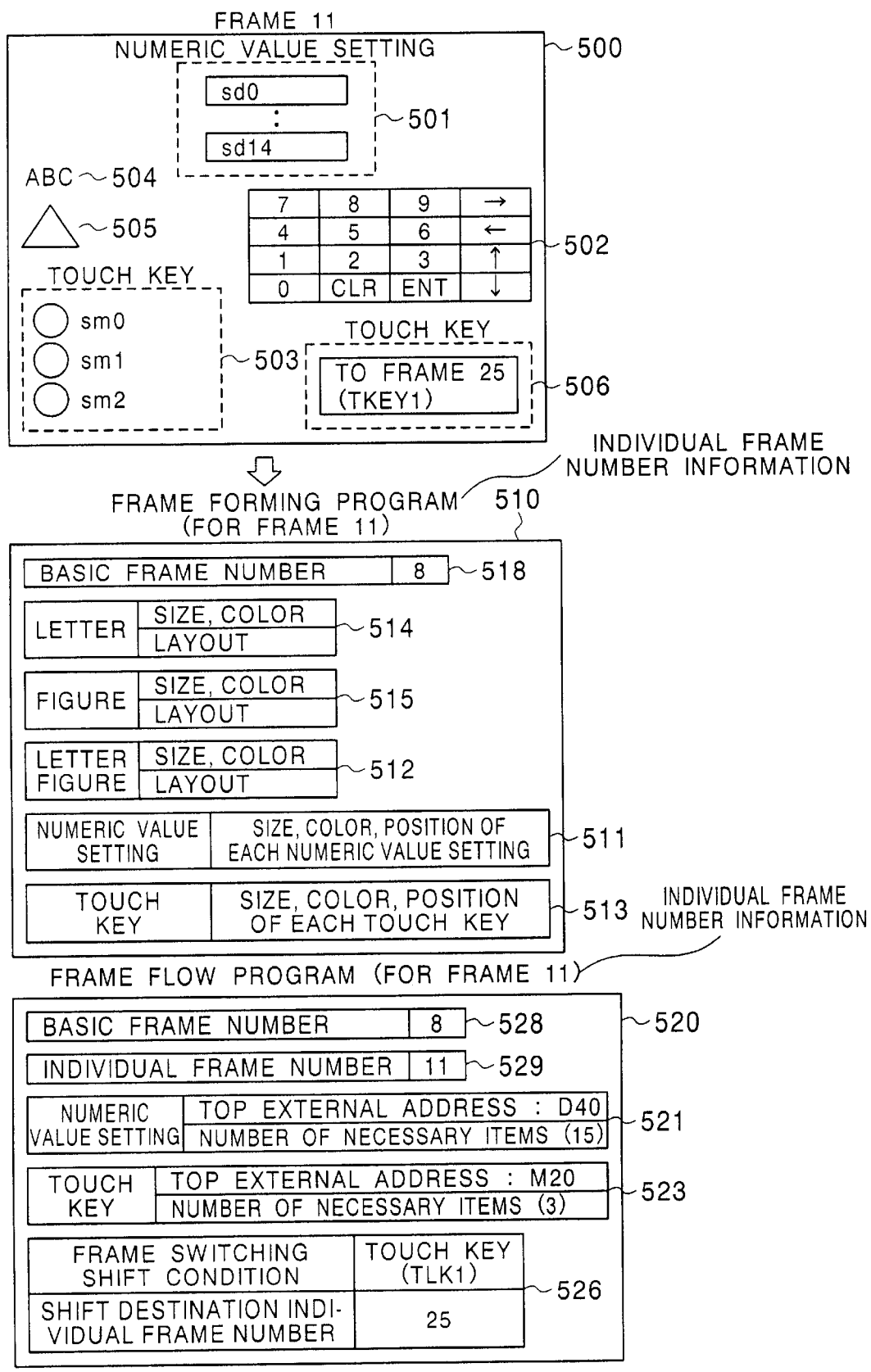
FIGS. 5A and 5B are diagrams showing setting programs in the apparatus shown in FIG. 1.
Figure 5B:
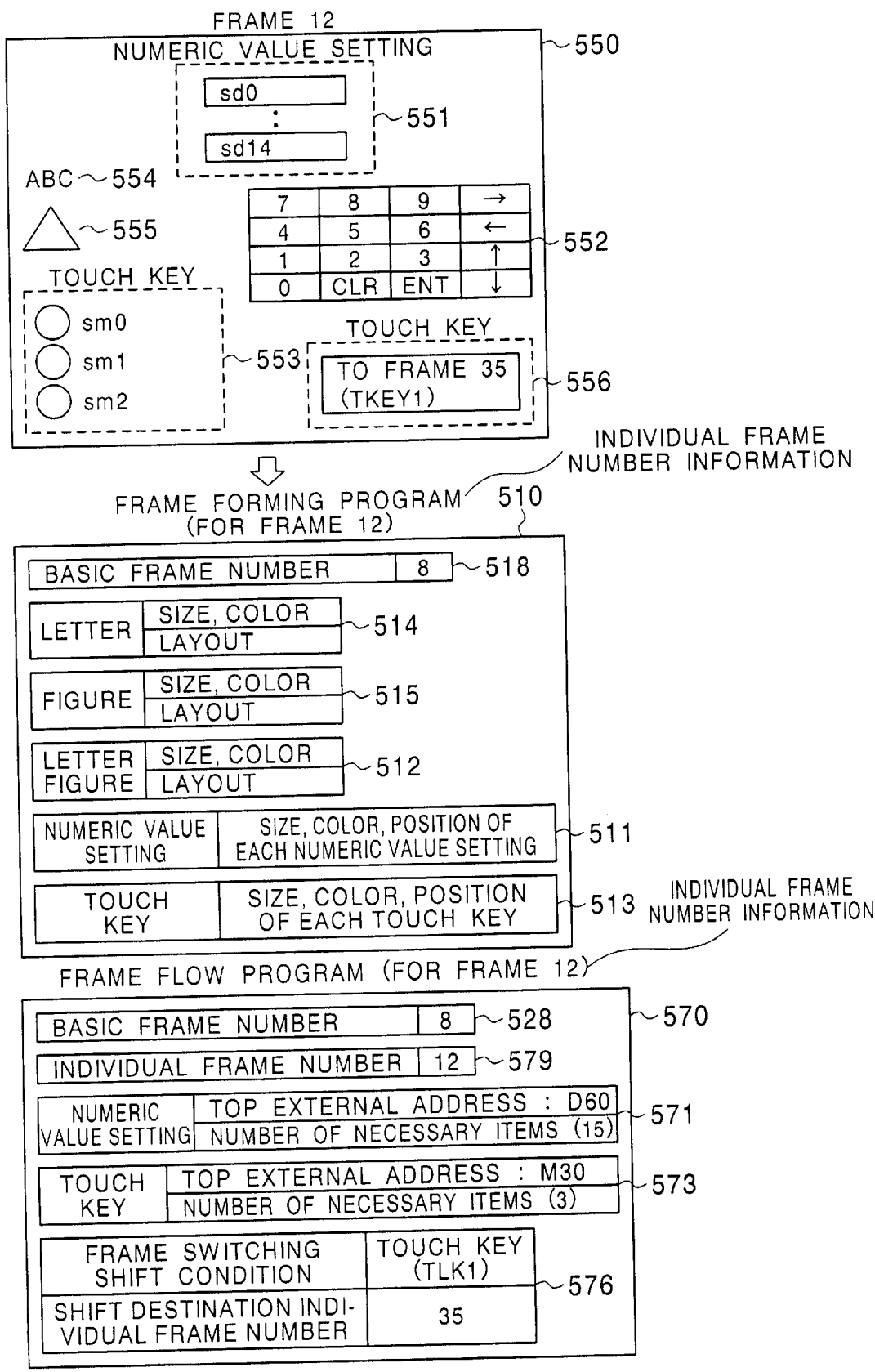

FIGS. 5A and 5B are diagrams showing setting programs for the setting display apparatus in the embodiment shown in FIG. 1.

FIG. 5A shows a frame 11 containing a combination of numeric value setting components and touch key components provided as setting elements, and a frame forming program and a frame flow program for displaying the frame 11.

Referring to FIG. 5A, the frame 11 indicated by 500 is constituted by numeric value setting components 501, a ten-key pad 502 for setting values in the numeric value setting components 501, touch key components 503, a letter component 504, a figure component 505, and a frame change touch key 506 which can be pressed to change the current frame to a frame designated by a frame number 25.

The frame forming program for forming the frames 11 and 12, shown in the section indicated by 510, is constituted by data 518 consisting of basic frame number information about the frame 11 or 12, data 512 on the ten-key pad 502 or 552 in the frame 11 or 12, data 514 on the letter component 504 or 554 in the frame 11 or 12, data 515 on the figure component 505 or 555 in the frame 11 or 12, data 511 on each of the numeric value setting components 501 or 551 in the frame 11 or 12, and data 513 on each of the touch key components 503 or 553 in the frame 11 or 12.

The frame flow program for the frame 11, shown in the section indicated by 520, is constituted by data 528 consisting of basic frame number information about the frame 11, data 529 consisting of individual frame number information about the frame 11, data 521 on the addresses of the numeric value setting components 501 in the frame 11, data 523 on the addresses of the touch key components 503 in the frame 11, and data 526 on the frame change touch key 506 in the frame 11.

FIG. 5B shows the frame 12 containing a combination of numeric value setting components and touch key components provided as setting elements, and a frame forming program and a frame flow program for displaying the frame 12.

Referring to FIG. 5B, the frame 12 indicated by 550 is constituted by numeric value setting components 551, a ten-key pad 552 for setting values in the numeric value setting components 551, touch key components 553, a letter component 554, a figure component 555, and a frame change touch key 556 which can be pressed to change the current frame to a frame designated by a frame number 35.

The frame flow program for the frame 12, shown in the section indicated by 570, is constituted by data 528 consisting of basic frame number information about the frame 12, data 579 consisting of individual frame number information about the frame 12, data 571 on the addresses of the numeric value setting components 551 in the frame 12, data 573 on the addresses of the touch key components 553 in the frame 12, and data 576 on the frame change touch key 556 in the frame 12.

The operation will next be described with reference to FIGS. 5A and 5B.

The frame 11 (500) shown in FIG. 5A has such settings that the fifteen items from D40 in the PLC 150 are set in the numeric value setting components 501, the three items from M20 are set in the touch key components 503, letters A, B, and C are displayed in the letter component 504, a triangle is displayed in the figure component 505, and the frame change touch key 506 initiates changing the current frame to frame 25when pressed.

First, in the frame forming program 510 for the frames 11and 12, a basic frame number 8 is set as data 518.

The size, color and position of the letters in the letter component 504 or 554 are set as data 514.

The size, color and position of the figure in the figure component 505 or 555 are set as data 515.

The size, color and position of the figures and letters in the ten-key pad 502 or 552 are set as data 512.

To display the numeric value setting components 501 or 551, the position, size and color of each component are set as data 511.

To display the touch key components 503 or 553, the position, size and color of each component are set as data 513.

Next, in the frame flow program 520 for the frame 11, the basic frame number 8 is set as data 528.

An individual frame number 11 is set as data 529.

To display the numeric value setting components 501, the top external address D40 and the number of the necessary items 15 are set as data 521.

To display the touch key components 503, the top external address M20 and the number of the necessary items 3 are set as data 523.

With respect to the frame change touch key, the condition that the touch key (TKEY1) is ON for enabling the frame to be changed, and the shift destination frame number 25 are set as data 526.

The frame 12 (550) shown in FIG. 5B has such settings that the fifteen items from D60 in the PLC 150 are set in the numeric value setting components 551, the three items from M30 are set in the touch key components 553, letters A, B, and C are displayed in the letter component 554, a triangle is displayed in the figure component 555, and the frame change touch key 556 initiates changing the current frame to frame 35 when pressed.

In the frame flow program 570 for the frame 12, the basic frame number 8 is set as data 528.

An individual frame number 12 is set as data 579.

To display the numeric value setting components 551, the top external address D60 and the number of the necessary items 15 are set as data 571.

To display the touch key components 553, the top external address M30 and the number of the necessary items 3 are set as data 573.

With respect to the frame change touch key, the condition that the touch key (TKEY1) is ON for enabling the frame to be changed, and the shift destination frame number 35 are set as data 576.

In the examples of the programs shown in FIGS. 5A and 5B, each display program is formed by the frame forming program 510 having the basic frame number 8 and the frame flow program 520 or 570 having the individual frame number 11 or 12, and target basic frame number information 8 is attached to the frame flow program 520 or 570.

Thus, in the frame flow program, the data displayed on the screen can be changed by only changing the top external address of the components representing the contents of the numeric value setting and the top address of the components representing the contents of the touch key setting without making any change in the frame forming program.

FIGS. 6A and 6B are diagrams showing the external control shift operation of the setting display apparatus in Embodiment 1 shown in FIG. 1.

The apparatus shown in FIG. 1 has been described with respect to a case where both a frame forming program for forming a basic frame and a frame flow program for frame change and communication are stored in the program memory 103 of the setting display apparatus 100, and where a frame change is made on the setting display apparatus 100 side by means of the touch keys.

On the other hand, FIG. 6A shows a case where the setting display apparatus 100 makes a frame change by referring to the contents of a shift condition received from the PLC 150.

Referring to FIG. 6A, a frame forming program 600 and a frame flow program 601 are provided, the setting display apparatus 100 requests the PLC 150 to send information on consecutive two items from M100 by transmitting data 602 to the PLC 150, and the setting display apparatus 100 receives from the PLC 150 data 603 which is information on the ON/OFF states of the consecutive two items from M100.

FIG. 6B shows a case where the setting display apparatus 100 makes a change in accordance with an urgent frame change command from the PLC 150.

Referring to FIG. 6B, a frame forming program 600 and a frame flow program 601 are provided and frame number information 604 is provided in an internal data memory of the PLC 150.

The Functions and operation will be described with reference to FIGS. 6A and 6B.

In the example shown in FIG. 6A, the frame forming program 600 and the frame flow program 601 exist in the setting display apparatus 100, and the setting display apparatus 100 requests the PLC 150 to designate a condition for a frame change to be made by the setting display apparatus 100, refers to the contents of the condition received from the PLC 150 and changes the frame.

According to the frame flow program 601 in the setting display apparatus 100, if a frame shift condition is ON/OFF information about M100 and M101, the setting display apparatus 100 transmits data 602 to the PLC 150 as a request for supplying data on the two items from M100.

The notation "K2M100" denotes two items from M100.

At this request, the PLC 150 transmits ON/OFF information 603 about M100 and M101 as a shift condition to the setting display apparatus 100.

The setting display apparatus 100 changes the frame on the shift condition received from the PLC 150, i.e., ON/OFF information 603 about M100 and M101.

In the example shown in FIG. 6B, the frame forming program 600 and the frame flow program 601 exist in the setting display apparatus 100, and the setting display apparatus 100 monitors frame number information 604 in the PLC 150 at all times.

In an emergency, the PLC 150 sets in frame number information 604 the individual frame number of a frame to be displayed (including basic frame number information).

When the setting display apparatus 100 receives frame number information 604 from the PLC 150, it makes a frame change to the designated frame number by interrupt processing.

Thus, the setting display apparatus 100 can make a frame change by a frame change signal or designation of a frame number from the PLC 150.

Figure 7:
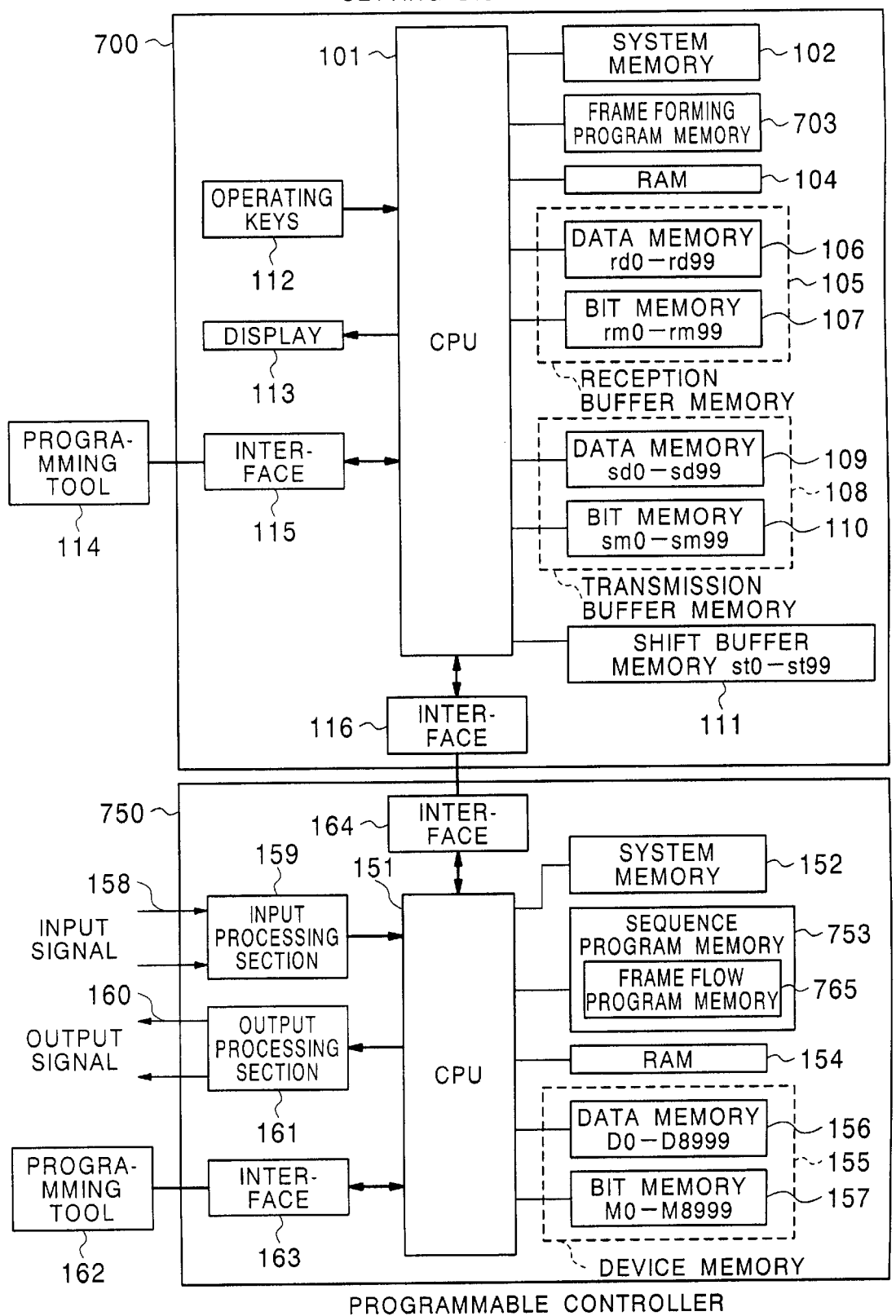
FIG. 7 is a diagram showing the configuration of a setting display apparatus for a programmable controller in Embodiment 2 of the present invention.

Embodiment 2 (FIG. 7)

A setting display apparatus for a programmable controller in a second embodiment of the present invention will be described with reference to the system configuration diagram of FIG. 7.

The difference between the apparatus in Embodiment 1 shown in FIG. 1 and the apparatus in this embodiment described below with reference to FIG. 7 resides in the location of the frame flow program in each display program selected between the setting display apparatus side (FIG. 1) and the PLC side (FIG. 7). In either case, the frame forming program is stored on the setting display apparatus side.

Referring to FIG. 7, the setting display apparatus in this embodiment, indicated by 700, is connected to a programmable controller (hereinafter referred to as "PLC") 750, writes setting information to the PLC 750, and reads out monitoring information from the PLC 750. The setting display apparatus 700 differs from the apparatus shown in FIG. 1 in use of its frame forming program memory 703.

Also, the PLC 750 differs from the PLC shown in FIG. 1 in that a frame flow program memory 765 is added as a portion of a sequence program memory 753.

While a frame forming program and a frame flow program are stored in the program memory 103 in the apparatus shown in FIG. 1, only a frame forming program is stored in the frame forming program memory 703 in the arrangement shown in FIG. 7, and a frame flow program is stored in the frame flow program memory 765 on the PLC 750 side.

The operation of the setting display apparatus in the embodiment shown in FIG. 7 will now be described.

In the frame forming program memory 703 in the setting display apparatus 700 arranged as shown in FIG. 7, a frame forming program in a display program prepared by the programming tool 114 is stored through the first CPU 101.

A frame flow program in the display program prepared by the programming tool 114 is stored in the frame flow program memory 765 through the first CPU 101 and the second CPU 151.

In the arrangement shown in FIG. 7, a sequence program prepared by the programming tool 162 is stored in the program memory 753 of the PLC 750 through the second CPU 151.

The setting display apparatus 700 and the PLC 750 are connected by serial connection through the interface circuits 116 and 164, and the contents of some of a multiplicity of areas in the device memory 155 are transmitted as monitoring information to the reception buffer memory 105.

The contents of the transmission buffer memory 108 are transmitted as setting/control information to some of the multiplicity of areas in the device memory 155.

The shift buffer memory 111 exists in both the apparatuses shown in FIGS. 1 and 7. The state of the operating key having the frame change function is stored in the shift buffer memory 111, as in the arrangement shown in FIG. 1. The setting display apparatus 700 refers to the contents of the shift buffer memory 111 when a frame should be changed.

In the case of the apparatus shown in FIG. 7, the contents of the shift buffer memory 111 can be transmitted as shift control information to some of the multiplicity of areas in the device memory 155.

FIG. 8 is a diagram for explaining the frame change operation of the apparatus shown in FIG. 7.

Referring to FIG. 8, touch key components (TK0, TK1, TK2) 800 for controlling frame changes are displayed, a signal 801 is transmitted from the PLC 750 to the setting display apparatus 700 as a request for sending the contents of the shift buffer memory 111 in the setting display apparatus 700, and a signal 802 is transmitted from the setting display apparatus 700 as a reply to the request signal 801.

The functions and operation of this embodiment will be described with reference to FIG. 8.

In the arrangement shown in FIG. 8, to obtain information on the states of the touch keys relating to the frame change control in the setting display apparatus 700, the PLC 750 first sends request signal 801 to the setting display apparatus 700 to request the same to inform the PLC 750 of the states of the touch keys.

In this example, the PLC 750 requests the setting display apparatus 700 to send information on the ON/OFF states of the touch key components 800.

The notation "K3st0" denotes three items from st0 in the shift buffer memory 111.

The ON/OFF states of the touch keys 800 are stored successively from the top address in the shift buffer memory 111 in the setting display apparatus 700.

The setting display apparatus 700 then transmits in reply signal 802 the values at addresses st0 to st2 in the shift buffer memory 111, thereby enabling the PLC 750 to know the states of the touch keys.

FIGS. 9A and 9B are diagrams for explaining the shift operation of the apparatus shown in FIG. 7 with respect to an example in which the PLC 750 performs frame change control at a command from the setting display apparatus 700.

Referring to FIG. 9A, a frame forming program 900 and a frame flow program 901 are provided and the above-mentioned request signal 801 and the reply signal 802 in reply to the request signal 801 are transmitted.

Referring to FIG. 9B, there are also shown the frame forming program 900 and the frame flow program 901, frame number information 902 is stored in the PLC 750, and information 903 on contents of the device memory to be displayed is also stored in the PLC 750. There are also shown transmitted information 904, received information 905, and information 906 on device memory contents to be stored, stored in the PLC 750.

In the example shown in FIG. 9A, the PLC 750 has the initiative in changing the frame since the frame flow program 901 exists in the PLC 750 while the frame forming program 900 exists in the setting display apparatus 700.

The PLC 750 first transmits request signal 801 to obtain information on the states of the touch keys 800 relating to a frame change in the setting display apparatus 700.

The notation "K3st0" denotes three items from a top address st0 in the shift buffer memory 111.

The states of the touch keys 800 are stored in order from the top address st0 in the shift buffer memory 111, as described above with reference to FIG. 8.

After receiving request signal 801, the setting display apparatus 700 transmits to the PLC 750 reply signal 802, i.e., the contents of the shift buffer memory 111 from st0 to st2 stored as the states of the touch keys 800.

Next, as shown in FIG. 9B, the PLC 750 transmits to the setting display apparatus 700 information 904, i.e., frame number information 902 and the contents 903 of the device memory to be displayed, on the basis of the values from st0 to st2 in the shift buffer memory 111 transmitted from the setting display apparatus 700. The setting display apparatus 700 makes a frame change and displays the new frame on the basis of this information.

The set values and control signals from the setting display apparatus 700 are received as received information 905 and stored as contents 906 in the device memory of the PLC 750.

Figure 12:
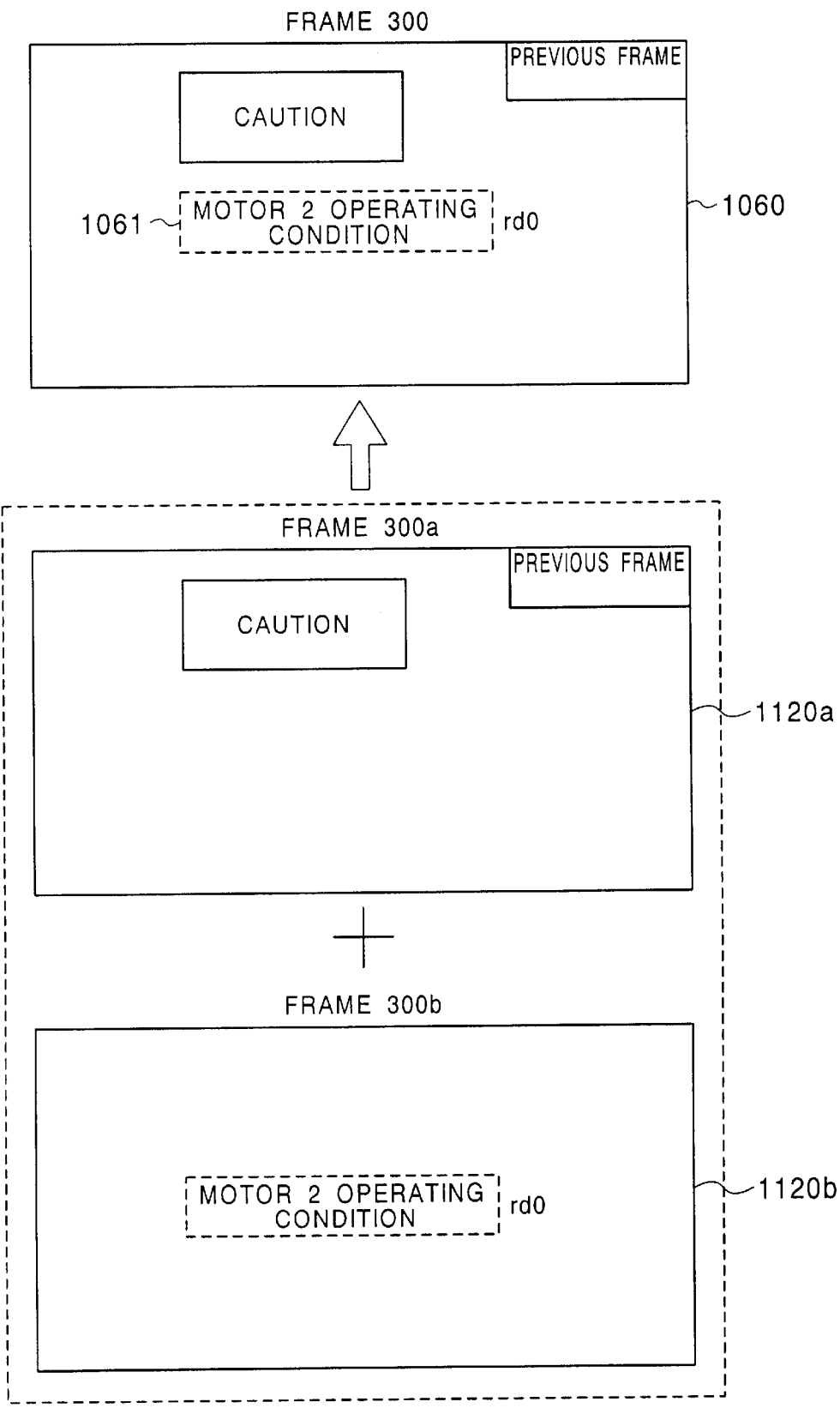
FIG. 12 is a sectional diagram showing another example of the frames displayed by the setting display apparatus in Embodiment 3 of the present invention.

Embodiment 3 (FIGS. 10 to 12)

A setting display apparatus for a programmable controller in a third embodiment of the present invention will be described with reference to the system configuration diagram of FIGS. 10 to 12. The system of this embodiment is intended mainly to use a sequential function chart (SFC) as a method of designing a frame flow program. The programming method will be described with reference to FIGS. 13 to 16 with respect to examples of frames shown in FIGS. 10 to 12.

Figure 10A:
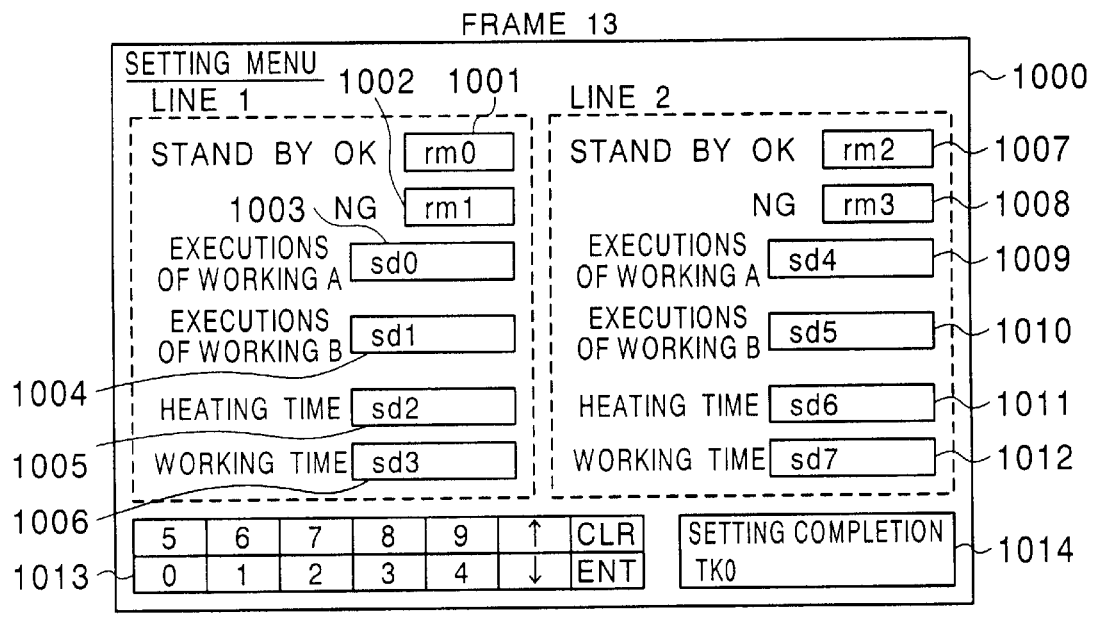
FIGS. 10A, 10B, and 10C are sectional diagrams showing examples of frames displayed by a setting display apparatus for a programmable controller in Embodiment 3 of the present invention.
Figure 10B:
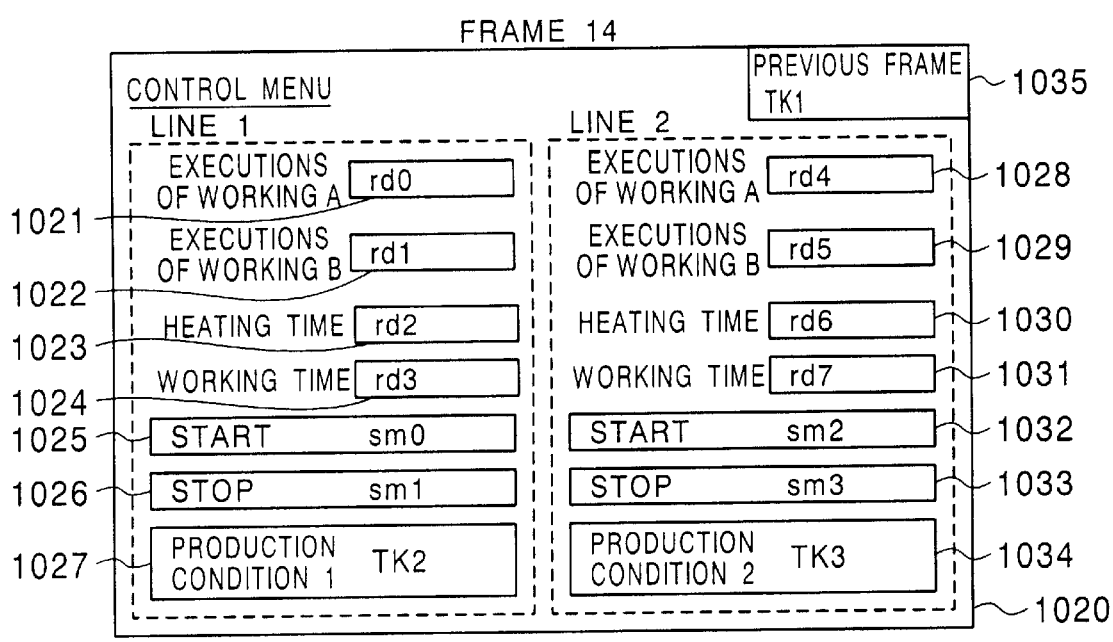
Figure 10C:
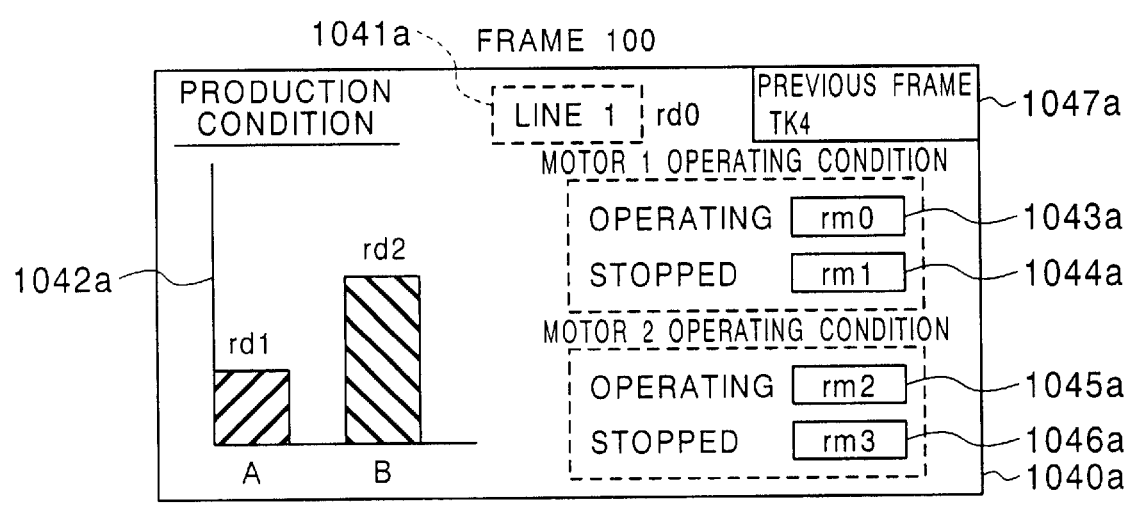

FIGS. 10A, 10B, and 10C are diagrams showing examples of frames displayed by the apparatus in Embodiment 3 of the present invention.

FIG. 10A is a diagram showing a line 1/line 2 setting menu frame 13.

Referring to FIG. 10A, the frame 13 indicated by 1000 is constituted by a lamp display component 1001 for indicating a standby OK state of a line 1, a lamp display component 1002 for indicating a standby NG state of the line 1, a numeric value setting component 1003 for setting the number of executions of working A on the line 1, a numeric value setting component 1004 for setting the number of executions of working B on the line 1, a numeric value setting component 1005 for setting a time period for heating on the line 1, and a numeric value setting component 1006 for setting a time period for working on the line 1.

The frame 13 also includes a lamp display component 1007 for indicating a standby OK state of a line 2, a lamp display component 1008 for indicating a standby NG state of the line 2, a numeric value setting component 1009 for setting the number of executions of working A on the line 2, a numeric value setting component 1010 for setting the number of executions of working B on the line 2, a numeric value setting component 1011 for setting a time period for heating on the line 2, a numeric value setting component 1012 for setting a time period for working on the line 2, a ten-key pad 1013 for setting numeric values for the value setting component 1003~1006, 1009~1012, and a touch key (TK0) 1014 for completion of setting. When the touch key 1014 is pressed, changing the current frame to a frame 14 (1020) described below is initiated.

FIG. 10B is a diagram showing a line 1/line 2 control menu frame 14.

Referring to FIG. 10B, the frame 14 indicated by 1020 is constituted by a numeric value display component 1021 for displaying the number of executions of working A on the line 1, a numeric value display component 1022 for displaying the number of executions of working B on the line 1, a numeric value display component 1023 for displaying the time period for heating on the line 1, a numeric value display component 1024 for displaying the time period for working on the line 1, a touch key 1025 for controlling starting of the line 1, a touch key 1026 for controlling stopping of the line 1, and a touch key (TK2) 1027 for change to a frame 100 (1040*a*) described below for displaying production conditions about the line 1.

The frame 14 also includes a numeric value display component 1028 for displaying the number of executions of working A on the line 2, a numeric value display component 1029 for displaying the number of executions of working B on the line 2, a numeric value display component 1030 for displaying the time period for heating on the line 2, a numeric value display component 1031 for displaying time period for working on the line 2, a touch key 1032 for controlling staring of the line 2, a touch key 1033 for controlling stopping of the line 2, a touch key (TK3) 1034 for change to a frame 200 (1040*b*) described below for displaying production conditions about the line 2, and a touch key (TK1) 1035 for return to the previous frame. When the touch key 1035 is pressed, the display is switched back to the frame 13 (1000).

FIG. 10C shows the frame 100 for displaying production conditions about the line 1.

Referring to FIG. 10C, the frame 100 indicated by 1040*a* is constituted by a letter display component 1041*a* in which a display is variable according to the contents of the data memory 106, a histogram 1042*a* for indicating a state of production of each of products A and B, a lamp display component 1043*a* for indicating the operating state of a motor 1, a lamp display component 1044*a* for indicating the stopped state of the motor 1, a lamp display component 1045*a* for indicating the operating state of a motor 2, a lamp display component 1046*a* for indicating the stopped state of the motor 2, and a touch key (TK4) 1047*a* for return to the previous frame. When the touch key 1047*a* is pressed, the display is switched back to the frame 14 (1020).

FIGS. 11A, 11B, and 11C are diagrams showing examples of other frames displayed by the apparatus in Embodiment 3 of the present invention.

FIG. 11(*a*) shows a frame for displaying production conditions about the line 2.

Referring to FIG. 11(*a*), the frame 200 indicated by 1040*b* is constituted by a letter display component 1041*b* in which a display is variable according to the contents of the data memory 106, a histogram 1042*b* for indicating the production condition of each of products A and B, a lamp display component 1043*b* for indicating the operating state of a motor 1, a lamp display component 1044*b* for indicating the stopped state of the motor 1, a lamp display component 1045*b* for indicating the operating state of a motor 2, a lamp display component 1046*b* for indicating the stopped state of the motor 2, and a touch key (TK5) 1047*b* for return to the previous frame. When the touch key 1047*b* is pressed, the display is switched back to the frame 14 (1020).

FIG. 11(*b*) is a diagram showing a frame 300 urgently displayed in a case where an abnormality has occurred on the line.

Referring to FIG. 11(*b*), the frame 300 indicated by 1060 is constituted by a letter display component 1061 in which a display is variable according to the contents of the data memory 106, and a touch key (TK6) 1062 for return to the previous frame. When the touch key 1062 is pressed, the display is switched back to the frame 14 (1020).

FIG. 11(*c*) is a diagram showing a frame 400 urgently displayed in a case where an abnormality has occurred on the line.

Referring to FIG. 11(*c*), the frame 400 indicated by 1080 is constituted by a touch key (TK7) 1081 for return to the previous frame. When the touch key 1081 is pressed, the display is switched back to the frame 14 (1020).

FIG. 12 is a diagram showing another example of the frames displayed by the apparatus in Embodiment 3 of the present invention.

A frame 300 (1060) shown in FIG. 12 is the same as the frame 300 shown in FIG. 11(*b*). This example of frame 300, however, is formed by superposing two frames 300*a* (1120*a*) and 300*b* (1120*b*) described below.

The operation of this embodiment will be described in detail with reference to FIGS. 10 through 12.

The frame 13 (1000) shown in FIG. 10A is a frame for displaying a setting menu relating to the lines 1 and 2.

When the line 1 standby OK lamp is on while the standby NG lamp is off, setting of the factors of the line 1 can be performed and various contents can be set.

Addresses rm0 and rm1 in the bit memory 107 in the reception buffer memory 105 of the setting display apparatus 100 are set in order in the standby OK lamp display component 1001 and the standby NG lamp display component 1002, respectively.

The lamp display component 1001 is turned on if the line 1 is in the standby OK state, and the lamp display component 1002 is turned on if the line 1 is in the standby NG state.

Subsequently, the number of executions of working A, the number of executions of working B, a heating time, and a working time are inputted by using the ten-key pad 1013.

Addresses sd0, sd1, sd2, and sd3 in the data memory 109 in the transmission buffer memory 108 of the setting display apparatus 100 are set in order in the working A execution numeric value setting component 1003, the working B execution numeric value setting component 1004, the heating time numeric value setting component 1005, and the working time numeric value setting component 1006, respectively.

Similarly, when the line 2 standby OK lamp is on while the standby NG lamp is off, setting of the factors of the line 2 can be performed and various contents can be set.

Addresses rm2 and rm3 in the bit memory 107 in the reception buffer memory 105 of the setting display apparatus 100 are set in order in the standby OK lamp display component 1007 and the standby NG lamp display component 1008, respectively.

The lamp display component 1007 is turned on if the line 2 is in the standby OK state, and the lamp component 1008 is turned on if the line 2 is in the standby NG state.

Subsequently, the number of executions of working A, the number of executions of working B, a heating time, and a working time are inputted by using the ten-key pad 1013.

Addresses sd4, sd5, sd6, and sd7 in the data memory 109 in the transmission buffer memory 108 of the setting display apparatus 100 are set in order in the working A execution numeric value setting component 1009, the working B execution numeric value setting component 1010, the heating time numeric value setting component 1011, and the working time numeric value setting component 1012, respectively.

After the completion of setting of various values with respect to the lines 1 and 2, a setting completion touch key (TK0) 1014 is pressed to change the current frame to the frame 14 (1020).

The frame 14 shown in FIG. 10B is a control menu frame for starting or stopping each of the lines 1 and 2 while checking the number of execution of working A, the number of execution of working B, the heating time, and the working time with respect to the line 1 or 2.

With respect to the line 1, the number of execution of working A is displayed in the working A execution numeric value setting component 1021, the number of execution of working B in the working B execution numeric value setting component 1022, the heating time in the heating time numeric value setting component 1023, and the working time in the working time numeric value setting component 1024.

The starting touch key component 1025 may be pressed to start the line 1, and stopping touch key component 1026 may be pressed to stop the line 1.

If it is necessary to know the production conditions about the line 1, the production condition 1 touch key (TK2) 1027 is pressed to change the current frame to the frame 100 (1040a) displaying the production conditions.

Similarly, with respect to the line 2, the number of execution of working A is displayed in the working A execution numeric value setting component 1028, the number of execution of working B in the working B execution numeric value setting component 1029, the heating time in the heating time numeric value setting component 1030, and the working time in the working time numeric value setting component 1031.

The starting touch key component 1032 may be pressed to start the line 2, and the stopping touch key component 1033 may be pressed to stop the line 2.

If it is necessary to know the production conditions about the line 2, the production condition 2 touch key (TK3) 1034 is pressed to change the current frame to the frame 200 (1040b) displaying the production conditions.

If it is necessary to return to the previous frame, i.e., the setting menu frame 1000, the touch key (TK1) 1035 for return to the previous frame is pressed to change the current frame to the setting menu frame 1000.

Addresses rd0, rd1, rd2, and rd3 in the data memory 106 in the reception buffer memory 105 of the setting display apparatus 100 are set in order in the line 1 working A execution numeric value setting component 1021, the line 1 working B execution numeric value setting component 1022, the heating time numeric value setting component 1023, and the working time numeric value setting component 1024, respectively. Also, addresses sm0 and sm1 in the bit memory 110 in the transmission buffer memory 108 of the setting display apparatus 100 are set in order in the line 1 starting touch key component 1025 and the line 1 stopping touch key component 1026, respectively.

Similarly, addresses rd4, rd5, rd6, and rd7 in the data memory 106 in the reception buffer memory 105 of the setting display apparatus 100 are set in order in the line 2 working A execution numeric value setting component 1028, the line 2 working B execution numeric value setting component 1029, the heating time numeric value setting component 1030, and the working time numeric value setting component 1031, respectively. Also, addresses sm2 and sm3 in the bit memory 110 in the transmission buffer memory 108 of the setting display apparatus 100 are set in order in the line 2 starting touch key component 1032 and the line 2 stopping touch key component 1033, respectively.

The frame 100 (1040a) shown in FIG. 10C is a frame for monitoring the production conditions about the line 1.

Address rd0 in the data memory 106 in the reception buffer memory 105 is assigned to the letter display component 1041a. Variable letter display is performed by the letter display component 1041a according to the content at address rd0. In the example shown in FIG. 10C, "LINE 1" is displayed in the letter display component 1041a.

The histogram 1042a is a graph for indicating a state of production of each of products A and B on the line 1. Addresses rd1 and rd2 in the data memory 106 in the reception buffer memory 105 of the setting display apparatus 100 are set in correspondence with the number of products A and the number of products B, respectively, to enable display of the state of production.

When the motor 1 is operating or not operating, the motor 1 operating state or stopped state is indicated in a lamp indication manner.

Addresses rm0 and rm1 in the bit memory 107 in the reception buffer memory 105 are respectively set in order in the lamp display component 1043a for indicating the motor 1 operating state and in the lamp display component 1044a for indicating the motor 1 stopped state.

Also, when the motor 2 is operating or not operating, the motor 2 operating state or stopped state is indicated in a lamp indication manner.

Addresses rm2 and rm3 in the bit memory 107 in the reception buffer memory 105 are respectively set in order in the lamp display component 1045a for indicating the motor 2 operating state and in the lamp display component 1046a for indicating the motor 2 stopped state.

If it is necessary to return to the previous frame, the previous frame key (TK4) 1047a is pressed to change the current frame to the frame 14 (1020).

The frame 200 (1040b) shown in FIG. 11(a) is a frame for monitoring the production conditions about the line 2.

Address rd0 in the data memory 106 in the reception buffer memory 105 is assigned to the letter display component 1041b. Variable letter display is performed by the letter display component 1041b according to the content at address rd0. In the example shown in FIG. 11(a), "LINE 2" is displayed in the letter display component 1041b.

The histogram 1042b is a graph for indicating a state of production of each of products A and B on the line 2. Addresses rd1 and rd2 in the data memory 106 in the reception buffer memory 105 are set in order in correspondence with the number of products A and the number of products B, respectively, to enable display of the state of production.

When the motor 1 is operating or not operating, the motor 1 operating state or stopped state is indicated in a lamp indication manner.

Addresses rm0 and rm1 in the bit memory 107 in the reception buffer memory 105 are respectively set in order in the lamp display component 1043b for indicating the motor 1 operating state and in the lamp display component 1044b for indicating the motor 1 stopped state.

Also, when the motor 2 is operating or not operating, the motor 2 operating state or stopped state is indicated in a lamp indication manner.

Addresses rm2 and rm3 in the bit memory 107 in the reception buffer memory 105 are respectively set in the lamp display component 1045b for indicating the motor 2 operating state and in the lamp display component 1046b for indicating the motor 2 stopped state.

If it is necessary to return to the previous frame, the previous frame key (TK5) 1047b is pressed to change the current frame to the frame 14 (1020).

The frame 300 shown in FIG. 11(b) is a frame displayed in an emergency.

In the illustrated example, the frame has such a content as to caution the operator about the operating state of the motor 2.

This frame is displayed when M300 in the bit memory 157 in the device memory 155 of the PLC 150, which is assigned for recognition of an emergency as described below, is turned on.

Address rd0 in the data memory 106 in the reception buffer memory 105 is assigned to the letter display component 1061 to enable letter display according to the content at address rd0. In the illustrated example, letters "MOTOR 2 IS OPERATING" are displayed.

If it is necessary to return to the previous frame, the previous frame key (TK6) 1062 is pressed to change the current frame to the frame 14 (1020).

The frame 300 (1060) is displayed by superposing two frames on each other, as described below.

The frame 400 shown in FIG. 11(c) is a second frame displayed in an emergency.

In the illustrated example, the frame has a content indicating the stopped state of the motor 1.

This frame is displayed when M400 in the bit memory 157 in the device memory 155 of the PLC 150 described below, which is assigned for recognition of an emergency, is turned on.

If it is necessary to return to the previous frame, the previous frame key (TK7) 1081 is pressed to change the current frame to the frame 14 (1020).

FIG. 12 indicates that the frame 300 shown in FIG. 11(b) is formed by superposing the frames 300a and 300b on each other.

Figure 13:
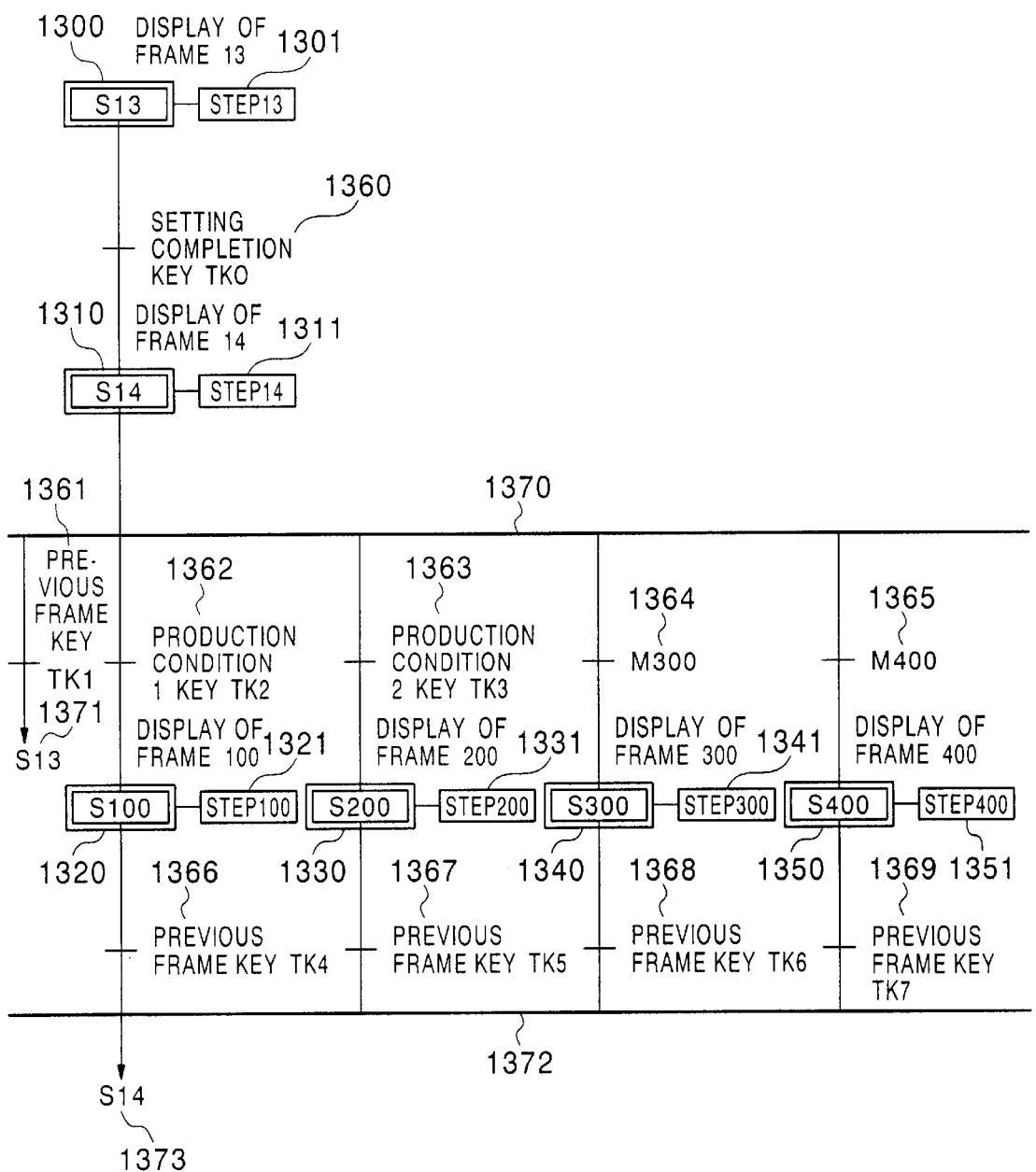
FIG. 13 is a shift diagram of Embodiment 3 of the present invention.

FIG. 13 is a diagram for explaining the operation for change to each frame in the apparatus in Embodiment 3 of the present invention.

In FIG. 13, a step block 1300 represents a state S13; a block 1301 is an output block accompanying the step block 1300; a step block 1310 represents a state S14; a block 1311 is an output block accompanying the step block 1310; a step block 1320 represents a state S100; a block 1321 is an output block accompanying the step block 1320; a step block 1330 represents a state S200; a block 1331 is an output block accompanying the step block 1330; a step block 1340 represents a state S300; a block 1341 is an output block accompanying the step block 1340; a step block 1350 represents a state S400; and a block 1351 is an output block accompanying the step block 1350.

In FIG. 13 are also shown shift conditions: a shift condition 1360 (setting completion key: TK0) for shifting from step block 1300 to step block 1310; a shift condition 1361 (previous frame key: TK1) for shifting from step block 1310 to step block 1300; a shift condition 1362 (production condition 1 key: TK2) for shifting from step block 1310 to step block 1320; a shift condition 1363 (production condition 2 key: TK3) for shifting from step block 1310 to step block 1330; shift condition 1364 (M300) for shifting from step block 1310 to step block 1340; a shift condition 1365 (M400) for shifting from step block 1310 to step block 1350; a shift condition 1366 (previous frame key: TK4) for shifting from step block 1320 to step block 1310; a shift condition 1367 (previous frame key: TK5) for shifting from step block 1330 to step block 1310; a shift condition 1368 (previous frame key: TK6) for shifting from step block 1340 to step block 1310; and a shift condition 1369 (previous frame key: TK7) for shifting from step block 1350 to step block 1310.

A selection branch line 1370 designates branching to a plurality of step blocks; a jump 1371 (to S13) indicates that the shift destination is step block 1300; a selection confluence line 1372 designates joining to a plurality of step blocks; and a jump 1373 (to S14) indicates that the shift destination is step block 1310.

Figure 14:
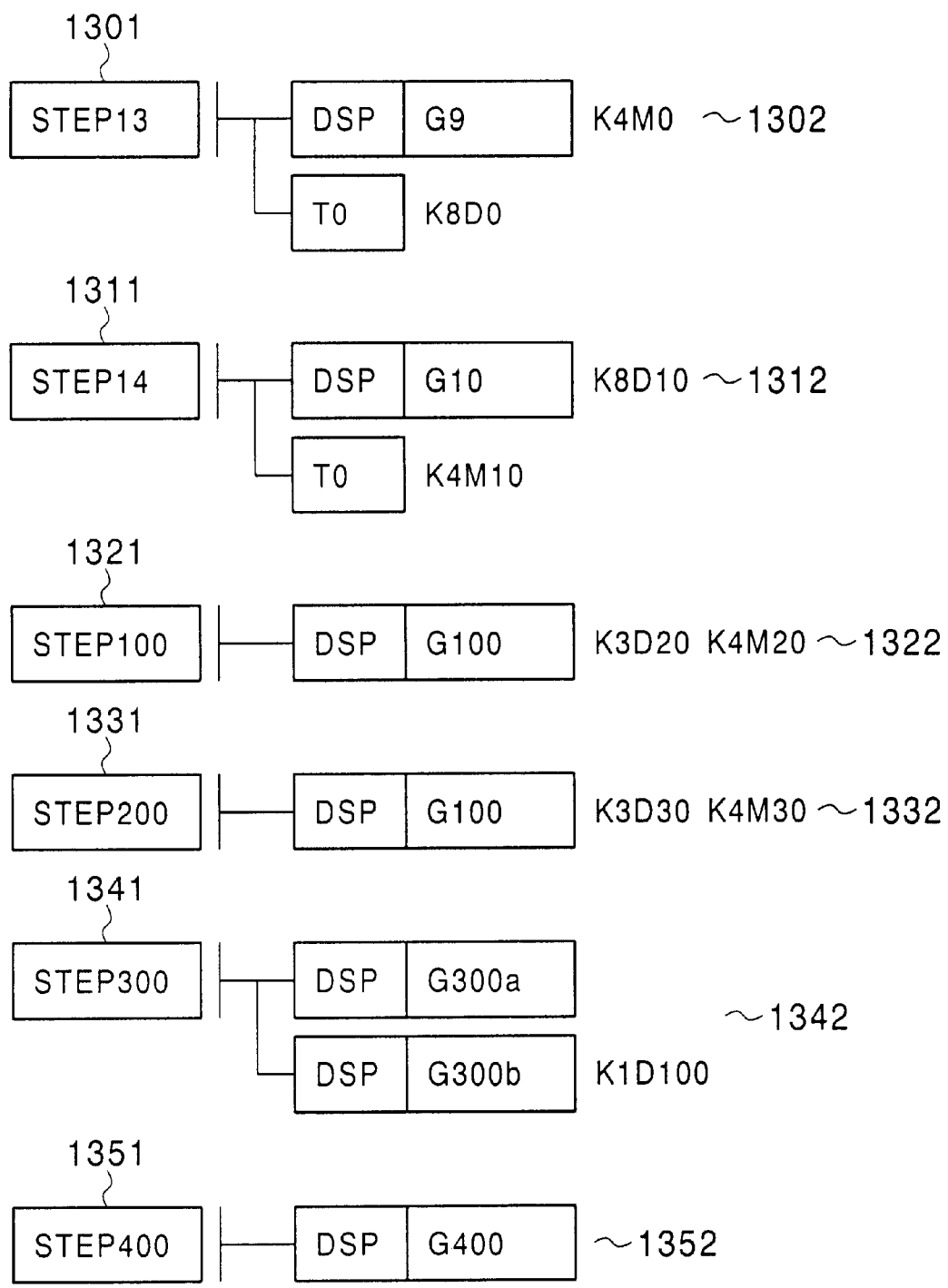
FIG. 14 is an output block diagram of Embodiment 3 of the present invention.

FIG. 14 is a diagram for explaining the above-described output blocks shown in FIG. 13 with respect to the apparatus in Embodiment 3 of the present invention.

Referring to FIG. 14, the output block 1301 has contents 1302; the output block 1311 has contents 1312; the output block 1321 has contents 1322; the output block 1331 has contents 1332; the output block 1341 has contents 1342; and the output block 1351 has contents 1352.

The functions and operation with respect to FIGS. 13 and 14 will now be described by referring to the examples of the frames shown in FIGS. 10 through 12.

In the following description, a parameter Kn (n: integer) placed before each device symbol denotes the number of consecutive items in the devices designated by the device symbol. For example, the notation K4M0 denotes consecutive four items from auxiliary relay M0, i.e., M0, M1, M2, and M3, and the notation K2D0 denotes consecutive two items from data register D0, i.e., D0 and D1.

The contents of the output block executed with respect to each step block shown in FIG. 14 will first be described. The block number of each block presents the above-mentioned individual frame number, and the frame number designated by an instruction in each output block represents the basic frame number.

At step block 1300, processing in accordance with the contents 1302 of the output block 1301 is executed.

The step block number 13 represents the individual frame number.

In the contents 1302 of the output block 1301, the meaning of an instruction "DSP G9 K4M0" is to display the basic frame 9 and to successively assign M0 to M4 to lamp display components on the frame.

The meaning of an instruction "TO K8D0" is to successively assign D0 to D7 to numeric value setting components on the basic frame 9.

At step block 1310, processing in accordance with the contents 1312 of the output block 1311 is executed.

The step block number 14 represents the individual frame number.

In the contents 1312 of the output block 1311, the meaning of an instruction "DSP G10 K8D10" is to display the basic frame 10 and to successively assign D10 to D17 to numeric value display components on the frame.

The meaning of an instruction "TO K4M10" is to successively assign M10 to M13 to touch key components on the basic frame 10.

At step block 1320, processing in accordance with the contents 1322 of the output block 1321 is executed.

The step block number 100 represents the individual frame number.

In the contents 1322 of the output block 1321, the meaning of an instruction "DSP G100 K3D20 K4M20" is to display the basic frame 100, to successively assign D20 to D22 to numeric value display components on the frame, and to successively assign M20 to M23 to lamp display components on the frame.

In a case where both kinds of display components, i.e., a numeric value setting display component and a lamp display component, exist as in this case, the parameters are arranged in order of the numeric value setting component and the lamp display component after the frame number.

At step block 1330, processing in accordance with the contents 1332 of the output block 1331 is executed.

The step block number 200 represents the individual frame number.

In the contents 1332 of the output block 1331, the meaning of an instruction "DSP G100 K3D30 K4M30" is to display the basic frame 100, to successively assign D30 to D32 to numeric value display components on the frame 100, and to successively assign M30 to M33 to lamp display components on the frame 100.

At step block 1340, processing in accordance with the contents 1342 of the output block 1341 is executed.

The step block number 300 represents the individual frame number.

In the contents 1342 of the output block 1341, the meaning of an instruction "DSP G300*a*" is to display the basic frame 300*a*.

Also, the meaning of an instruction "DSP G300*b* K1D100" is to display the basic frame 300*b* and to assign D100 to the numeric value display component on the frame.

Thus, a plurality of DSP instructions may be used to superpose a plurality of frames.

At step block 1350, processing in accordance with the contents 1352 of the output block 1351 is executed.

The step block number 400 represents the individual frame number.

In the contents 1352 of the output block 1351, the meaning of an instruction "DSP G400" is to display the basic frame 400.

Shifting to each block will next be described, referring to FIG. 13.

If at step block 1300 the setting completion key TK0 is pressed to satisfy the shift condition 1360, then a shift to the step block 1310 is made.

If at step block 1310 the previous frame key TK1 is pressed to satisfy the shift condition 1361, then jump 1371 is executed to make a shift to the step block 1300.

If at step block 1310 the product condition 1 key TK2 is pressed to satisfy the shift condition 1362, then a shift to the step block 1320 is made.

If at step block 1310 the product condition 2 key TK3 is pressed to satisfy the shift condition 1363, then a shift to the step block 1330 is made.

If at step block 1310 the device M300 is turned on to satisfy the shift condition 1364, then a shift to the step block 1340 is made.

If at step block 1310 the device M400 is turned on to satisfy the shift condition 1365, then a shift to the step block 1350 is made.

If at step block 1320 the previous frame key TK4 is pressed to satisfy the shift condition 1366, then jump 1373 is executed to make a shift to the step block 1310 corresponding to the previous frame.

If at step block 1330 the previous frame key TK5 is pressed to satisfy the shift condition 1367, then jump 1373 is executed to make a shift to the step block 1310 corresponding to the previous frame.

If at step block 1340 the previous frame key TK6 is pressed to satisfy the shift condition 1368, then jump 1373 is executed to make a shift to the step block 1310 corresponding to the previous frame.

If at step block 1350 the previous frame key TK7 is pressed to satisfy the shift condition 1369, then jump 1373 is executed to make a shift to the step block 1310 corresponding to the previous frame.

The shift explanation diagram of FIG. 13 graphically shows the above-described operations and has the advantage of enabling the flow through each block to be easily understood visually.

For the frames displayed in the states S100 and S200, the basic frame 100 is used and the contents of the frames to be displayed are changed according to the contents of the output blocks.

Therefore, the displayed contents can be changed easily, as can also be understood from the output block contents 1322 and 1332.

For superposition of frames, a sequence of a plurality of DSP instructions, which can be easily provided, may suffice, as can be understood from the output block contents 1342.

Figure 15:
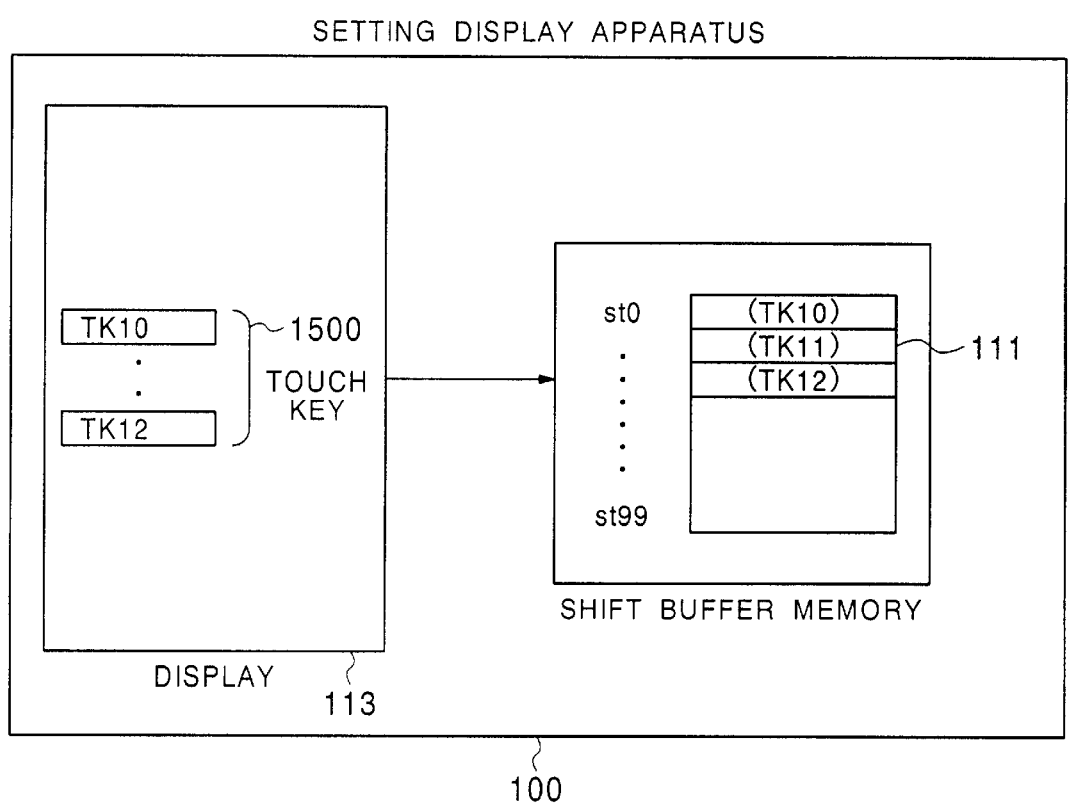
FIG. 15 is a shift signal diagram of Embodiment 3 of the present invention.

FIG. 15 is a diagram showing shift signals used in the apparatus in Embodiment 3 of the present invention.

FIG. 15 illustrates touch key components 1500 for controlling changing of frames, and a shift buffer memory 111 having addresses st0 to st99. Information on the current ON/OFF states of touch keys TK0, TK1, TK2, . . . is stored at the addresses in the buffer memory.

The operation with respect to FIG. 15 will be described.

Referring to FIG. 15, the ON/OFF states of the touch keys 1500 are stored successively from the top address in the shift buffer memory 111 in the setting display apparatus 100.

The setting display apparatus 100 refers to the contents of the shift buffer memory 111 when it needs the contents of the touch keys 1500 for its internal processing.

For example, when one of the touch keys relating to the shift conditions shown in the shift step diagram of FIG. 13, i.e., shift condition (setting completion key: TK0) 1360, shift condition (previous frame key: TK1) 1361, shift condition (production condition 1 key: TK2) 1362, shift condition (production condition 2 key: TK3) 1363, shift condition (previous frame key: TK4) 1366, shift condition (previous frame key: TK5) 1367, shift condition (previous frame key: TK6) 1368, and shift condition (previous frame key: TK7) 1369, is pressed to make the setting display apparatus 100 refer to the state of the touch key, the setting display apparatus 100 refers to the corresponding content in the shift buffer memory 111.

The operation of the setting display apparatus 100 internally referring to the contents of the touch keys by using the buffer memory 111 in the system arranged as shown in FIG. 1 has been described. Also in the system arranged as shown in FIG. 7, the setting display apparatus 700 operates in the same manner to internally refers to the contents of the touch keys by using the shift buffer memory 111.

FIG. 16 is a list program used in the apparatus in Embodiment 3 of the present invention. When the FIGS. 13 and 14 are drawn on the screen of the programming tool 114, the list program shown in FIG. 16 is automatically obtained.

Alternatively, list-based programming may be performed by key operations of the programming tool 114.

The contents of the list program shown in FIG. 16 will be described.

"BEGIN" in step 1380 is an instruction representing the start of the list program.

"STL S13" in step 1300a is an instruction representing the start of state S13.

"DSP G9" in step 1302a is an instruction to display the basic frame 9. "FROM K4M0" in step 1302a is an instruction to provide four lamp display components on the frame and to assign consecutive four items from M0 to M3 to the components. "TO K8D0" in step 1302a is an instruction to provide eight numeric value setting components on the frame and to assign consecutive eight items from D0 to D7 to the components. A combination of these instructions "DSP G9, FROM K4M0, TO K8D0" is an instruction to set lamp display components M0 to M3 and numeric value setting components D0 to D7 on the basic frame 9.

"LD TK0" in step 1360a is an instruction to set touch key TK0 as a shift condition. "SET S14" in step 1360a is an instruction to make a shift to state S14 when the shift condition is satisfied. A combination of these instructions "LD TK0, SET S14" is an instruction to make a shift to state S14 when the touch key TK0 is turned on.

"STL S14" in step 1310a is an instruction representing the start of state S14.

"DSP G10" in step 1312a is an instruction to display the basic frame 10. "FROM K8D10" in step 1312a is an instruction to provide eight display components on the frame and to assign consecutive eight items from D10 to D17 to the components. "TO K4M10" in step 1312a is an instruction to provide four setting components on the frame and to assign consecutive four items from M10 to M13 to the components. A combination of these instructions "DSP G10, FROM K8D10, TO K4M10" is an instruction to set display components D10 to D17 and setting components M10 to M13 on the basic frame 10.

"LD TK1" in step 1361a is an instruction to set touch key TK1 as a shift condition. "SET S13" in step 1361a is an instruction to make a shift to state S13 when the shift condition is satisfied. A combination of these instructions "LD TK1, SET S13" is an instruction to make a shift to state S13 when the touch key TK1 is turned on.

"LD TK2" in step 1362a is an instruction to set touch key TK2 as a shift condition. "SET S100" in step 1362a is an instruction to make a shift to state S100 when the shift condition is satisfied. A combination of these instructions "LD TK2, SET S100" is an instruction to make a shift to state S100 when the touch key TK2 is turned on.

"LD TK3" in step 1363a is an instruction to set touch key TK3 as a shift condition. "SET S200" in step 1363a is an instruction to make a shift to state S200 when the shift condition is satisfied. A combination of these instructions "LD TK3, SET S200" is an instruction to make a shift to state S200 when the touch key TK3 is turned on.

"LD M300" in step 1364a is an instruction to set device M300 of the PLC as a shift condition. "SET S300" in step 1364a is an instruction to make a shift to state S300 when the shift condition is satisfied. A combination of these instructions "LD M300, SET S300" is an instruction to make a shift to state S300 when M300 is turned on.

"LD M400" in step 1365a is an instruction to set device M400 of the PLC as a shift condition. "SET S400" in step 1365a is an instruction to make a shift to state S400 when the shift condition is satisfied. A combination of these instructions "LD M400, SET S400" is an instruction to make a shift to state S400 when M400 is turned on.

"STL S100" in step 1320a is an instruction representing the start of state S100.

"DSP G100" in step 1322a is an instruction to display the basic frame 100. "FROM K3D20" in step 1322a is an instruction to provide three numeric value display components on the frame and to assign consecutive three items from D20 to D22 to the components. "FROM K4M20" in step 1322a is an instruction to provide four lamp display components on the frame and to assign consecutive four items from M20 to M23 to the components. A combination of these instructions "DSP G100, FROM K3D20, FROM K4M20" is an instruction to set numeric value display components D20 to D22 and lamp display components M20 to M23 on the basic frame 100.

"LD TK4" in step 1366a is an instruction to set touch key TK4 as a shift condition. "SET S14" in step 1366a is an instruction to make a shift to state S14 when the shift condition is satisfied. A combination of these instructions "LD TK4, SET S14" is an instruction to make a shift to state S14 when the touch key TK4 is turned on.

"STL S200" in step 1330a is an instruction representing the start of state S200.

"DSP G100" in step 1332a is an instruction to display the basic frame 100. "FROM K3D30" in step 1332a is an instruction to provide three numeric value display components on the frame and to assign consecutive three items from D30 to D32 to the components. "FROM K4M30" in step 1332a is an instruction to provide four lamp display components on the frame and to assign consecutive four items from M30 to M33 to the components. A combination of these instructions "DSP G100, FROM K3D30, FROM K4M30" is an instruction to set numeric value display components D30 to D32 and lamp display components M30 to M33 on the basic frame 100.

"LD TK5" in step 1367a is an instruction to set touch key TK5 as a shift condition. "SET S14" in step 1367a is an instruction to make a shift to state S14 when the shift condition is satisfied. A combination of these instructions "LD TK5, SET S14" is an instruction to make a shift to state S14 when the touch key TK5 is turned on.

"STL S300" in step 1340a is an instruction representing the start of state S300.

"DSP G300a" in step 1342a is an instruction to display the basic frame 300a. "DSP G300b" in step 1342a is an instruction to display the basic frame 300b. "FROM K1D100" in step 1342a is an instruction to provide one numeric value display component on the basic frame 300b and to assign D100 (one item from D100) to the component. A combination of these instructions "DSP G300b, FROM K1D100" is an instruction to set numeric value display component D100 (one item from D100) on the basic frame 300b. Also, a combination "DSP G300a, DSP G300b" is an instruction to superpose the basic frame 300a and the basic frame 300b on each other.

"LD TK6" in step 1368a is an instruction to set touch key TK6 as a shift condition. "SET S14" in step 1368a is an instruction to make a shift to state S14 when the shift condition is satisfied. A combination of these instructions "LD TK6, SET S14" is an instruction to make a shift to state S14 when the touch key TK6 is turned on.

"STL S400" in step 1350a is an instruction representing the start of state S400.

"DSP G400" in step 1352a is an instruction to display the basic frame 400. "LD TK7" in step 1369a is an instruction to set touch key TK7 as a shift condition. "SET S14" in step 1369a is an instruction to make a shift to state S14 when the shift condition is satisfied. A combination of these instructions "LD TK7, SET S14" is an instruction to make a shift to state S14 when the touch key TK7 is turned on.

"END" in step 1381 is an instruction representing the end of the list program.

A program in list form realized from the frame flow program in SFC form shown in FIGS. 13 and 14 has been described. Needless to say, the program written in SFC form and the program written in list form are interchangeable.

Embodiment 4 (FIG. 17)

A fourth embodiment of the present invention will be described.

FIGS. 17A and 17B are diagrams respectively showing the configurations of systems in Embodiment 4 of the present invention. In each system, a plurality of programmable controllers are selectively connected to one setting display apparatus, and a frame forming program is stored in the setting display apparatus, while a frame flow program is stored in each programmable controller.

In the system arranged as shown in FIG. 17(a), a setting display apparatus 700 and a number of n PLCs are connected in a 1:n relationship through a network.

Referring to FIG. 17(a), PLC 1 indicated by 1700a is the first of the n PLCs, PLC 2 indicated by 1701a is the second of the n PLCs, and PLC n indicated by 1702a is the nth of the n PLCs.

A frame forming program for the PLCs 1 to n is indicated by 1710a, a frame flow program for the PLC 1 is indicated by 1720a, a frame flow program for the PLC 2 is indicated by 1721a, and a frame flow program for the PLC n is indicated by 1722a.

In the system arranged as shown in FIG. 17(b), a setting display apparatus 700 and a number of n PLCs are connected in a 1:n relationship by using a detachable connector described below.

Referring to FIG. 17(b), PLC 1 indicated by 1700b is the first of the n PLCs, PLC 2 indicated by 1701b is the second of the n PLCs, and PLC n indicated by 1702b is the nth of the n PLCs.

A frame forming program for the PLCs 1 to n is indicated by 1710b, a frame flow program for the PLC 1 is indicated by 1720b, a frame flow program for the PLC 2 is indicated by 1721b, and a frame flow program for the PLC n is indicated by 1722b.

A detachable connector 1730 is provided to selectively connect the setting display apparatus 700 to one of the PLCs 1700b, 1701b, and 1702b.

The operation of this embodiment will now be described.

FIG. 17(a) shows an example of PLC management in which n PLCs are connected to and controlled by one setting display apparatus through a network.

Frame forming program 1710a used in common for all the PLCs 1 to n is stored in the setting display apparatus 700, and a frame flow program specific to each of the PLCs 1 to n is stored in the PLC.

The setting display apparatus 700 determines one of the PLCs as a target, accesses the target PLC, and executes the frame forming program for the PLCs 1 to n and the frame flow program stored in the accessed PLC to perform the setting/display process.

FIG. 17(b) shows an example of PLC management in which n PLCs are selectively connected to one setting display apparatus by the detachable connector to be controlled.

Frame forming program 1710b used in common for all the PLCs 1 to n is stored in the setting display apparatus 700, and a frame flow program specific to each of the PLCs 1 to n is stored in the PLC.

The setting display apparatus 700 determines one of the PLCs as a target by using the detachable connector 1730 for connection thereto, and executes the frame forming program for the PLCs 1 to n and the frame flow program stored in the target PLC to perform the setting/display process.

FIGS. 18A and 18B are project division diagrams relating to the systems shown in FIGS. 17A and 17B.

FIG. 18(a) is a diagram showing comparison between the program configuration in accordance with the conventional method and the program configuration in accordance with the method of the present invention with respect to a case where two PLCs are managed.

In FIG. 18(a), a display program in accordance with the conventional method is indicated by 1800, a program for a project 1, i.e., a PLC 1 display program, is indicated by 1801, and a program for a project 2, i.e., a PLC 2 display program, is indicated by 1802.

A display program in accordance with the method of the present invention is indicated by 1803, a frame forming program used in common for PLCs is indicated by 1804, a frame flow program for a project 1, i.e., a PLC 1 frame flow program, is indicated by 1805, and a frame flow program for a project 2, i.e., a PLC 2 frame flow program, is indicated by 1806.

FIG. 18(b) is a diagram showing comparison of the requisite memory capacity 1807 between the conventional method and the method of the present invention with respect to a case where two projects exist.

The operations with respect to FIGS. 18A and 18B will be described.

In the case of the display program 1800 based on the conventional method, project 1 display program 1801 and project 2 display program 1802 are required if two projects exist which are to be managed with the setting display apparatus 700. The necessary number of display programs corresponds to the number of projects, i.e., the number of PLCs to be selectively connected.

In the case of the display program 1803 in accordance with the method of the present invention, the frame forming program 1804 used in common for PLCs, project 1 frame flow program 1805 and project 2 frame flow program 1806 are required if two projects exist which are to be managed with the setting display apparatus 700.

As can be understood from the memory capacity 1807 required by the conventional method and the method of the present invention, the total memory capacity required by the method of the present invention is reduced relative to that required by the conventional method because of common use of the frame forming program for the projects.

Embodiment 5 (FIG. 19)

A fifth embodiment of the present invention will be described.

FIGS. 19A and 19B are diagrams respectively showing the configurations of systems in Embodiment 5 of the present invention. In each system, a plurality of programmable controllers are selectively connected to one setting display apparatus, and a frame forming program and frame flow programs are stored in the setting display apparatus side.

In the system arranged as shown in FIG. 19(a), a setting display apparatus 100 and a number of n PLCs are connected in a 1:N relationship through a network.

Referring to FIG. 19(a), PLC 1 indicated by 1900a is the first of the n PLCs, PLC 2 indicated by 1901a is the second of the n PLCs, and PLC n indicated by 1902a is the nth of the n PLCs.

A frame forming program for the PLCs 1 to n is indicated by 1910a, a frame flow program for the PLCs 1 to n is indicated by 1911a, a PLC 1 identification number is indicated by 1920a, a PCL 2 identification number is indicated by 1921a, and a PCL n identification number is indicated by 1922a.

In the system arranged as shown in FIG. 19(b), a setting display apparatus 100 and a number of n PLCs are connected in a 1:N relationship by using a detachable connector described below.

Referring to FIG. 19(b), PLC 1 indicated by 1900b is the first of the n PLCs, PLC 2 indicated by 1901b is the second of the n PLCs, and PLC n indicated by 1902b is the nth of the n PLCs.

A frame forming program for the PLCs 1 to n is indicated by 1910b, a frame flow program for the PLCs 1 to n is indicated by 1911b, a PLC 1 identification number is indicated by 1920b, a PLC 2 identification number is indicated by 1921b, and a PLC n identification number is indicated by 1922b.

A detachable connector 1930 is provided to selectively connect the setting display apparatus 100 to one of the PLCs 1900b, 1901b, and 1902b.

The operation of this embodiment will now be described.

As shown in FIG. 19(a), a frame forming program 1910a used in common for all the PLCs 1 to n and frame flow programs 1911a for all the PLCs 1 to n are stored in the setting display apparatus 100.

The setting display apparatus 100 determines one of the PLCs as a target, identifies the target PLC by using the below-described identification number stored in the PLC, and executes the frame forming program for the PLCs 1 to n and the corresponding frame flow program in the frame flow programs for the PLCs 1 to n to perform the setting/display process with respect to the target PLC.

As shown in FIG. 19(b), a frame forming program 1910b used in common for all the PLCs 1 to n and frame flow programs 1911b for all the PLCs 1 to n are stored in the setting display apparatus 100.

The setting display apparatus 100 determines one of the PLCs as a target by using the detachable connector 1730 for selective connection thereto, identifies the target PLC by using the below-described identification number stored in the PLC, and executes the frame forming program for the PLCs 1 to n and the corresponding frame flow program in the frame flow programs stored in PLC for the PLCs 1 to n to perform the setting/display operation.

Figure 20A:
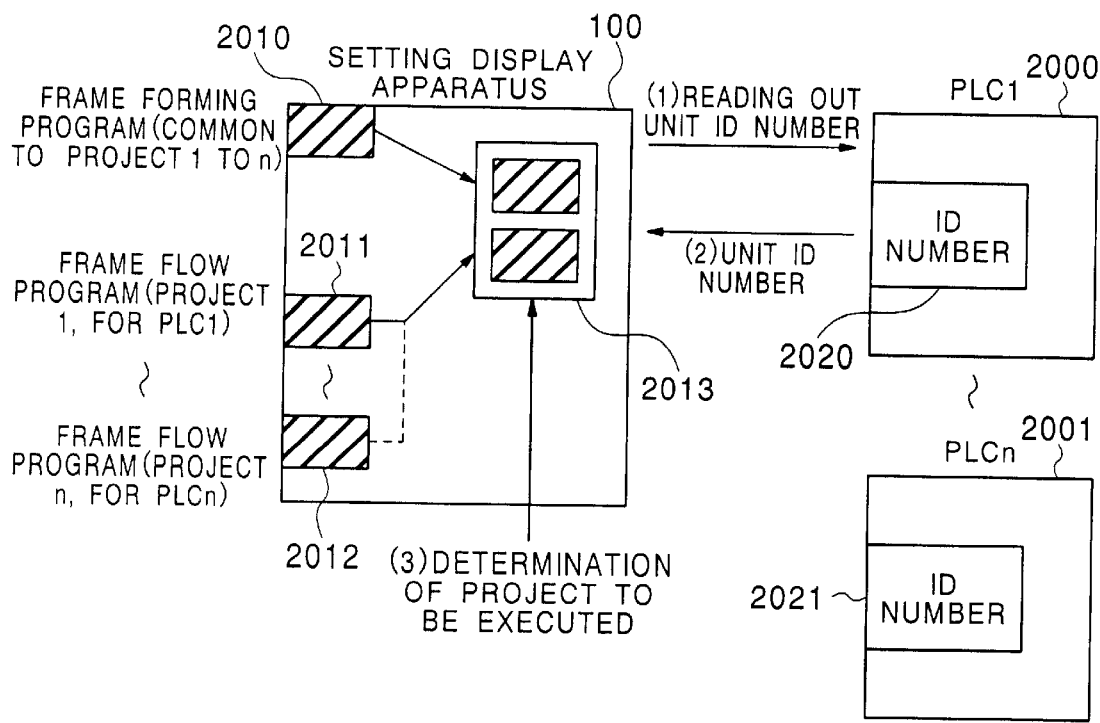
FIGS. 20A and 20B are diagrams showing the identification operation of the apparatus shown in FIGS. 19(a) and 19(b)
Figure 20B:
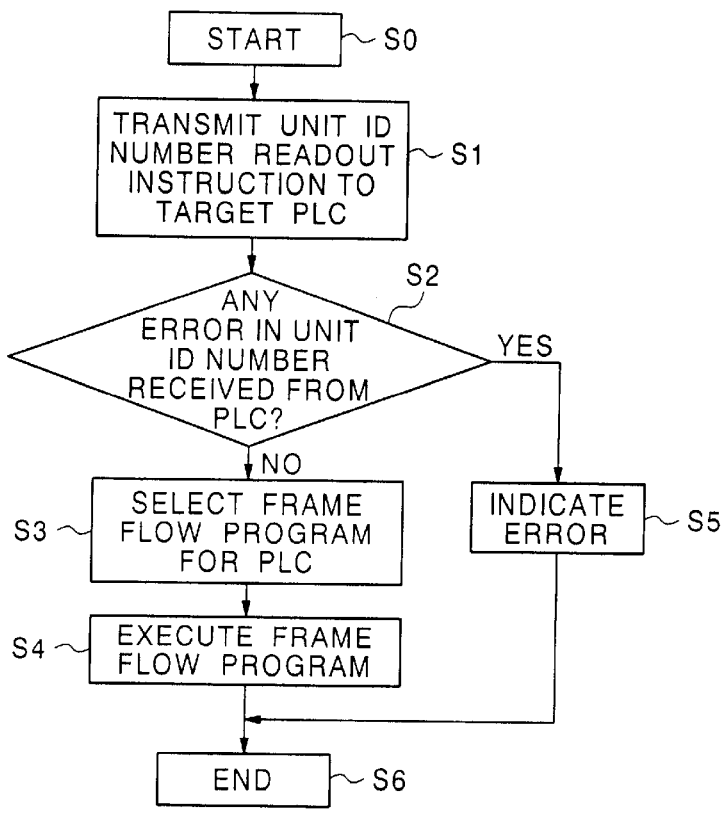

FIGS. 20A and 20B are diagrams for explaining the operation of the apparatuses shown in FIGS. 19A and 19B with respect to PLC identification.

FIG. 20A shows the constituents of the system relating to recognition of the identification number of each PLC by the setting display apparatus 100.

Referring to FIG. 20A, the system includes PLC 1 (2000), PLC n (2001), a project-common frame forming program 2010, a project 1 frame flow program 2011, a project n frame flow program 2012, a project 2013 to be executed, an identification number 2020 stored in the PLC 1 (2000), and an identification number 2021 stored in the PLC n (2001).

FIG. 20B is a flowchart showing the process in which the setting display apparatus 100 recognizes the identification number of the PLC.

Referring to FIG. 20B, the process includes a step S0 from which the process starts; a step S1 which is performed after step S0, and in which a unit identification number reading instruction is transmitted to the target PLC; a step S2 which is performed after step S1, and in which a determination is made as to whether there is an error in the unit identification number received from the PLC; a step S3 which is performed if the result of determination in step S2 is "NO", and in which the frame flow program for the PLC is selected; a step S4 which is performed after step S3, and in which the frame flow program is executed; a step S5 which is performed if the result of determination in step 2 is "YES", and in which an error indication is made; and a step S6 which is performed after step S4 or S5, and in which the process ends.

The operation will be described with reference to FIG. 20A.

First, the setting display apparatus 100 selects one of the PLCs 1 (2000) to n (2001) as a target and reads out the unit identification number of the selected PLC.

Next, the setting display apparatus 100 determines the frame flow program to be executed, by using the unit identification number read out.

For example, if the PLC 1 (2000) is selected as a target, the setting display apparatus 100 reads out the unit identification number 2020 from the PLC 1 2000.

The setting display apparatus 100 selects the project 1 frame flow program 2011 by using the unit identification number 2020.

The setting display apparatus 100 executes the project-common frame forming program 2010 and the project 1 frame flow program 2011 to perform setting/display of the PLC 1 (2000).

This operation will be further described with reference to the flowchart of FIG. 20B showing this operation.

In step S0, the process starts.

In step S1, the setting display apparatus 100 transmits to the target PLC an instruction to read out the unit identification number.

In step S2, the setting display apparatus 100 checks whether there is an error in the unit identification number received from the target PLC, and performs processing according to the existence/nonexistence of an error.

If there is an error, the process moves to step S5 in which the setting display apparatus 100 makes an error indication. The process then advances to step S6 to end.

If there is no error, the process advances to step S3 and the setting display apparatus 100 selects the frame flow program for the PLC by using the unit identification number received from the PLC.

In step S4, the setting display apparatus 100 executes the frame flow program. The process then advances to step S6 to end.

Embodiment 6

The shift step diagram shown in FIG. 13 has been described as a method for preparing a frame flow program. However, this method is not exclusively used and a program table described below may alternatively used to prepare a frame flow program.

Figure 21A:
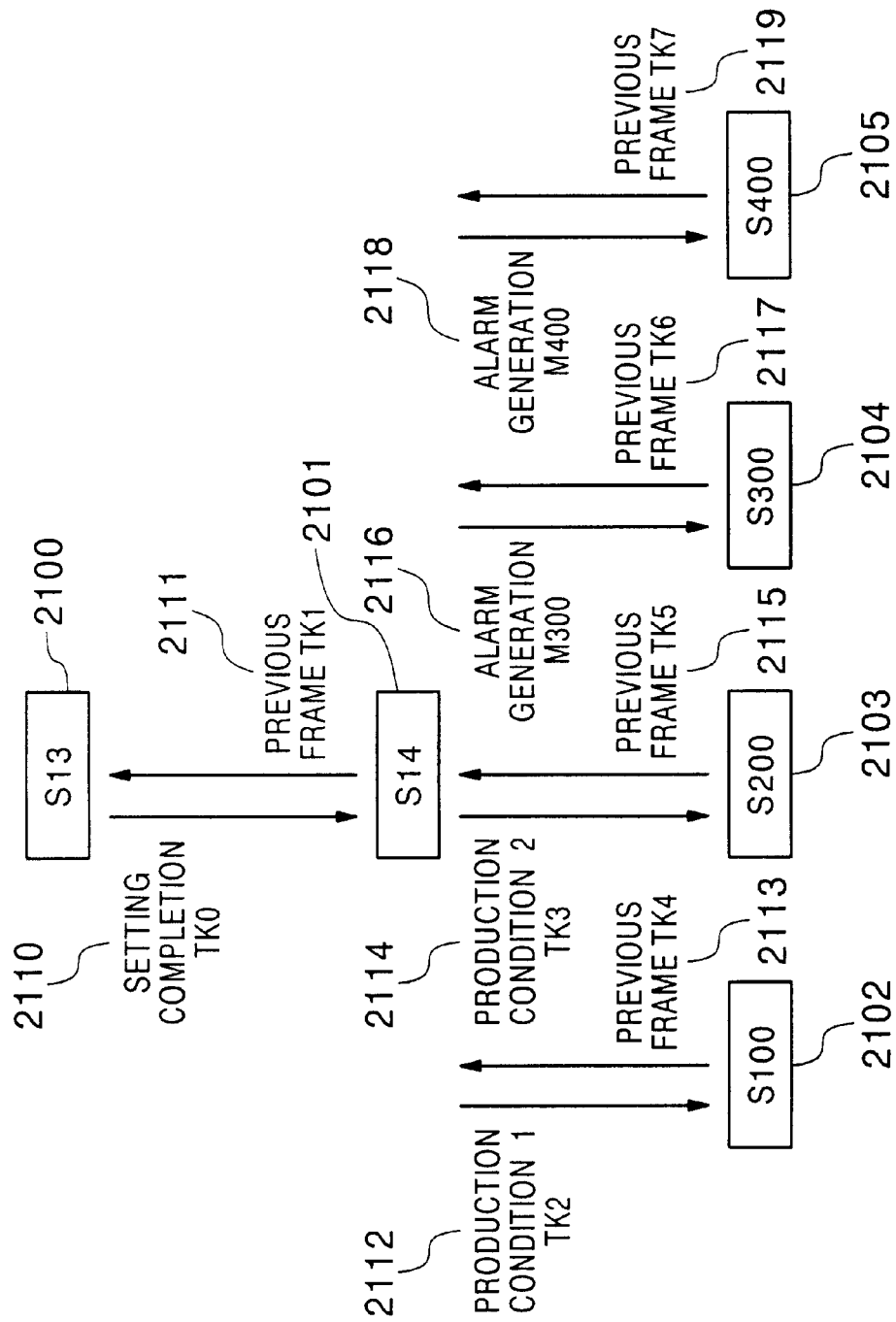
Figure 22A:
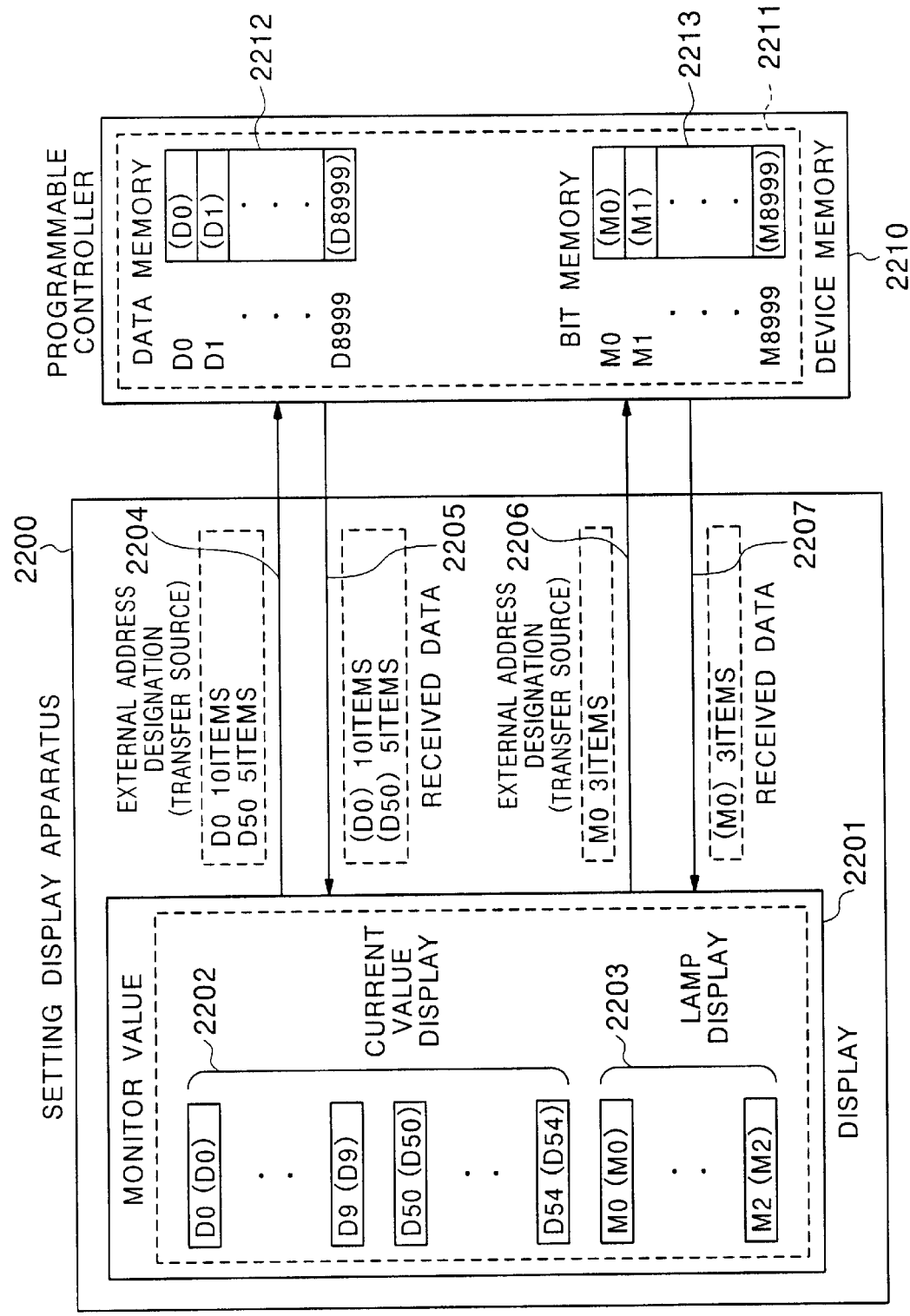
Figure 25A:
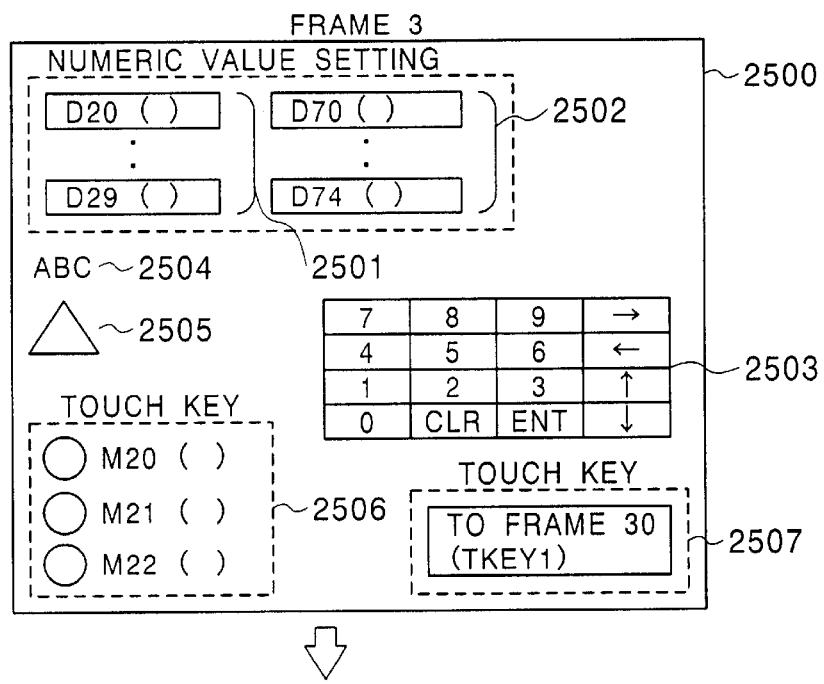

FIGS. 21A and 21B are a frame display shift step diagram and a program flow table, respectively, relating to an apparatus in a sixth embodiment of the present invention. These diagrams show a frame flow program expression form corresponding to that shown in FIGS. 10 through 12.

FIG. 21A shows a step 2100 for displaying frame 13, a step 2101 for displaying frame 14, a step 2102 for displaying frame 100, a step 2103 for displaying frame 200, a step 2104 for displaying frame 300, and a step 2105 for displaying frame 400.

In FIG. 21A are also indicated a frame change condition 2110 of change from frame 13 to frame 14, a frame change condition 2111 of change from frame 14 to frame 13, a frame change condition 2112 of change from frame 14 to frame 100, a frame change condition 2113 of change from frame 100 to frame 14, a frame change condition 2114 of change from frame 14 to frame 200, a frame change condition 2115 of change from frame 200 to frame 14, a frame change condition 2116 of change from frame 14 to frame 300, a frame change condition 2117 of change from frame 300 to frame 14, a frame change condition 2118 of change from frame 14 to frame 400, and a frame change condition 2119 of change from frame 400 to frame 14.

The program table shown as FIG. 21B is a program table for preparing a frame flow program corresponding to the contents of FIG. 21A.

The program table is constituted by step numbers (corresponding to individual frame numbers), display frame numbers (corresponding to basic frame numbers), component names (touch key names), frame change conditions, change destination step numbers, superposed frame numbers, displayed device top addresses (the numbers of necessary items), and set device top addresses (the numbers of necessary items).

For example, from step S13, the basic frame 9 is displayed since the display frame number items is 9; consecutive four lamp components from M0 are displayed since the displayed device top address (the number of necessary items) is M0 (4); and consecutive eight numeric value setting components from D0 are displayed since the set device top address item (the number of necessary items) is D0 (8).

Also, the state of touch key TK0 (setting completion) is monitored since the component name (touch key name) item is TK0 (setting completion). If the touch key is ON, a shift to step 14 is made since the change destination step number item is 14.

From step S14, the basic frame 10 is displayed since the display frame number items is 10; consecutive eight numeric value setting components from D10 are displayed since the displayed device top address (the number of necessary items) is D10 (8); and consecutive four touch key components from M10 are displayed since the set device top address item (the number of necessary items) is M10 (4).

Also, the states of touch key TK1 (previous frame), touch key TK2 (production condition 1), touch key TK3 (production condition 2), device M300, and device M400 are monitored since the component name (touch key name) items are TK1 (previous frame), TK2 (production condition 1), TK3 (production condition 2), M300, and M400.

If TK1 (previous frame) is ON, a shift to step 13 is made since the change destination step number item is 13. If TK2 (production condition 1) is ON, a shift to step 100 is made since the change destination step number item is 100. If TK3 (production condition 2) is ON, a shift to step 200 is made since the change destination step number item is 200. If M300 is logical "1", a shift to step 300 is made since the change destination step number item is 300. If M400 is logical "1", a shift to step 400 is made since the change destination step number item is 400.

From step S100, the basic frame 100 is displayed since the display frame number items is 100; and consecutive three items from D20 and consecutive four items from M20 as lamp components are displayed since the displayed device top addresses (the numbers of necessary items) are D20 (3) and M20 (4).

Also, the state of touch key TK4 (previous frame key) is monitored since the component name (touch key name) item is TK4 (previous frame key). If the touch key is ON, a shift to step 14 is made since the change destination step number item is 14.

From step S200, the basic frame 100 is displayed since the display frame number items is 100, as in the case of step 100, but consecutive three items from D30 and consecutive four items from M30 as lamp components are displayed since the displayed device top addresses (the numbers of necessary items) are D30 (3) and M30 (4).

In this case, the state of touch key TK5 (previous frame key) is monitored since the component name (touch key name) item is TK5 (previous frame key). If the touch key is ON, a shift to step 14 is made since the change destination step number item is 14.

From step S300, the basic frame 300a is displayed since the display frame number items is 300a; and D100 is displayed since the displayed device top address (the number of necessary items) is D100 (1).

Also, a frame formed by superposing the basic frame 300b on the basic frame 300a is displayed since there is an entry of a superposition frame number 300b.

In this case, the state of touch key TK6 (previous frame key) is monitored since the component name (touch key name) item is TK6 (previous frame key). If the touch key is ON, a shift to step 14 is made since the change destination step number item is 14.

From step S400, the basic frame 400 is displayed since the display frame number items is 400.

In this case, the state of touch key TK7 (previous frame key) is monitored since the component name (touch key name) item is TK7 (previous frame key). If the touch key is ON, a shift to step 14 is made since the change destination step number item is 14.

As is apparent from the foregoing, the present invention is basically characterized by dividing a frame display program into a frame forming program and a frame flow program, and Embodiment 1 and Embodiment 2 differ in the location of the frame flow program selected between the setting display apparatus side and the programmable controller side.

With respect to Embodiment 3 and Embodiment 6, a sequential function chart method and a program table method have respectively been proposed as a method of managing frame flow programs in practice.

Further, with respect to a case where a plurality of programmable controllers are selectively connected to one setting display apparatus, Embodiment 4 and Embodiment 5 differ in the location of the frame flow program selected between the setting display apparatus side and the programmable controller side.

The setting display apparatus in each of the embodiments of the invention has been described as a unit structurally separate from the programmable controller. However, the setting display apparatus may be structurally integral with the programmable controller in the embodiments other than Embodiments 4 and 5.

In such a case, information communication between the setting display apparatus and the programmable controller may be performed by means of a 2-port random-access memory (RAM) or the like, or by writing information to a common RAM through a direct memory access controller.

The device memory in the programmable controller comprises data memories such as a register for storing the current value of a timer T or a counter C and a set value register as well as data register D, and also comprises bit memories for an input relay X, an output relay Y, a timer T output contact, a counter C output contact, etc., as well as auxiliary relay M.

It is an easy and convenient method that the various devices are transmitted to the data register D or auxiliary relay M in the programmable controller, and the communication between the setting display apparatus and the programmable controller is executed only through the data register D or auxiliary relay M.

In the method of naming the various buffer memories in the setting display apparatus shown in FIG. 1 or 7, substitutive numbers such as those described below may be used.

Data memory 106 in reception buffer memory 105: rd0 to rd99→D9000 to D9099

Bit memory 107 in reception buffer memory 105: rm0 to rm99→M9000 to M9099

Data memory 109 in transmission buffer memory 108: sd0 to sd99→D9100 to D9199

Bit memory 110 in transmission buffer memory 108: sm0 to sm99→M9100 to M9199

Although "D" and "M" in the device symbols are used in these substitutive numbers, the ranges of the substitutive numbers are set separately from those of the values used in the programmable controller to avoid duplication.

Thus, in programming of, for example, the displayed position, size, color, etc., of the contents of the reception buffer memory in the frame forming program, a target address may be changed from rd0 to D9000, which seems to be apparently equivalent to a device address used by the programmable controller. However, D9000 is, by definition, an address name number for the reception buffer memory.

As has been described, the setting display apparatus for a programmable controller according to the present invention takes the following effects.

This invention is a setting display apparatus for programmable controller comprising: a first CPU capable of operating in accordance with a user program stored in a first memory; a reception buffer memory for temporally storing received data; operating keys for performing various kinds of input; and a switchable display capable of switching a plurality of frames, the apparatus being capable of being connected to one programmable controller having a second CPU capable of operating in accordance with a user program stored in a second memory, and a device memory in which control information is stored, wherein communication of various signals including contents of the device memory is performed between the first and second CPUs; a display program for display on the switchable display is divided into a frame flow program and a frame forming program for forming a basic frame; the frame forming program includes basic frame number information, address information about the device memory from which a content display is to be made, information on the size of a letter and a figure on a frame, and information on a layout of data displayed on the frame; and the frame flow program includes individual frame number information, target basic frame number information, address information about the device memory from which a content display is to be made, a frame switching shift condition, and shift destination individual frame number information. Since the display program of the setting display apparatus is divided into the frame flow program which is adherent to mechanical control and the frame forming program which is generated with respect to each of the basic frame, the allotment of design work of the display program can be easy and the memory capacity can be reduced by using the frame forming program doubly.

Also, in the apparatus according to the present invention, the information on the address in the device memory in the frame forming program comprises an address number in the reception buffer memory; the address information about the device memory in the frame flow program is constituted by a number or consecutive numbers designated by a top address number in the device memory and the number of necessary items in the device memory; and address numbers in the reception buffer memory and address numbers in the device memory correspond to each other in numerical order. The setting display apparatus is provided with reception buffer memory so as to have a means for designating addresses for a display information indirectly. If the device memory number for a monitor in the frame flow program is changed, it is not necessary to change the address of the frame forming program. Therefore, the independence of the both programs can be sure and the design efficiency can be improved.

The apparatus according to the present invention further comprises a transmission buffer memory in which information on operations of the operating keys is stored. The frame forming program includes address information about the transmission buffer memory transmitted to the second CPU; the frame flow program includes address information based on a top address number and the number of necessary items in the device memory defining an address at which a content of the transmission buffer memory is stored; and address numbers in the transmission buffer memory and address numbers in the device memory correspond to each other in numerical order. The setting display apparatus is provided with the transmission buffer memory so as to have a means for designating addresses for a setting information indirectly. If the device memory number for setting in the frame flow program is changed, it is not necessary to change the address of the frame forming program. Therefore, the independence of the both programs can be sure and the design efficiency can be improved.

Also, in the apparatus according to the present invention, the frame flow program and the frame forming program are stored in the first memory, and the switching shift condition information in the frame flow program is constituted by an operating key number of the operating keys and on/off information about the operating keys or on/off information from a designated number in a bit memory transmitted from the second CPU on the basis of a request from the first CPU. The setting display apparatus decides the individual frame number by itself. The load of the programmable controller can be reduced with respect to a apparatus of the control specification in which the frame change is performed by a key operation in the setting display apparatus side.

Also, in the apparatus according to the present invention, the individual frame number information designated by the second CPU is stored in a data memory at a particular address in the device memory, and the first CPU receives the individual frame number information and displays a frame of the designated number with priority. If in the case that the setting display apparatus decides the individual frame number, the individual frame number can be designated from the programmable controller interruptedly. Then, an abnormal occurrence in a machine to be controlled can be recovered immediately.

Also, in the apparatus according to the present invention, the frame forming program is stored in the first memory; the frame flow program is stored in a portion of the second memory; the switching shift condition information in the frame flow program is constituted by the bit memory number and on/off information in the same or on/off information about the operating keys of a designated number transmitted from the first CPU on the basis of a request from the second CPU; individual frame number information to be displayed is stored in a data memory at a particular address in the device memory; and the first CPU receives the individual frame number information and displays a frame of the designated number. The programmable controller decides the individual frame number by itself. The load of the programmable controller can be reduced with respect to that of the control specification in which the frame change is performed according to a condition of mechanical control.

Also, in the apparatus according to the present invention, the content of the data memory to be displayed within the frame is transmitted from the second CPU to the first CPU together with the individual frame number information stored in the data memory at the particular address. In the case that the programmable controller designates the individual frame number, the display information can be transmitted automatically without a transmission request from the setting display apparatus. Then, the communication efficiency between the setting display apparatus and the programmable controller can be improved.

In the apparatus according to the present invention, the frame flow program is expressed in a diagram in the form of a sequential flowchart in which are connected step blocks having numbers corresponding to individual frame numbers, and output blocks in each of which the number of a basic frame to be displayed with respect to the corresponding step block and information on the number of the device memory to be managed through the frame corresponding to the basic frame number are described, and contact blocks in which shift description branching and shifting lines, and shift conditions are described. Therefore, a graphic program according to the sequential function chart (SFC) method can be applied. The generation of the frame flow program can be easy and visible.

In the apparatus according to the present invention, information on the number of the device memory in which information about the operation of the operating keys of the setting display apparatus is to be stored is added to the corresponding output block. In the frame flow program which is generated according to the SFC method, information on the number of the device memory in which information about the operation of the operating keys of the setting display apparatus to be stored can be added. Therefore, the control information to the programmable controller from the setting display apparatus can be programmed easily.

In the apparatus according to the present invention, if a plurality of output blocks are annexed to one of the step blocks, basic frames of a plurality of numbers designated are displayed in a superposed state. In the frame flow program which is generated according to the SFC method, a plurality of output blocks are annexed to one of the step blocks, a plurality of the basic frames can be displayed in the superposed state. The frame forming program can be deleted.

In the apparatus according to the present invention, there are a plurality of the programmable controllers to be connected, the apparatus further comprises selective connection means for selectively connecting the setting display apparatus and one of a plurality of the programmable controllers and for changing the connection between the setting display apparatus and the programmable controllers, communication of various signals including contents of the device memory is performed between the first CPU and the second CPU incorporated in one of the programmable controllers selectively connected; a display program for display on the switchable display is divided into a frame flow program prepared with respect to each programmable controller and a frame forming program prepared with respect to each of basic frames and used in common for the programmable controllers; the frame forming program includes basic frame number information, address information about the device memory from which a content display is to be made, information on the size of a letter and a figure on a frame, and information on a layout of data displayed on the frame; and the frame flow program includes individual frame number information, target basic frame number information, address information about the device memory from which a content display is to be made, a frame switching shift condition, and shift destination individual frame number information. The display programs of the setting display apparatus which are used selectively with respect to a plurality of the programmable controllers (PLC) are divided into the frame flow program which is generated with respect to each of PLCs and the frame forming program which is generated with respect to each of basic frames in common with each of the PLCs. Therefore, the memory capacity can be reduced by using the frame forming program doubly.

In the apparatus according to the present invention, the frame flow program is divided according to a project number corresponding to one of the programmable controllers as a target of processing; the frame forming program and all the frame flow programs are stored in the first memory; and the setting display apparatus receives an identification number of one of the programmable controllers selectively connected and executes the frame flow program having the project number corresponding to the identification number. In the setting display apparatus which is used selectively with respect to a plurality of programmable controllers (PLC), all of the frame forming program and the frame flow program are stored in the setting display apparatus. Therefore, all programs can be managed in the setting display apparatus centralizedly.

In the apparatus according to the present invention, the frame flow program is stored in the second memory of each programmable controller selected as a target, and frame display is performed by the frame forming program stored in the first memory and the frame flow program in the programmable controller selectively connected. In the setting display apparatus which is used selectively with respect to a plurality of the programmable controllers (PLC), the frame forming program is stored in the setting display apparatus and the frame flow program is stored in the PLC. Therefore, the treatment can be easy when a PLC is added.

Also, in the apparatus according to the present invention, the setting display apparatus is constructed as a portable structure selectively connected to one of the programmable controllers by a detachable connector and a cable. In the setting display apparatus which is used selectively with respect to a plurality of the programmable controllers, the structure of the setting display apparatus is portable. An operation of the connection change by using cables can be easy.

In the apparatus according to the present invention, the setting display apparatus and the plurality of programmable controllers are connected by a 1:N network communication circuit, and communication is selectively performed between the setting display apparatus and one of the programmable controllers selected by an operating key or the like of the setting display apparatus. In the setting display apparatus which is used selectively with respect to a plurality of the programmable controllers, the setting display apparatus is connected to each of PLCs by a 1:N network communication circuit so as to be used selectively. Therefore, the operation of the connection change can be performed easily.

What is claimed is:

1. A setting display apparatus for programmable controller comprising:

a first CPU capable of operating in accordance with a user program stored in a first memory;

a reception buffer memory for temporally storing received data;

operating keys for performing various kinds of input; and a switchable display capable of switching a plurality of frames, said apparatus being capable of being connected to one programmable controller having a second CPU capable of operating in accordance with a user program stored in a second memory, and a device memory in which control information is stored, wherein communication of various signals including contents of said device memory is performed between said first and second CPUs;

a display program for display on said switchable display is divided into a frame flow program and a frame forming program for forming a basic frame;

said frame forming program includes basic frame number information, address information about said device memory from which a content display is to be made, information on the size of a letter and a figure on a frame, and information on a layout of data displayed on the frame; and said frame flow program includes individual frame number information, target basic frame number information, address information about said device memory from which a content display is to be made, a frame switching shift condition, and shift destination individual frame number information.

2. An apparatus according to claim 1, wherein the information on the address in said device memory in said frame forming program comprises an address number in said reception buffer memory;

the address information about said device memory in said frame flow program is constituted by a number or consecutive numbers designated by a top address number in said device memory and the number of necessary items in said device memory; and address numbers in said reception buffer memory and address numbers in said device memory correspond to each other in numerical order.

3. An apparatus according to claim 1, further comprising a transmission buffer memory in which information on operations of said operating keys is stored, wherein said frame forming program includes address information about said transmission buffer memory transmitted to said second CPU;

said frame flow program includes address information based on a top address number and the number of necessary items in said device memory defining an address at which a content of said transmission buffer memory is stored; and address numbers in said transmission buffer memory and address numbers in said device memory correspond to each other in numerical order.

4. An apparatus according to claim 1, wherein said frame flow program and said frame forming program are stored in said first memory, and the switching shift condition information in said frame flow program is constituted by an operating key number of said operating keys and on/off information about said operating keys or on/off information from a designated number in a bit memory transmitted from said second CPU on the basis of a request from said first CPU.

5. An apparatus according to claim 4, wherein individual frame number information designated by said second CPU is stored in a data memory at a particular address in said device memory, and said first CPU receives said individual frame number information and displays a frame of the designated number with priority.

6. An apparatus according to claim 1, wherein said frame forming program is stored in said first memory; said frame flow program is stored in a portion of said second memory; the switching shift condition information in said frame flow program is constituted by the bit memory number and on/off information in the same or on/off information about said operating keys of a designated number transmitted from said first CPU on the basis of a request from said second CPU; individual frame number information to be displayed is stored in a data memory at a particular address in said device memory; and said first CPU receives the individual frame number information and displays a frame of the designated number.

7. An apparatus according to claim 6, wherein the content of said data memory to be displayed within the frame is transmitted from said second CPU to said first CPU together with the individual frame number information stored in the data memory at the particular address.

8. An apparatus according to claim 1, wherein said frame flow program is expressed in a diagram in the form of a sequential flowchart in which are connected step blocks having numbers corresponding to individual frame numbers, and output blocks in each of which the number of a basic frame to be displayed with respect to the corresponding step block and information on the number of the device memory to be managed through the frame corresponding to the basic frame number are described, and contact blocks in which shift description branching and shifting lines, and shift conditions are described.

9. An apparatus according to claim 8, wherein information on the number of the device memory in which information about the operation of the operating keys of said setting display apparatus is to be stored is added to the corresponding output block.

10. An apparatus according to claim 8, wherein if a plurality of output blocks are annexed to one of said step blocks, basic frames of a plurality of numbers designated are displayed in a superposed state.

11. An apparatus according to claim 1, wherein there are a plurality of said programmable controllers to be connected, said apparatus further comprises selective connection means for selectively connecting said setting display apparatus and one of a plurality of said programmable controllers and for changing the connection between said setting display apparatus and the programmable controllers, communication of various signals including contents of said device memory is performed between said first CPU and the second CPU incorporated in one of said programmable controllers selectively connected;

a display program for display on said switchable display is divided into a frame flow program prepared with respect to each programmable controller and a frame forming program prepared with respect to each of basic frames and used in common for the programmable controllers;

said frame forming program includes basic frame number information, address information about said device memory from which a content display is to be made, information on the size of a letter and a figure on a frame, and information on a layout of data displayed on the frame; and said frame flow program includes individual frame number information, target basic frame number information, address information about said device memory from which a content display is to be made, a frame switching shift condition, and shift destination individual frame number information.

12. An apparatus according to claim 11, wherein said frame flow program is divided according to a project number corresponding to one of the programmable controllers as a target of processing; said frame forming program and all the frame flow programs are stored in said first memory; and said setting display apparatus receives an identification number of one of the programmable controllers selectively connected and executes the frame flow program having the project number corresponding to the identification number.

13. An apparatus according to claim 11, wherein said frame flow program is stored in the second memory of each programmable controller selected as a target, and frame display is performed by the frame forming program stored in said first memory and the frame flow program in the programmable controller selectively connected.

14. An apparatus according to claim 11, wherein said setting display apparatus is constructed as a portable structure selectively connected to one of the programmable controllers by a detachable connector and a cable.

15. An apparatus according to claim 11, wherein said setting display apparatus and the plurality of programmable controllers are connected by a 1:N network communication circuit, and communication is selectively performed between said setting display apparatus and one of the programmable controllers selected by an operating key or the like of said setting display apparatus.

* * * * *